United States Patent [19]
Bungo et al.

[11] Patent Number: 5,556,185
[45] Date of Patent: Sep. 17, 1996

[54] IMAGE PROJECTING APPARATUS PROVIDED WITH CARTRIDGE LOADING DEVICE

[75] Inventors: Keiichiro Bungo; Yoshinori Maruyama; Norimasa Kubota, all of Machida, Japan

[73] Assignee: Minolta Camera Kabushiki Kaisha, Osaka, Japan

[21] Appl. No.: 281,859

[22] Filed: Jul. 28, 1994

Related U.S. Application Data

[63] Continuation of Ser. No. 951,082, Sep. 25, 1992, abandoned.

[30] Foreign Application Priority Data

| Sep. 25, 1991 | [JP] | Japan | 3-273416 |
| Sep. 25, 1991 | [JP] | Japan | 3-273417 |
| Jul. 3, 1992 | [JP] | Japan | 4-200375 |
| Jul. 6, 1992 | [JP] | Japan | 4-201992 |
| Jul. 15, 1992 | [JP] | Japan | 4-210950 |

[51] Int. Cl.⁶ ............................. G03B 21/00
[52] U.S. Cl. ...................... 353/26 R; 353/25
[58] Field of Search ............... 353/25, 26 A, 353/26 R, DIG. 2; 352/72, 73, 78 R, 78 C

[56] References Cited

U.S. PATENT DOCUMENTS

| 3,164,059 | 1/1965 | Turrentine, Jr. | 353/26 A |
| 3,722,828 | 3/1973 | Kremp | 242/181 |
| 3,732,546 | 5/1973 | Ronkin et al. | 353/26 A |
| 3,807,074 | 4/1974 | Owens, et al. | 40/159 |
| 4,353,642 | 10/1982 | Weigert | 353/25 |
| 4,746,209 | 5/1988 | Corrado | 353/25 |
| 4,755,046 | 7/1988 | Hirose et al. | 353/26 R |
| 4,936,677 | 6/1990 | Koumura et al. | 353/26 A |
| 4,949,106 | 8/1990 | Igarashi | 353/25 |
| 5,104,215 | 4/1992 | Furukawa | 353/26 A |
| 5,357,295 | 10/1994 | Saitoh et al. | 353/26 A |

FOREIGN PATENT DOCUMENTS

| 0137142 | 6/1986 | Japan | 353/26 A |
| 3-167540 | 7/1991 | Japan . | |

*Primary Examiner*—William Dowling
*Attorney, Agent, or Firm*—Brinks Hofer Gilson & Lione

[57] ABSTRACT

An image projecting apparatus for projecting an image recorded in a microfilm incorporated in a cartridge on a screen, for example, is furnished with a loading device which has a container storing a plurality of cartridges detachably attached thereto. The cartridges in the container are sequentially loaded at a prescribed position of a roll film carrier by a loading mechanism of the loading device and subjected to screening of a microfilm for retrieval of a desired image. The cartridge containing the microfilm which had undergone the screening is extracted from the prescribed position and returned to the container by a discharge mechanism. The discharge mechanism returns the cartridge loaded at the prescribed position via a path independent of the path used by the loading mechanism for moving the cartridge. The loading mechanism is provided with a set bar for extracting a cartridge from the container and a front surface part for locating the extracted cartridge at a prescribed position of the roll film carrier and loading it. The front surface part is disposed freely movably between an opening position for retaining the cartridge extracted by the set bar and a shutting position for loading the cartridge. The direction of a cartridge in the container is different before the cartridge is extracted by the loading mechanism and after it is returned by the discharge mechanism.

36 Claims, 43 Drawing Sheets

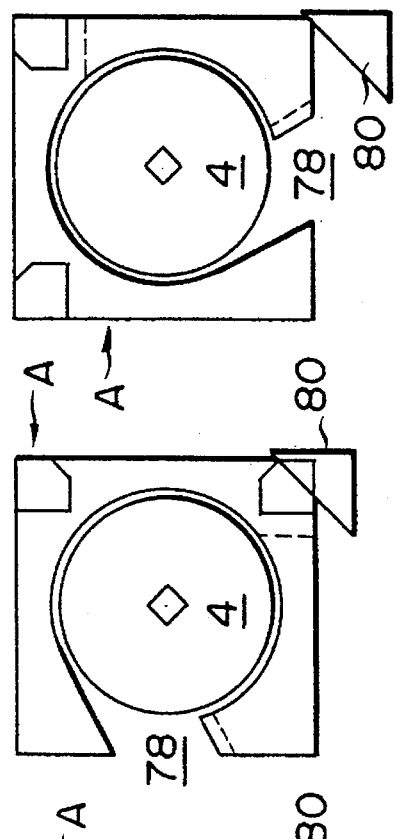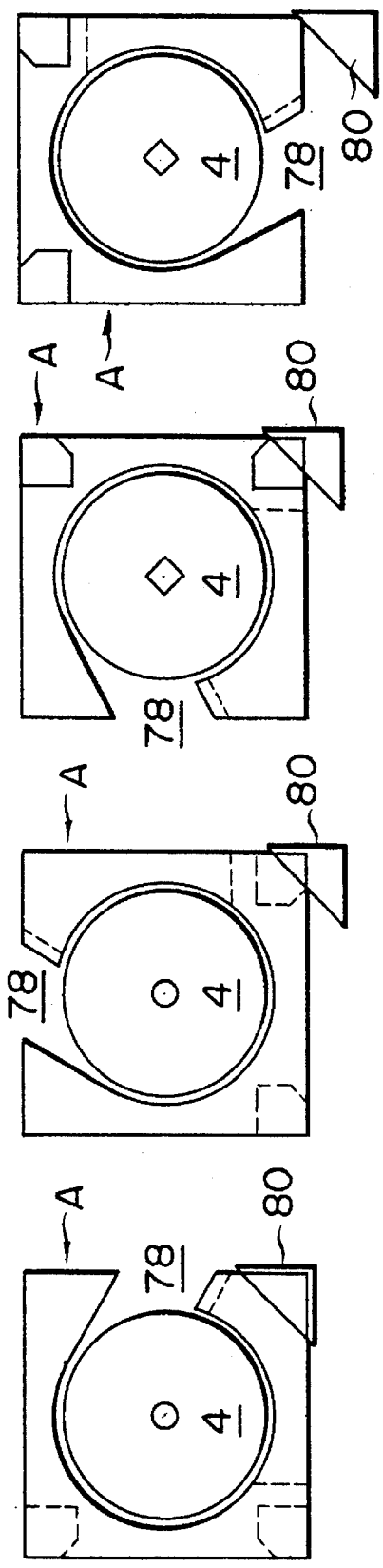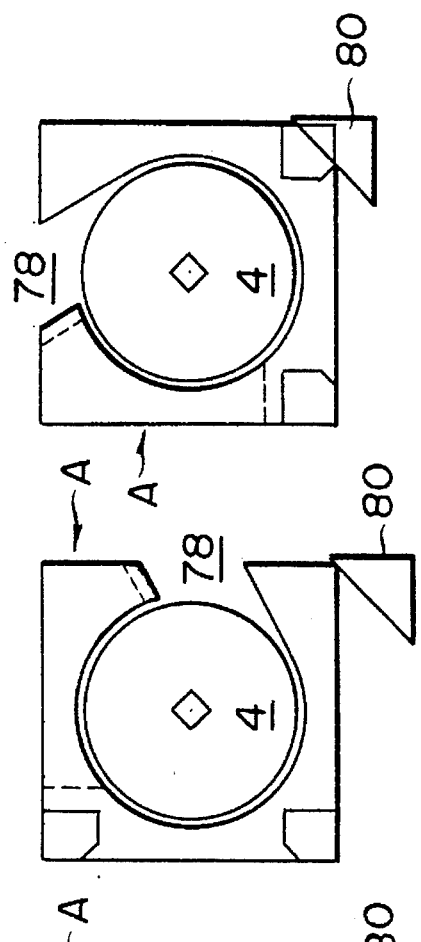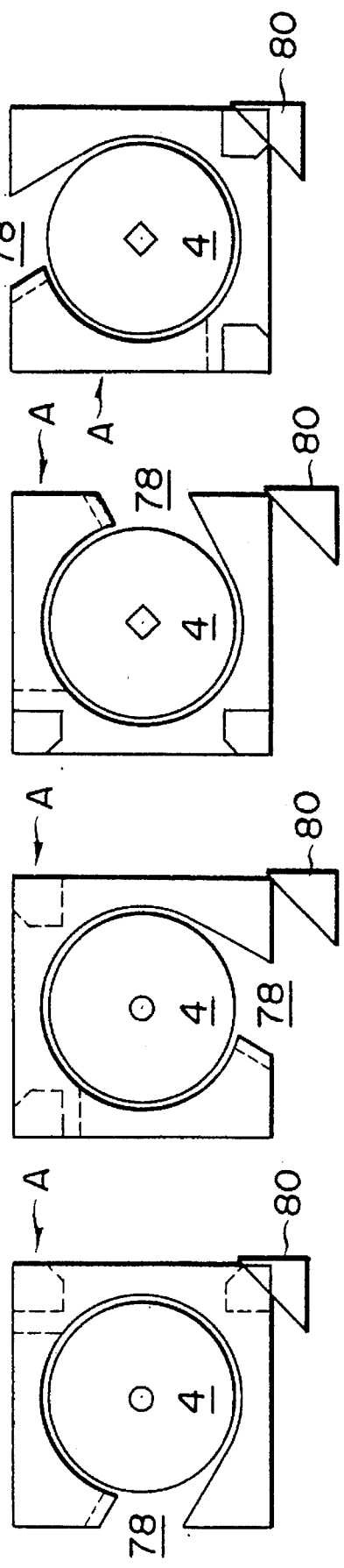

IMAGE PROJECTING APPARATUS PROVIDED WITH CARTRIDGE LOADING DEVICE

This application is a continuation of application Ser. No. 07/951,082, filed Sep. 25, 1992, now abandoned.

BACKGROUND OF THE INVENTION

1. Field of the Invention

This invention relates to an image projecting apparatus such as for a reader-printer, adapted to allow a cartridge containing a microfilm to be automatically loaded in the image projecting apparatus.

2. Description of the Prior Art

A microfilm reader is used for the purpose of projecting in a magnified scale an image recorded on a microfilm onto a screen and allowing inspection of the projected image. A microfilm reader-printer is possessed of the function of copying such an image in addition to the function of projecting the image. A microfilm scanner reads the image of the microfilm by means of CCD, a solid image pickup device.

Generally, microfilms are stored in large bulk and readied for use. At the time of use of the particular frame of a microfilm containing a desired image, it is required to retrieve the frame and copy the image expeditiously. Heretofore, for the purpose of retrieving and copying a desired image frame in a microfilm as with the reader-printer, it has been customary to load the cartridges containing a roll of microfilm manually one after another in the roll film carrier of the reader-printer and, after use, remove them manually from the reader-printer. To be specific, each time the retrieving and copying steps are completed on each cartridge, the operator is required manually to remove the cartridge from and load the next cartridge in the the reader-printer, namely to interchange the cartridges. Thus, the problem that the interchange of cartridges calls for time and labor and consequently renders it difficult to carry out the steps of retrieving and copying an image frame of microfilm expeditiously has been pointed out.

As measures to cope with the problems of this nature, cartridge loaders, i.e. automatic loading devices for cartridges containing a roll of microfilm have been developed recently. Such a cartridge loader is attached as an auxiliary device to the reader-printer, for example. The cartridge loader automatically extracts necessary cartridges one after another from a cartridge container and loads them in the roll film carrier. When the retrieving and copying steps are completed on a microfilm, the cartridge loader extracts the used cartridge from the roll film carrier and returns it to the cartridge container. The roll film carrier is provided with a supply part. In the supply part, the cartridge is loaded as position so as to allow loading of the microfilm in the cartridge. Incidentally, in the conventional supply part, the front surface part on the cartridge loading side is constructed immovably relative to the path through which the cartridge is loaded.

It has been pointed out, however, that the conventional system entails the following problem. Generally, in the cartridge loader and the roll film carrier, a loading path intended for newly loading a cartridge of microfilm to be used and a discharge path intended for extracting and returning the used cartridge after completion of the retrieving and copying steps are formed. In the conventional cartridge loader or roll film carrier, however, the loading path and the discharge path have been formed so as to overlap each other at least partly and not separate completely from each other. Owing to the partial coincidence between the loading path and the discharge path, the loading of the next cartridge must wait until the extraction of the used cartridge is completed. As a result, the interchange of cartridges has called for a long time and posed itself a problem. The automatic cartridge loader, in spite of the automated cartridge loading, has the possibility of consuming nearly as much time as the conventional manual method of interchange of cartridges. It has been pointed out that the long time thus spent for the interchange of cartridges poses a hindrance in the way of expeditious performance of the retrieving and copying steps on the microfilm.

Further, the following problem has been also pointed out. For the conventional cartridge loader, since the retrieving and copying steps have not yet been performed on the individual cartridges stored in the cartridge container, it is not easy to discriminate between the cartridges which are to be loaded in the supply part of the roll film carrier and the cartridges which have undergone the retrieving and copying steps and have been returned as already used. The discernment of the identity of cartridges as used ones or otherwise calls for much time. It has been pointed out, therefore, that the discrimination poses a hindrance in the way of expeditious performance of the retrieving and copying steps on the microfilm.

The first method developed for discriminating or discerning given cartridges as used ones or otherwise comprises having an image management code (IMC) read in preparatorily in a microfilm and subsequently allowing discernment of a cartridge as a used one or otherwise by presence or absence of the detection of the IMC in the microfilm. This method, however, requires to load microfilms one by one in the roll film carrier and examine them to discriminate between presence and absence of the IMC therein. This examination necessitates wasteful time and, after all, entails the problem that the object of effecting the retrieving and copying steps expeditiously is not fulfilled. The second method developed for the same purpose comprises having a detection tape or detection mark attached preparatorily on cartridges and subsequently allowing discernment of a cartridge as a used one or otherwise by presence or absence of the detection of the tape or mark. This method, however, entails the problem that the application of the tape or mark to the cartridge adds to the number of steps of operation and raises the cost proportionately. Further, this method requires to install an exclusive mechanism for the detection of the tape and consequently complicates the construction of the system, sacrifices reliability of performance of the system, and increases the cost.

It has been pointed out that the conventional cartridge loader encounters the following problem. The cartridge loaded in the roll film carrier cannot be taken out until the microfilm contained therein has been completely retrieved and then has been completely rewound. The conventional cartridge loader is adapted so that the motion for the removal of the cartridge is not commenced until after the cartridge has been readied for extraction as described above. Then, the cartridge loader catches hold of the used cartridge, extracts it from the roll film carrier, and loads the next new cartridge in the roll film carrier. In other words, the conventional cartridge loader waits until each cartridge loaded in the roll film carrier has been used and then readied for removal and thereafter performs the work for removal of the used cartridge and the work of loading a new cartridge. It has been pointed out, therefore, that the conventional cartridge loader still calls for much time for the interchange of cartridges. For the purpose of expediting the retrieving and copying steps to be performed on the microfilm, therefore, the conventional cartridge loader has been expected to allow a further reduction in the time to be spent for the interchange of cartridges.

The following problem has been also pointed out. The cartridge container produces the action of causing cartridges stored in the cartridge container to be loaded in the roll film carrier and the action of causing the cartridges loaded in the roll film carrier to be returned to the cartridge container. For the purpose of stopping these actions of the cartridge loader, it has been necessary to detect the fact that the retrieving and copying steps have been completed on the microfilm in the last of the cartridges stored in the cartridge container and this particular cartridge has been returned from the roll film carrier, namely the fact that the retrieving and copying steps have been completed on .the microfilms in all the cartridges stored in the cartridge container. For the cartridge loader to stop the actions of itself, it is required to detect the fact that the retrieving and copying actions have been wholly completed as described above. This requirement has posed a problem in the way to automation of the retrieving and copying steps to be performed on the microfilm.

The following problem has been also pointed out. The roll film carrier is generally adapted to produce a vertical scanning motion for correction of the positional deviation of the image in the vertical direction during the retrieving and copying steps being performed on the microfilm in the loaded cartridge. To be specific, it often happens that for the purpose of moving the image in the microfilm in the vertical direction on the screen, the vertical scanning for slightly moving the roll film carrier in the longitudinal direction, for example, relative to the main body of the system such as the reader-printer. When the roll film carrier is located at the home position which is the neutral position, the axis of the projected light on the main body of the system falls on the central line of film along the longitudinal direction of the roll microfilm. Further, the roll film carrier is located at the standard position at which it cooperates with the cartridge loader in performing the steps of loading and returning cartridges. When the vertical scanning is carried out, the roll film carrier inevitably deviates from the home position mentioned above. When the interchange of cartridges namely the return of a used cartridge and the loading of the next new cartridge are carried out, it has been necessary for the roll film carrier to be returned to the home position each time the positional deviation caused by the vertical scanning is to be corrected. It has been pointed out that the interchange of individual cartridges does not smoothly proceed and this inconvenience has posed a hindrance in the way of automation of the retrieving and copying steps to be performed on the microfilm. Further, the interchange of cartridges consumes much time and this fact has prevented the retrieving and copying steps from being performed expeditiously.

Further, the following problem has been pointed out. While cartridges are being stored in the cartridge container of the cartridge loader, they must be introduced therein in a prescribed correct direction. It often happens, however, that cartridges mistaken in their longitudinal, lateral, or vertical directions will be set in wrong directions. When the cartridges are set in wrong directions, they are liable to sustain damage and inflict damage to the roll film carrier and entail troubles such as mistaken retrieval. The precautions to be used accordingly cost time and labor and entail loss of time. It has been pointed out that this loss of time poses a hindrance to the retrieving and copying steps to be performed on the microfilm.

SUMMARY OF THE INVENTION

A main object of this invention is to provide an image projecting apparatus as for a microfilm reader, a microfilm reader-printer, or a microfilm scanner, which image projecting apparatus allows cartridges containing a microfilm filled with recorded images to be automatically loaded therein and removed therefrom and consequently expedites the retrieving and copying steps to be performed on the microfilm.

A further object of this invention is to provide an image projecting apparatus which is furnished with a loading device having a loading path for loading cartridges extracted from a container formed separately of a discharge path for returning used cartridges to the container.

Another object of this invention is to provide an image projecting apparatus which is furnished with a loading device capable of substantially simultaneously and parallelly the action of removing used cartridges and the work of loading the next new cartridge.

Still another object of this invention is to provide an image projecting apparatus which is furnished with a loading device so adapted that, during the return of a used cartridge to the container, the direction of storing the cartridge is differentiated from the direction of storing of that cartridge in the initial setting in the container.

Yet another object of this invention is to provide an image projecting apparatus which is furnished with a loading device adapted to take hold of a cartridge, ready it for removal, and prevent it from vibration possibly generated during the action of loading before the microfilm in the cartridge has been rewound and the cartridge readied for removal.

Another object of this invention is to provide an image projecting apparatus which is furnished with a loading device adapted to stop the operation thereof automatically after completion of the retrieving step on the microfilms in all the cartridges by discerning the number of cartridges stored in the container.

A further object of this invention is to provide a film carrier so adapted that when the vertical scan is carried out, the microfilm being rewound is returned to the home position thereof so as to smoothen interchange of cartridges.

Still another object of this invention is to provide an image projecting apparatus which is furnished with a loading device so adapted that cartridges are poised correctly in longitudinal, lateral, and vertical directions and set in a prescribed correct direction in the loading device.

Yet another object of this invention is to provide an image projecting apparatus which is furnished with a loading device so adapted as to detect the direction of a given cartridge and stop the loading motion of the cartridge and issue an alarm when the direction is not correct.

In accordance with the present invention, there is provided a loading device for loading a microfilm in an image projecting apparatus, comprising: a storing part capable of storing a plurality of microfilms, first conveying means for conveying a microfilm stored at a first position in said storing part to a second position outside said storing part; and second conveying means for conveying said microfilm at said second position to a third position inside said storing part via a path independent of the path of conveyance used by said first conveying means.

BRIEF DESCRIPTION OF THE DRAWINGS

FIG. 7(1) illustrating a cartridge of the type of ANSI specification and FIG. 7(2) illustrates a cartridge of the 3M type;

FIG. 8(1) illustrating the initial state, FIG. 8(2) the state of transfer, and FIG. 8(3) the stage of completion of transfer;

FIG. 9(1) illustrating the initial stage, FIG. 9(2) the state of transfer, and FIG. 9(3) the step of completion of the transfer;

FIG. 10(1) illustrating the initial state, FIG. 10 (2) the state of transfer, and FIG. 10(3) the stage of completion of the transfer;

FIG. 17(1) illustrating the initial stage, FIG. 17(2) the stage of transfer, and FIG. 17(3) the stage of completion of the transfer;

FIG. 18(1) illustrating the initial stage, FIG. 18(2) the stage of transfer, and FIG. 18(3) the stage of completion of the transfer;

FIG. 36 is an explanatory diagram for aiding in the illustration of the operation of the embodiment shown in FIG. 33, FIG. 34, and FIG. 35; FIG. 36(1) illustrating the case in which the cartridge is set in a correct direction and FIGS. 36(2) to 36(8) the cases in which the cartridge is set in a wrong direction;

FIG. 38(1) representing a bottom view illustrating the case of a cartridge of the type of ANSI specification, FIG. 38 (2) a side view illustrating the case of a cartridge of the 3M-M type, and FIG. 38(3) a front view illustrating another case of a cartridge of the 3M-M type;

FIG. 40(1) illustrating a cartridge of the ANSI specification type and FIG. 40(2) a cartridge of the 3M-M type;

DETAILED DESCRIPTION OF THE PREFERRED EMBODIMENTS

Now, this invention will be described specifically below with reference to embodiments illustrated in the accompanying drawings.

Figure 6:
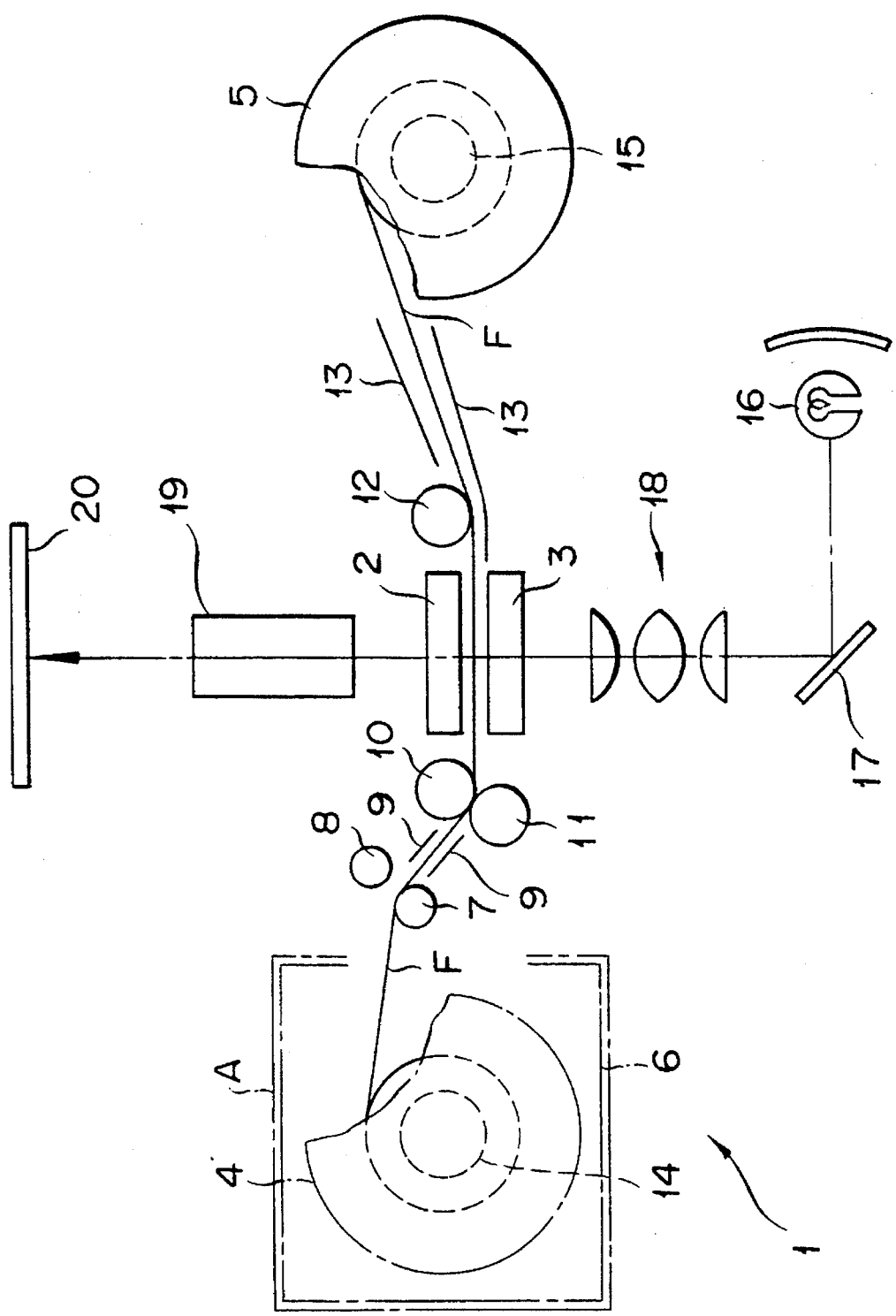
FIG. 6 is a schematic front view illustrating the interior of a reader-printer.

FIG. 6 is a front explanatory diagram illustrating a roll film carrier, etc. First, with reference to this diagram, the outline of a reader-printer, one form of the image projecting apparatus for projecting images recorded in a microfilm, and a roll film carrier will be described. This reader-printer has a roll film carrier 1 incorporated in a detachable manner or an integrally combined manner. On the opposite sides of retaining glasses 2, 3 in the central part, a rewinding reel 4 and a take-up reel 5 both for a microfilm F are disposed. The rewinding reel 4 is rotatably retained inside a cartridge A. The cartridge A is loaded inside a supply part 6 having the shape of a housing. The microfilm F wound on the rewinding reel 4 is a strip of roll film, with image information recorded photographically in the individual frames thereof. In the roll film carrier 1, between the rewinding reel 4 and the take-up reel 5, a drive roller 7 and an auxiliary roller 8 which are rotated only during the loading for initially feeding out the microfilm F, a pair of film guides 9 on the sending side, an encoder 10 and an auxiliary roller 11, the pair of vertically opposed retaining glasses 2 and 3, a guide roller 12, and a pair of film guides 13 on the take-up side are arranged sequentially as reckoned from the rewinding reel 4 side. These component parts form a conveyance route for conveying the microfilm F.

In this roll film carrier 1, the rewinding reel 4 and the take-up reel 5 are connected to a motor (not shown) respectively through the medium of drive shafts 14 and 15. By the rewinding reel 4 and the take-up reel 5 being suitably rotated in the normal and reverse directions, the microfilm F is passed through the gap separating the retaining glasses 2 and 3 and conveyed between the two reels 4 and 5 as taken up or rewound. The light from a lamp 16 as the light source is reflected by a reflecting mirror 17, condensed by a group of condenser lenses 18, and caused to illuminate upwardly the microfilm F positioned as nipped between the retaining glasses 2 and 3. The image information of the microfilm F forwarded by the penetrating light is projected as magnified by a projecting lens 19, in the reader mode, onto a screen 20 to be inspected or, in the print mode, onto a sensitive material (not shown) to be copied through exposure. After undergoing the retrieving and copying steps, the microfilm F is rewound completely on the rewinding reel 4.

Figure 1:
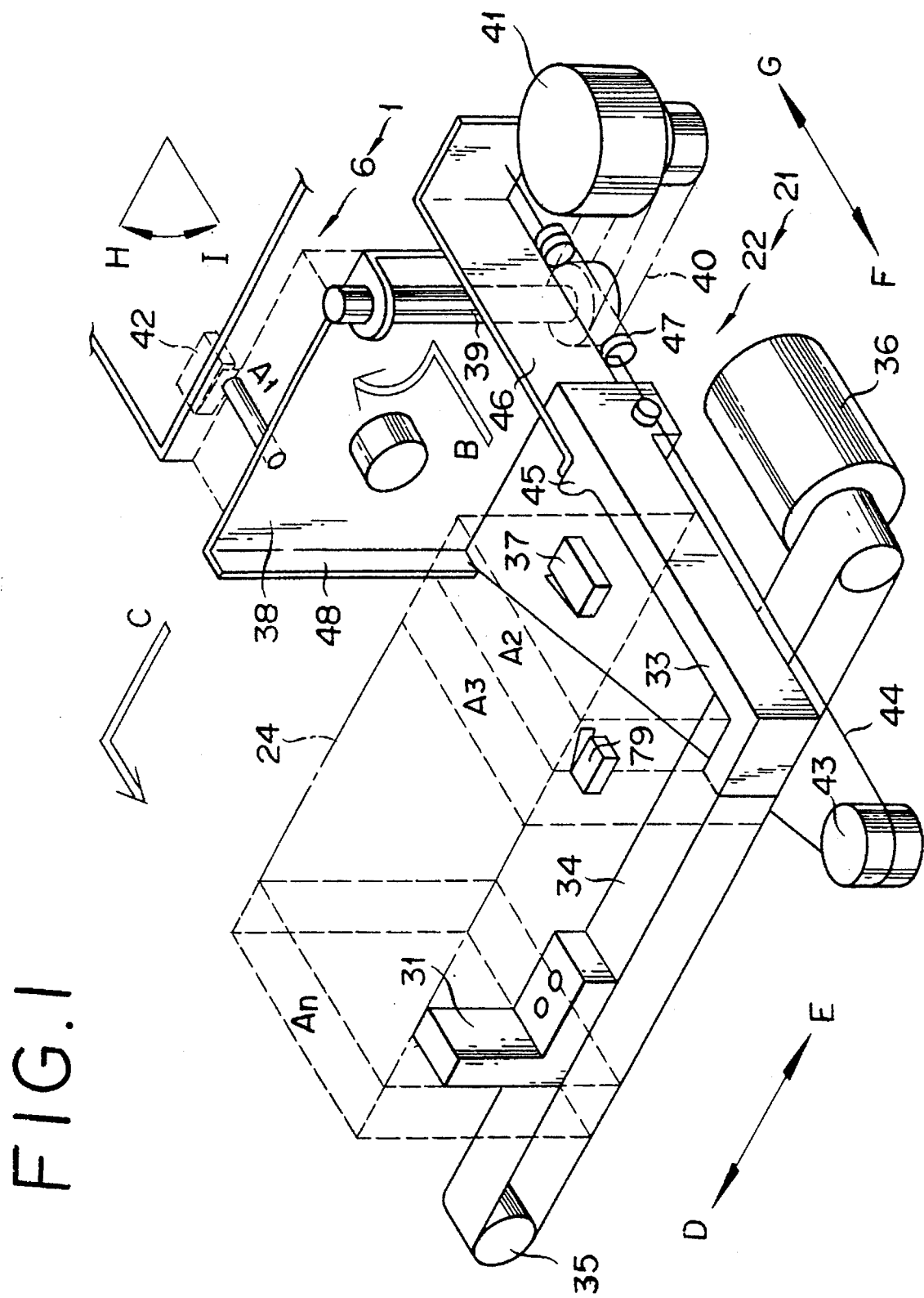
FIG. 1 is a schematic perspective view illustrating a cartridge, a loading mechanism of a cartridge loader, a supply part of a roll film carrier, etc.
Figure 2:
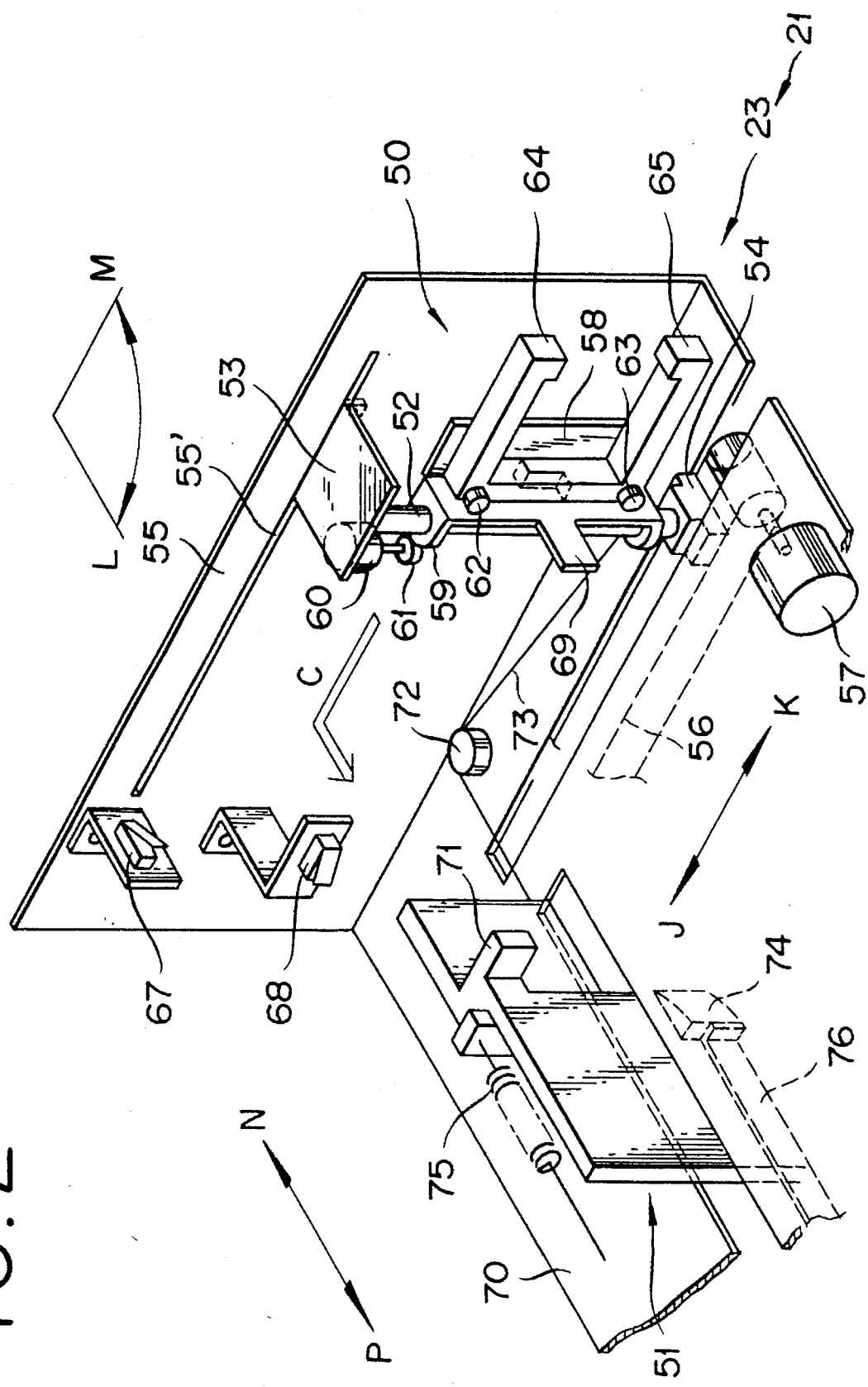
FIG. 2 is a schematic perspective view illustrating a discharge mechanism of the cartridge loader shown in FIG. 1.
Figure 3:
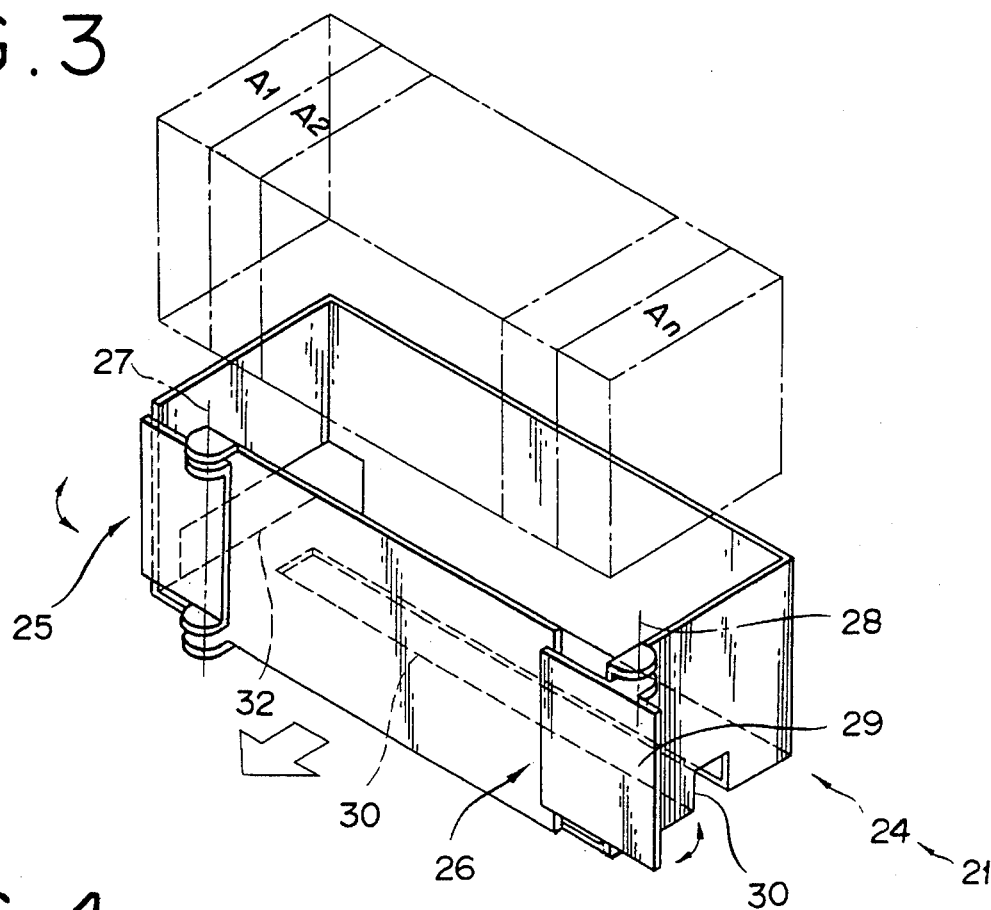
FIG. 3 is a schematic perspective view illustrating a cartridge container of the cartridge load shown in FIG. 1.

A cartridge loader 21 shown in FIG. 1, FIG. 2, and FIG. 3 is attached to a reader-printer, one form of the image projecting apparatus and is furnished with a cartridge container 24, a loading mechanism 22, and a discharge mechanism 23. In the cartridge container 24 shown in FIG. 3, a plurality of cartridges A each containing a microfilm F are stored as arranged. The loading mechanism 22 shown in FIG. 1 forms a loading path B for the cartridges A and serves the purpose of sequentially extracting cartridges A containing used microfilms F from the cartridge container 24 and guiding them to the supply part 6 of the roll film carrier 1. The discharge mechanism 23 shown in FIG. 2 forms a discharge path C for the cartridges A and serves the purpose of removing the cartridges A containing used microfilms from the supply part 6 and sequentially returning them to the cartridge container 24.

First, in the cartridge loader 21, the cartridge container 24 shown in FIG. 3 is otherwise called a stacker. It has the shape of an oblong box and has about 10 to 20 cartridges A stored as arranged therein. The cartridge container 24 is incorporated into the cartridge loader 21 from the front side as indicated by the arrow. The cartridge container 24 is provided in the laterally opposite terminal parts on the front surface thereon with doors 25 and 26. The doors 25 and 26 can be opened and shut respectively round shafts 27 and 28. Further, the doors 25 and 26 are urged by coil springs (not shown) as illustrated toward the respective shut positions along the front surface of the cartridge container 24. The door 25 is positioned on the loading side of the cartridge A and is rotated from the shut position shown in the diagram to the open position each time the loading is made. The door 26 is positioned on the return side of the cartridge A. During the insertion of the cartridge container 24 into the cartridge loader 21, a projecting part 29 of the door 26 is pressed by a stopper (not shown) and the door 26 is rotated from the shut position shown in the diagram to the open position. This door 26 retains the open position and forms a mouth for the return of the cartridges A to the cartridge container 24 while the cartridge container 24 is incorporated in the cartridge loader 21. In the lower surface of the cartridge container 24, a cutaway groove 30 is formed in the longitudinal direction. This cutaway groove 30 functions as a path for the motion of a transfer claw part 31 which will be described more specifically afterward. In the lateral surface on the loading side of the cartridge container 24, a long opening 32 is formed. This long opening 32 functions as a path for the motion of a set bar 33 which will be described more specifically afterward. The cartridge container 24 of the cartridge loader 21 is constructed as described above.

Then, in the cartridge loader 21, the loading mechanism shown in FIG. 1 is provided with the transfer claw part 31 and the set bar 33 and is adapted to remove the cartridges A sequentially from within the cartridge container 24 via a way forced through the door 25 (FIG. 3) and guide them to the supply part 6 of the roll film carrier 1. First, the transfer claw part 31 has the shape roughly of the letter L and is attached to a belt 34. By a first motor 36 through the medium of a pulley 35, the belt 34 is made to travel along the longitudinal direction of the cartridge container 24. The transfer claw part 31 is thrust into the cartridge container 24 through the cutaway groove 30 (FIG. 3) and, by the rotation of the first motor 36 in the normal or reverse direction, moved slidingly and horizontally in the direction of D–E or along the longitudinal direction of the cartridge container 24. In consequence of the motion of the transfer claw part 31 in the direction of E shown in the diagram, the group of cartridges A stored in the cartridge container 24 are caught on the transfer claw part 31 and moved in the direction of E. By this motion of the group of cartridges A, the cartridge A to be loaded is set on the set bar 33. In the diagram, the reference numeral "37" stands for a first switch. The first switch 37 detects the fact that the cartridge A has been set on the set bar 33 as described above. The set bar has the shape roughly of the letter L. It thrusts into the cartridge container 24 through the long opening 32 (FIG. 3). It allows setting of the cartridge A which is to be set next. As described more specifically afterward, the set bar 33 is capable of moving slidably and horizontally in the direction of F–G shown in the diagram or in the shorter longitudinal direction of the cartridge container 24.

Then, in the roll film carrier 1 as illustrated in FIG. 1, the supply part 6 of the cartridge A is so adapted that a front surface part 38 thereof corresponding to the loading path B for the cartridges A can be opened and shut by being rotated in its entirety in the forward direction. The cartridge A is enabled to be loaded and positioned in the supply part 6 by the front surface part 38 being opened and shut as described above. In other words, the front surface part 38 is incorporated in the loading mechanism 22 mentioned above and is rendered rotatable round a shaft 39. Further, the front surface part 38 is connected through the medium of a belt 40 to a second motor 41 which is rendered rotatable in the normal and reverse directions and it is rotated by this second motor 41. The front surface part 38 is rotated by 90 degrees horizontally in the direction of H–I indicated in the diagram.

First at the opening position of the front surface part 38 along the direction of I, the front surface part 38 can retain the cartridge A. Then, when the front surface part 38 makes a rotation of 90 degrees from this position and reaches the shutting position along the direction of H, this front surface part 38 loads the cartridge A as positioned relative to the supply part 6 to allow loading of the microfilm F. In the diagram, the reference numeral "42" stands for a second switch. This second switch 42 detects the fact that the front surface part 38 is located at the shutting position.

Figure 4:
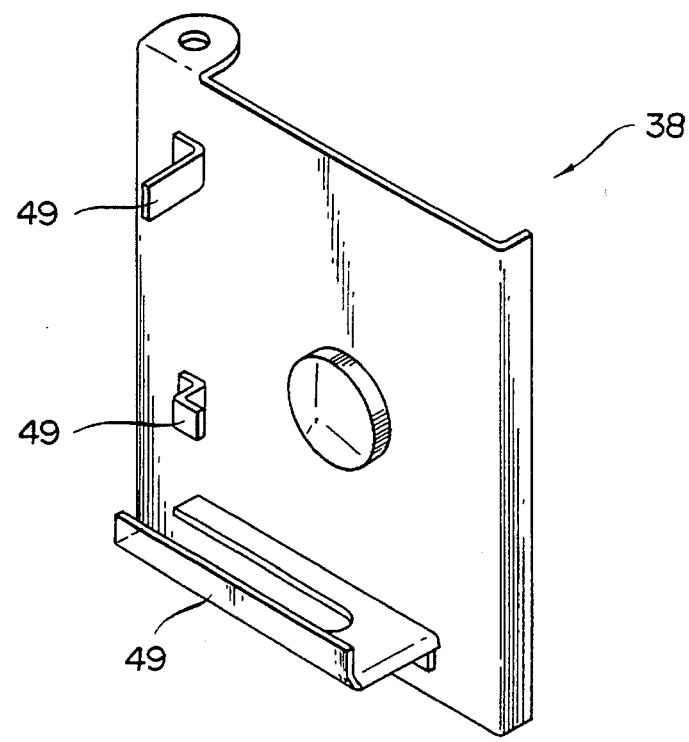
FIG. 4 is a perspective view of the front surface part of the supply part of the roll film carrier of FIG. 1 as seen from behind.

As illustrated in FIG. 1, the front surface part 38 of the supply part 6 and the basal part of the set bar 33 are interconnected with a wire member 44 through the medium of a pulley 43 so that the front surface part 38 and the set bar 33 will be interlocked with prescribed motions. The set bar 33 is provided at the basal part thereof with a lock claw 45. While the front surface part 38 is located at the shutting position, the set bar 33 is urged in the direction of G by a tensile spring 47 interposed between the set bar 33 and a guide plate 46 and, at the same time, the lock claw 45 is locked as fastened to the leading terminal of the guide plate 46. When the second motor 41 is rotated in the reverse direction to revolve the front surface part 38 in the direction of I and locate it at the opening position, a folded edge 48 of the front surface part 38 which is folded toward the front is revolved to the position for exerting a push to the lock claw 45 of the set bar 33. The push thus generated dissolves the engagement between the lock claw 45 and the guide plate 46 and relieves the set bar 33 of the lock. The set bar 33 which has been relieved of the lock is guided by the tensile spring 47 along one surface of the guide plate 46 in the direction of G and, in the meantime, the set bar 33 catches hold of the cartridge A set in place and continues its motion in conjunction with the cartridge A. The cartridge A which has moved in conjunction with the set bar 33 is eventually retained by the front surface part 38 which had collided against the other surface of the guide plate 46 at the opening position. When the second motor 41 is then rotated by the second motor 41 in the normal direction, the front surface part 38 still retaining the cartridge A is revolved in the direction of H. When the front surface part 38 has been revolved to the shutting position, the cartridge A is positioned and loaded in the supply part 6 so as to allow loading of the microfilm F. Incidentally, FIG. 4 is a perspective view illustrating the front surface part 38 of the supply 6 in the state described above, as seen from behind. As illustrated in this diagram, the front surface part 38 is provided on the rear surface side thereof with a plurality of retaining pieces 49 for retaining the cartridge A. The loading mechanism 22 for the cartridges A is constructed as described thus far.

Then, in the cartridge loader 21, the discharging mechanism 23 illustrated in FIG. 2 is provided with a holder part 50 and an extracting plate 51 and adapted to return the used cartridges A sequentially from the supply part 6 mentioned above to the cartridge container 24 via a return mouth formed in the door 26 (FIG. 3) at the opening position. The holder part 50 is provided with a vertical shaft 52 and a top plate 53 and a block 54 which are fixed respectively to the upper and lower terminals of the shaft 52. The top plate 53 is guided horizontally in the direction of J–K (the lateral direction parallel to the direction of D–E shown in FIG. 1) by a guide groove 55' formed in a vertical frame 55 which is disposed along the same direction of J–K. The block 54 is attached to a belt 56. The belt 56 is made to run along the direction of J–K through the medium of a pulley (not shown) by a third motor 57 which is rotated in the normal and reverse directions. To the central part at the shaft 52 of the holder part 50, an arm retaining plate 58 is attached in such a manner as to be revolved by 90 degrees horizontally in the direction of L–M (the direction opposite to the direction of H–I shown in FIG. 1). A gear part 59 formed at the upper terminal side part of the arm retaining plate 58 is meshed with a pinion 61 attached to a fourth motor 60. The arm retaining plate 58 is adapted so as to be revolved by the normal-reverse rotation of the fourth motor 60 by 90 degrees in the direction of L–M round the shaft 52.

Figure 5:
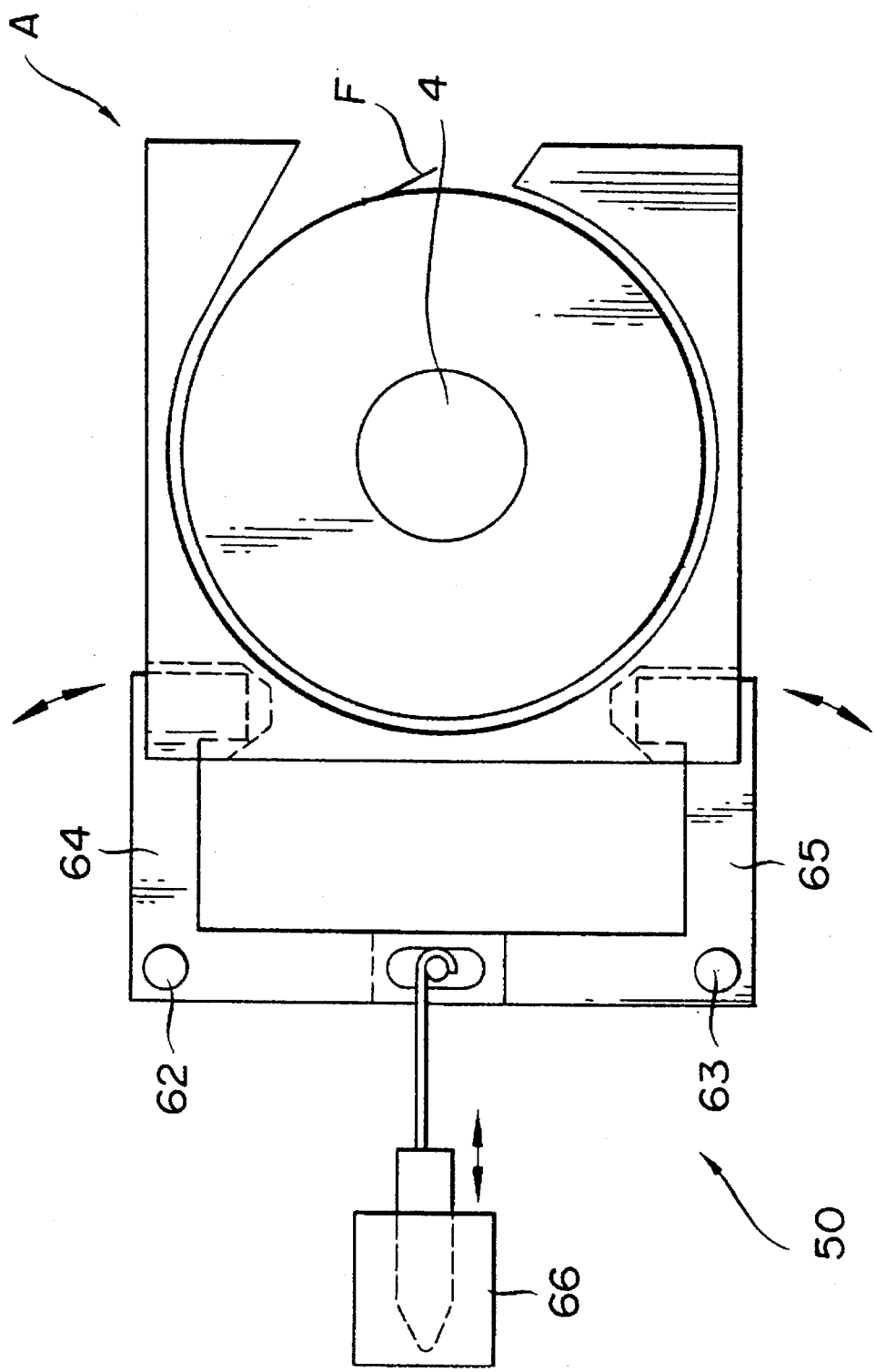
FIG. 5 is a magnified view illustrating the essential part of the discharge mechanism of the cartridge loader of FIG. 2.

To the arm retaining plate 58, an upper arm 64 and a lower arm 65 are attached respectively with horizontal axes 62 and 63 so as to be revolved in the vertical direction. FIG. 5 is a magnified diagram illustrating the upper arm 64 and the lower arm 65 of the holder part 50 which form the essential part of the discharge mechanism 23. As illustrated in this diagram, the upper arm 64 and the lower arm 65 are opened and shut to initiate and terminate the retention of cartridge A by a solenoid 66 disposed on the arm retaining plate 58 being turned ON and OFF. In the bearings shown in FIG. 5, the upper arm 64 and the lower arm 65 are shut to retain the cartridge A.

The holder part 50 of the discharge mechanism 23 illustrated in FIG. 2 is composed of the axis 52, top plate 53, block 54, arm retaining plate 58, fourth motor, 60, upper arm 64, lower arm 65, etc. The terminal of the K direction side corresponds to the position of the supply part 6 of the roll film carrier 1 and the terminal of the J direction side corresponds to the position of the return mouth which is formed by opening the door 26 of the cartridge container 24. The holder part 50 can be moved in a sliding manner between the K direction side terminal and the J direction side terminal. The arm retaining part 58, upper arm 64, lower arm 65, etc. of the holder part 50 can be rotated by 90 degrees in the L–M direction. When the holder part 50 is directed toward L or toward the foreground side, this holder part 50 is opposed to the cartridge container 24. When it is directed toward M, it is opposed to the supply part 6 of the roll film carrier 1. Further, the upper arm 64 and the lower arm 65 are adapted to be opened and shut in the vertical direction as described above. In the diagram, the reference numeral "67" stands for a third switch. This third switch 67 detects the fact that the holder part 50 has moved to the position of the terminal in the direction of J. In the diagram, the reference numeral "68" stands for a fourth switch. This fourth switch 68, by being turned on by a projection 69 of the arm retaining plate 58, detects the fact that the upper arm 64 and the lower arm 65 of the holder part 50 are directed toward L at the position of the terminal of the direction of J.

Then, the extracting plate 51 of the discharge mechanism 23 is formed of a folded plate which is disposed vertically as illustrated in FIG. 2. The extracting plate 51 is adapted to be moved on a lateral frame 70 along the guide groove formed therein in a sliding manner horizontally in the direction of N–P shown in the diagram. This extracting plate 51 is provided at the leading terminal thereof with an extracting claw 71 which is folded in a right angle. When the extracting plate 51 is positioned at the terminal in the direction of N, the extracting claw 71 is located at a position opposite the upper arm 64, the lower arm 65, etc. of the holder part 50 directed toward L at the position of the terminal of the direction of J. When the extracting plate 51 is positioned at the terminal in the direction of P, the extracting claw 71 is located at a position opposite the return mouth which is formed by the opening of the door 26 of the cartridge container 24 as described above. The extracting plate 51 is provided with a lock claw 74. The extracting plate 51 constructed as described above is connected with a line member 73 through the medium of a pulley 72 to the arm retaining plate 58 of the holder part 50 and the extracting plate 51 and the holder part 50 are adapted to be interlocked as follows. First, when the holder part 50 is moved to the terminal of the direction of K and kept waiting there, the extracting plate 51 is positioned at the terminal of the direction of N. At this position, the extracting plate 51 is urged with an interposed tensile spring 75 in the direction of P and, at the same time, locked in that state by the lock claw 74 being fastened to the folded piece of a guide plate 76 (in the state illustrated in FIG. 2).

Then, the holder part 50 kept waiting as described above causes the upper arm 64 and the lower arm 65 thereof to take hold of the used cartridges A, then moved to the terminal of the direction of J, and revolves in the direction of L. When the solenoid 66 is consequently turned off to cancel the retention of the cartridge A, the extracting plate 51 initiates the following action. The arm retaining plate 58 of the holder part 50 is provided with the projection 69 adapted to exert a push on the extracting plate 51 in consequence of the revolution of the holder part 50 in the direction of L. The engagement between the lock claw 74 and the folded piece of the guide plate 76 is dissolved by the extracting plate 51 being pushed by the projection 69. As a result, the extracting plate 51 which has been relieved of the lock takes hold of the cartridge A with the aid of the extracting claw 71 thereof and moves along the guide plate 76 in the direction of P by dint of the tensile spring 75. The cartridge A is then returned to the cartridge container 24 through the return mouth which is formed by the opening of the door 26. The discharge mechanism 23 of the cartridge loader 21 is constructed as described above.

Figure 7:
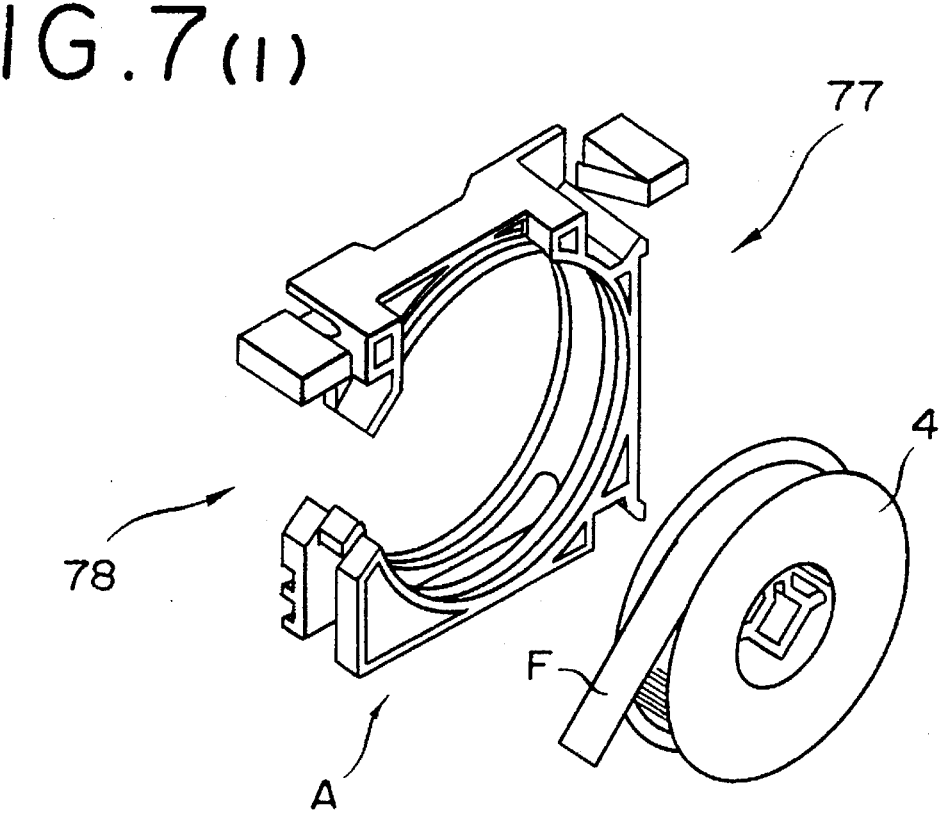
FIG. 7 is a perspective view illustrating a reel extracted from the cartridge.
Figure 7:
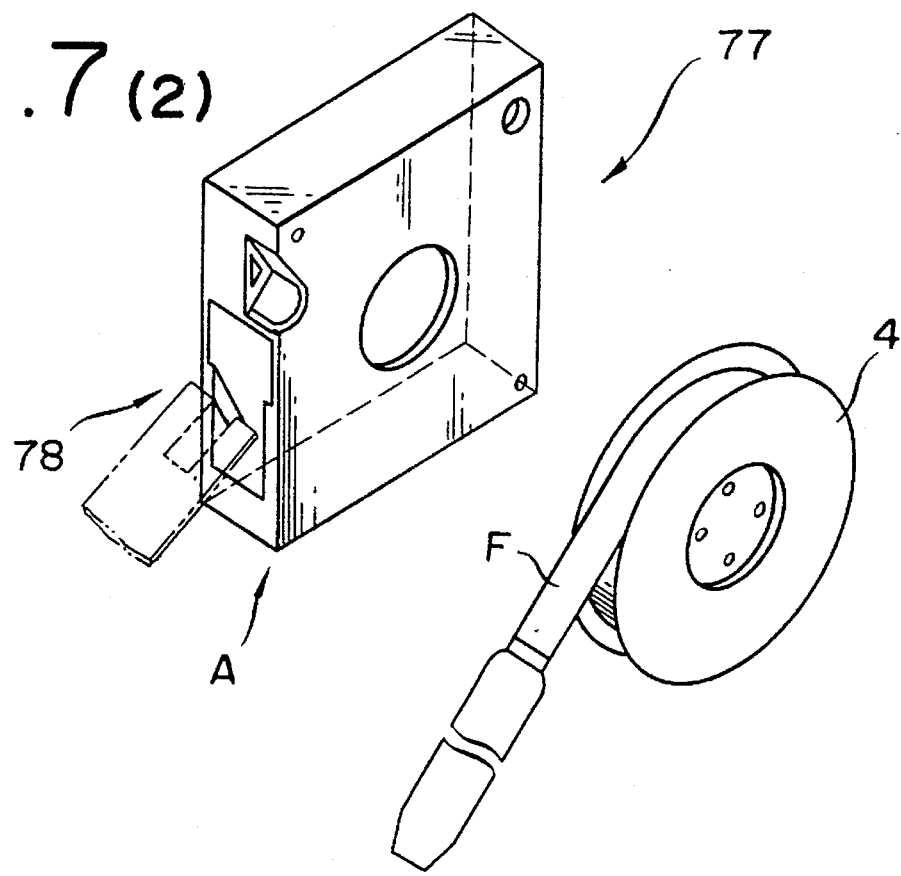

Incidentally, in the cartridge loader 21, the initial direction of the cartridge A in which this cartridge A was set in the cartridge container 24 before it was extracted by the loading mechanism 22 is different from the direction of the cartridge A in which this cartridge A is returned to the cartridge container 24 by the discharge mechanism 23. FIG. 7 is a perspective view illustrating the state in which the reel 4 is extracted from the cartridge A; FIG. 7(1) representing a cartridge of the type of ANSI specification and FIG. 7(2) a cartridge of the 3M type. Of course, the present embodiment can be applied equally effectively to both these two types of cartridge. When each cartridge A is initially set in the cartridge container 24, it is generally stored in the cartridge container 24 with a back label side 77 directed toward the foreground side and the opening side 78 toward the supply part 6 side of the roll film carrier 1 (in the state shown in FIG. 1). In the present embodiment, the cartridge A which has been returned to the cartridge container 24 is introduced into the cartridge container 24 in the reverse direction, namely in the direction in which the back label side 77 directed toward the supply part 6 side and an opening side 78 toward the foreground side.

In FIG. 1, the reference numeral "79" stands for a fifth switch for detecting the direction of the cartridge A to be loaded next. This fifth switch 79 is disposed at the indicated position opposite to the door 25 of the cartridge container 24 and is adapted to be turned OFF on the back label side 77 of the cartridge A and ON on the opening side 78 thereof. By the fifth switch 79 being turned ON, therefore, the fact that all the cartridges currently stored in the cartridge container 24 have been used is detected. It is because the cartridge A is moved and returned in the illustrated embodiment as follows that the cartridge A is reversely directed within the cartridge container 24 as described above. To be specific, the cartridge A which has been used is caught from the back label side 77 by the upper arm 64 and the lower arm 65 (FIG. 2) of the holder part 50 of the discharge mechanism 23 and then revolved thereby from the direction of M to the direction of L and then moved and returned into the cartridge container 24 by the extracting claw 71 of the extracting plate 51 as held fast at the terminal of the direction of J with the back label side 77 directed backwardly and the opening side 78 toward the foreground side.

In this cartridge loader 21, the loading path B with the loading mechanism 22 and the discharge path C with the discharge mechanism 23 are formed separately of each other (FIG. 1 and FIG. 2). More specifically, in this roll film carrier 1, the loading path B for newly loading the cartridge A of the microfilm F and the discharge path C for discharging the used cartridge A are formed separately of each other. Thus, the loading path B from the cartridge container 24 to the supply part 6 of the roll film carrier 1 and the discharge path C from the supply part 6 to the cartridge container 24 follow different routes which do not overlap each other at any point. In the bearings shown in FIG. 1, for example, the cartridge A is loaded from the foreground side and then discharged toward the lateral side and, therefore, the loading path B and the discharge path C do not overlap each other.

Figure 8:
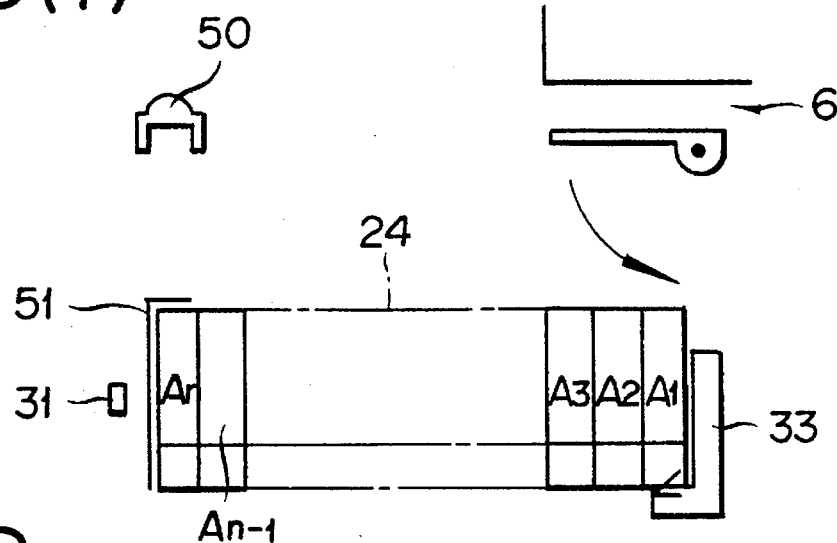
FIG. 8 is a schematic plan view for aiding in the illustration of the loading motion of a cartridge loader.
Figure 8:
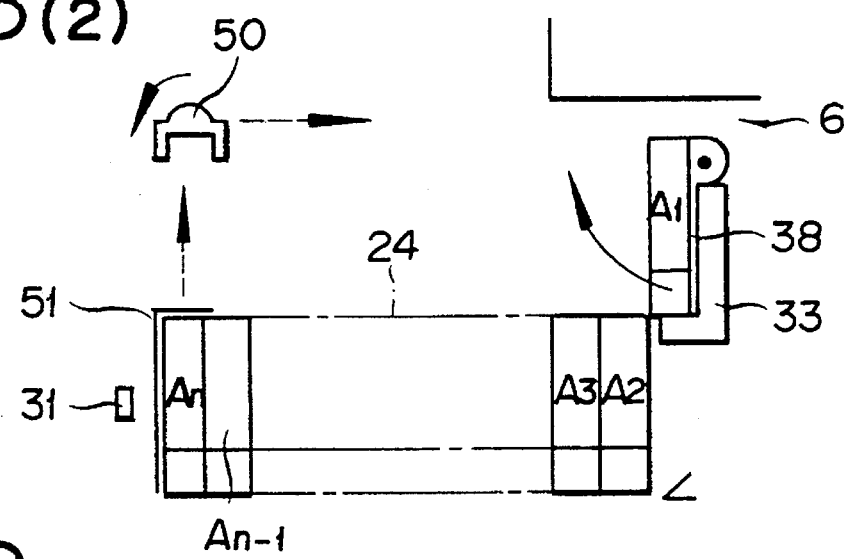
Figure 8:
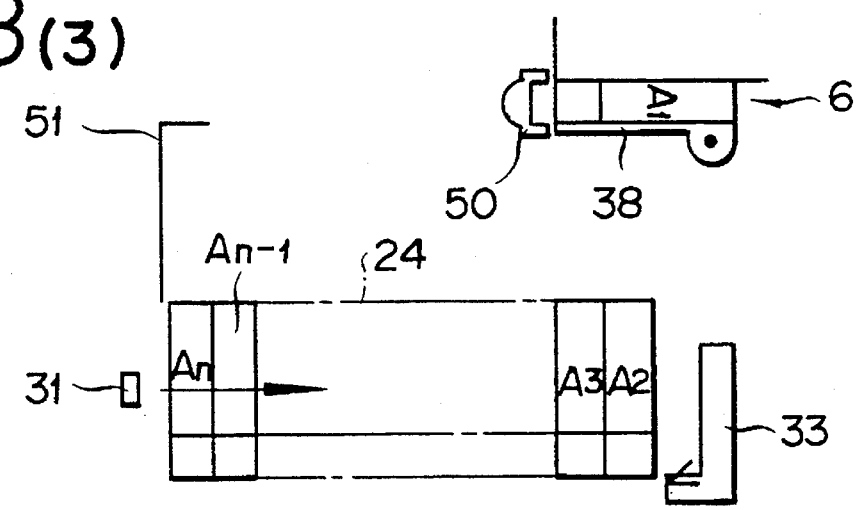
Figure 9:
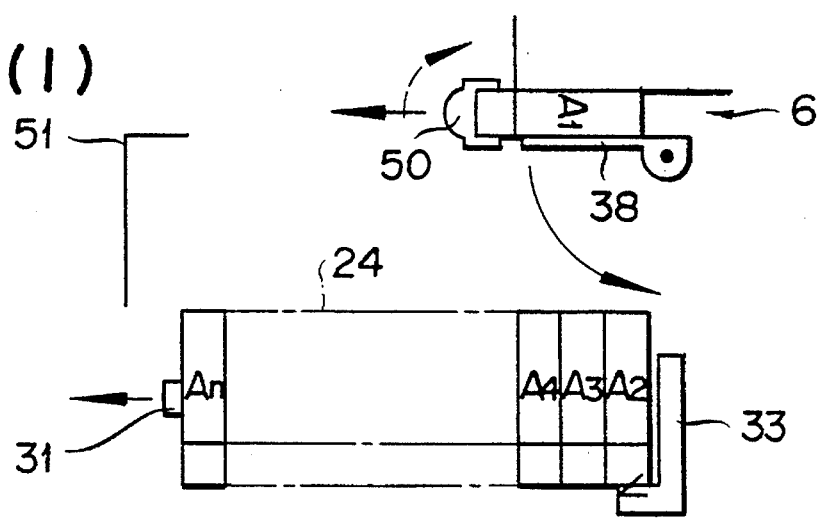
FIG. 9 is a schematic plan view for aiding in the illustration of the loading motion and discharging motion of a cartridge loader.
Figure 9:
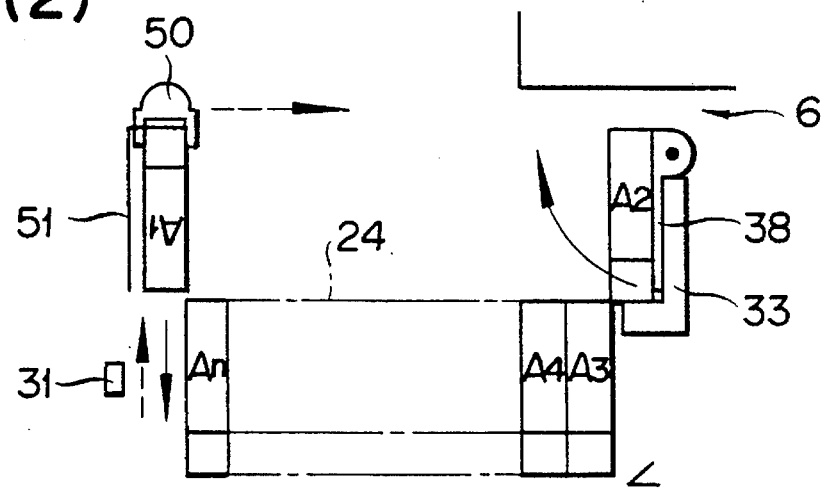
Figure 9:
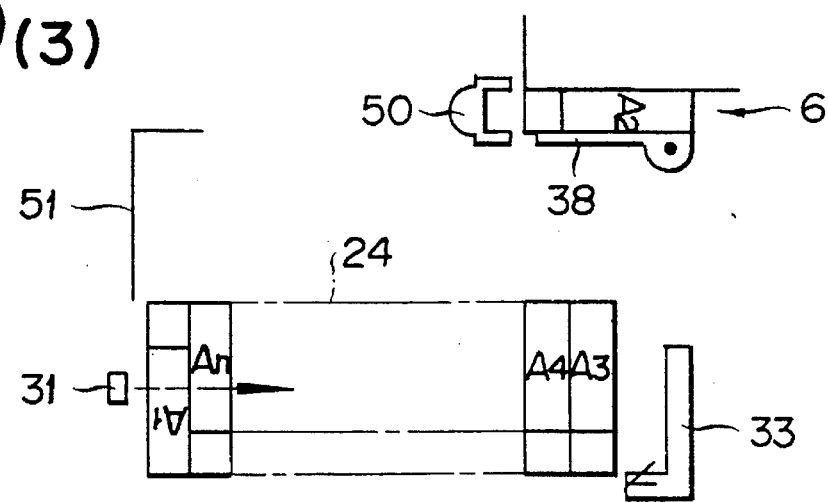
Figure 10:
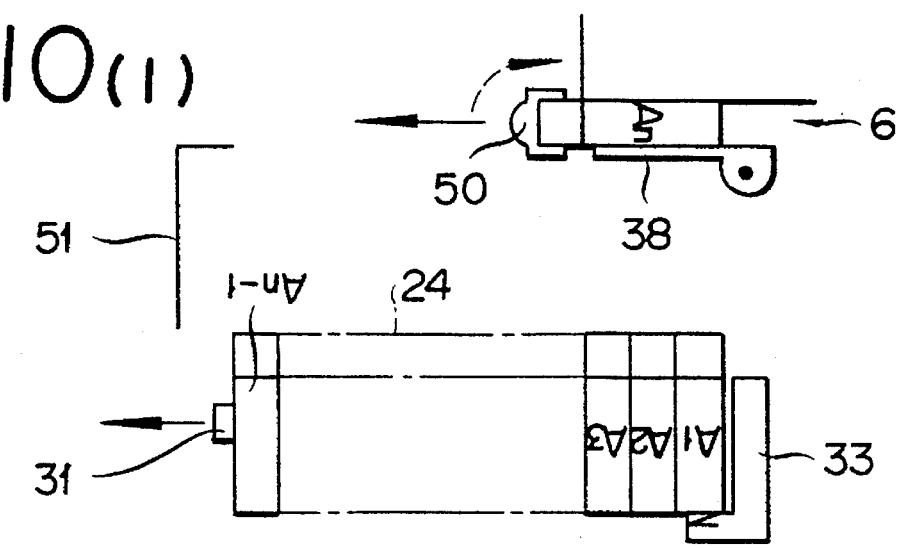
FIG. 10 is a schematic plan view for aiding in the illustration of the discharging motion of a cartridge loader.
Figure 10:
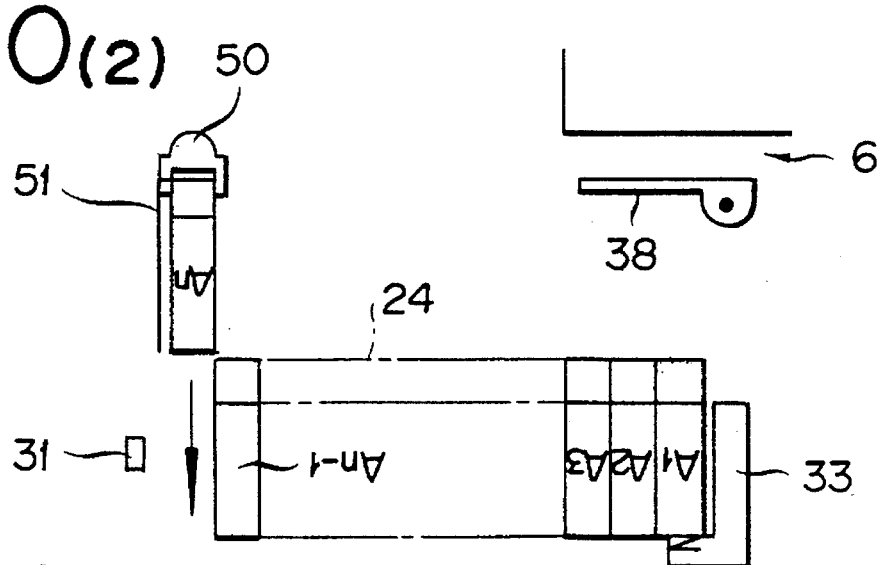
Figure 10:
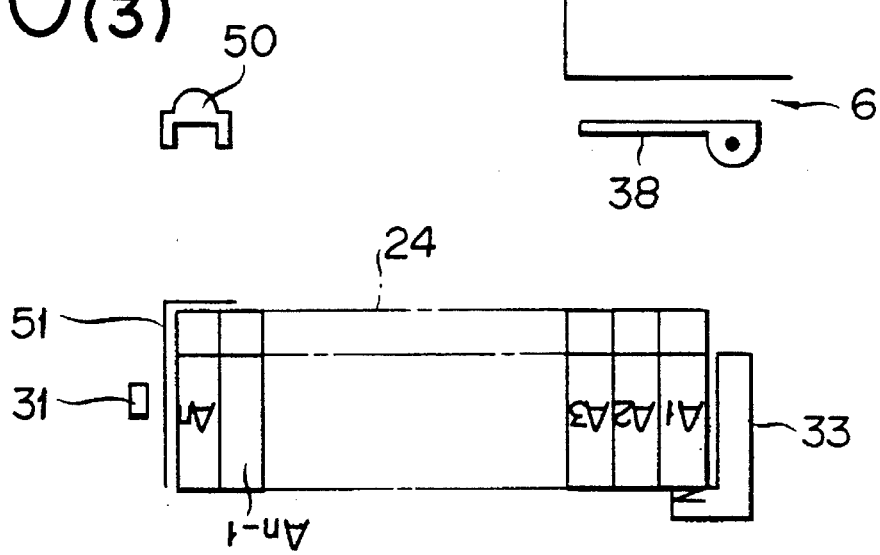
Figure 11:
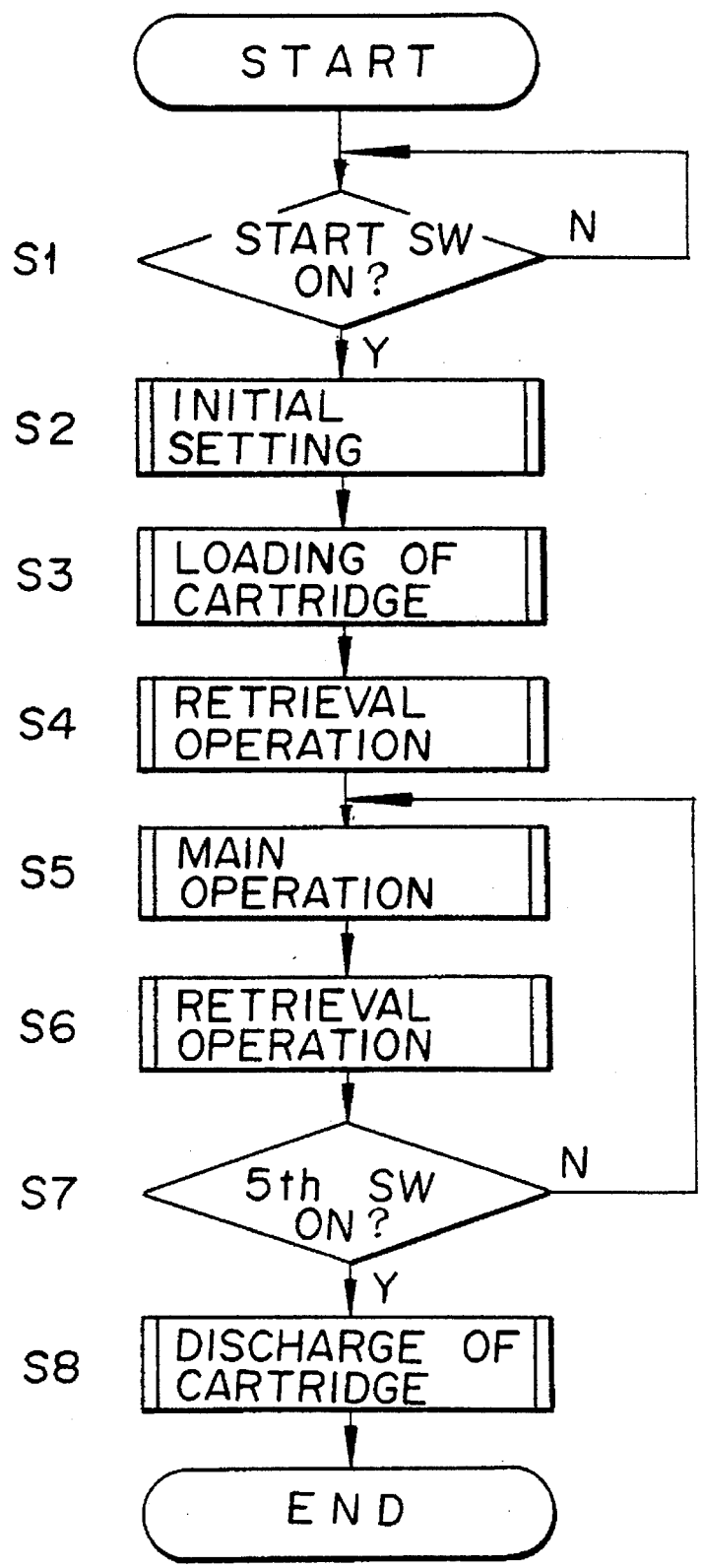
FIG. 11 is a flow chart illustrating the basic control of one preferred embodiment.

The present embodiment is constructed as described above and is operated as follows. FIG. 8, FIG. 9, and FIG. 10 are schematic plan views for aiding in the illustration respectively of the loading operation, the loading operation combined by the discharge operation, and the discharge operation by the use of the cartridge loader 21, etc; part (1) each thereof representing the initial stage, part (2) the stage of transfer, and part (3) the state of completion of the transfer. FIGS. 11, 12, 13, 14, 15, and 16 are flow charts of the control of the present embodiment; FIG. 11 representing the basic control and FIGS. 12 to 16 representing the relevant routines. Now, the operation of the present embodiment will be described below with reference to these diagrams.

First, the outline of the operation will be described with reference to FIG. 11. In the routine of FIG. 11, when the start switch is turned ON at Step S1, the initial setting is carried out at Step S2. The initial setting routine will be described more specifically afterward with reference to FIG. 12. After the initial setting is effected, the flow proceeds to Step S3 at which the first cartridge $A_1$ is loaded in the roll film carrier 1. The routine for the loading of this first cartridge $A_1$ will be described more specifically herein below with reference to FIG. 13 and FIG. 8. When the loading of the first cartridge $A_1$ carried out as described above is completed, the microfilm F stored in the cartridge $A_1$ is screened for retrieval at the next Step S4. This routine for retrieval will be described more specifically afterward with reference to FIG. 14. When the screening of the microfilm F of the first cartridge $A_1$ is completed, the flow proceeds to Step S5 for the main operation.

In the routine for the main operation, the discharge of the first cartridge $A_1$ and the loading of the second cartridge $A_2$ are carried out substantially simultaneously and parallelly. The detail of this operation will be described more specifically herein below with reference to FIG. 15 and FIG. 9. Then, at the next Step S6, the microfilm F of the second cartridge $A_2$ is screened for retrieval. The detail of this routine of screening is the same as that at Step S4 mentioned above and will be described more specifically afterward with reference to FIG. 14. The flow subsequently proceeds to Step S7, at which the decision as to whether the fifth switch 79 has been turned ON or not, namely whether all the cartridges A currently stored in the cartridge container 24 of the cartridge loader 21 have been screened for retrieval or not is made. When the decision falls on the negative side, the flow returns to Step S5 to repeat Steps S5, S6, and S7 and carry out the operations of discharge, loading, and screening on each of the cartridges A. When the fact that the fifth switch has been turned ON is detected at Step S7, the flow proceeds to the next Step S8, at which the last cartridge $A_n$ currently being loaded in the roll film carrier 1 is discharged and returned to the cartridge container 24. The cartridge loader 21 and others operate roughly as described above.

Now, the operation will be described in detail below. First, Step S2 of FIG. 11, namely the initial setting routine of FIG. 12, will be described. First, at Step S9 of FIG. 12, the decision as to whether the second switch 42 has been turned ON or not, namely whether the front surface part 38 of the supply part 6 of the roll film carrier 1 is located at the home position or the shutting position along the direction of H or not, is made (FIG. 1). When the decision at Step S9 falls on the negative side, the second motor 41 is set rotating in the normal direction at Step S10. When the fact that the second switch 42 is turned ON and the front surface part 38 is located at the initial position or the shutting position is detected at Step S9, the second motor 41 is stopped at Step S11. At the next Step S12, the decision as to whether the third switch 67 is turned ON or not, namely whether the holder part 50 is located at the initial position or the position at the terminal in the direction of J or not, is made (FIG. 2). When the decision at Step S12 falls on the negative side, the third motor 57 is set rotating in the normal direction at Step S13. When the fact that the third switch 67 is turned ON and the holder part 50 is located at the initial position is detected at Step S12, the third motor 57 is stopped at Step S14.

Further at the next Step S15, the decision as to whether the fourth switch 68 is turned ON or not, namely whether the holder part 50 is turned in the initial direction or the direction of L or not, is made (FIG. 2). When the decision at Step S15 falls on the negative side, the fourth motor 60 is set rotating in the reverse direction at Step S16. When the fact that the fourth switch 68 is turned ON and the holder part 50 is turned in the direction of L is detected at Step S15, the fourth motor 60 is stopped at Step S17. Thus, in the initial setting routine, the front surface part 38 and the holder part 50 are located and turned in the initial positions and initial directions mentioned above. Then, the flow returns to Step S3 of FIG. 11.

Figure 13:
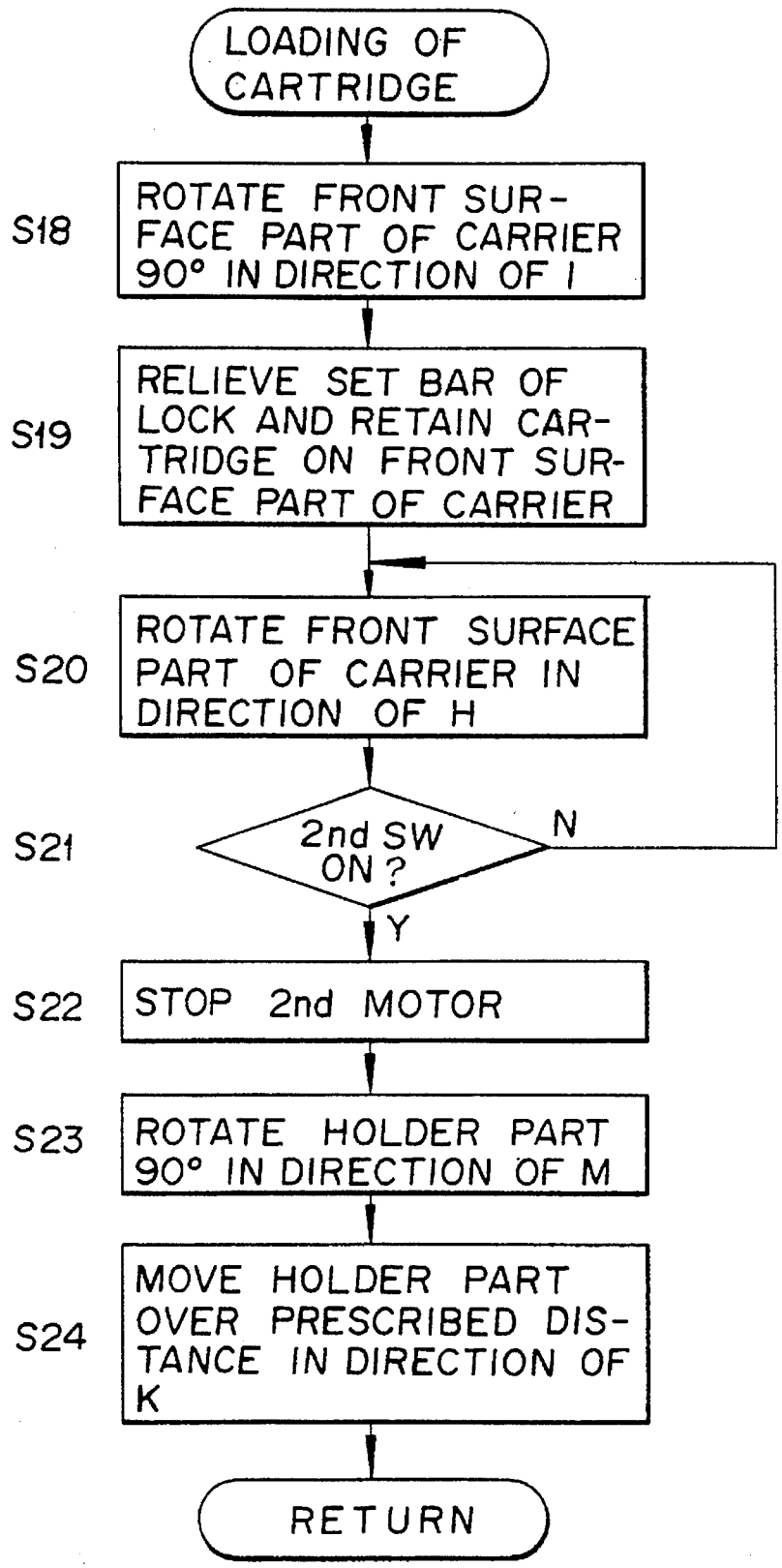
FIG. 13 is a flow chart illustrating the cartridge loading routine shown in FIG. 11.

Now, Step S3, namely the routine for loading the first cartridge $A_1$ by the loading mechanism 22 illustrated in FIG. 13, will be described below with reference to FIG. 8. First, at Step S18 of FIG. 13, the front surface part 38 of the supply part 6 of the roll film carrier 1 is revolved by 90 degrees toward the front from the shutting position as the initial position by the second motor 41 being rotated in the reverse direction [FIG. 8(1)] and consequently brought to the opening position along the direction of I. Then, at Step S19, the set bar 33 having the cartridge $A_1$ set thereon is relieved of the lock and moved from the cartridge container 24 side toward the front surface part 38 side. As a result, the cartridge $A_1$ is retained by the front surface part 38 [FIG. 8(2)]. Thereafter, at Step S20, the second motor 41 is set rotating in the normal direction and the front surface part 38 still retaining the cartridge $A_1$ is revolved in the direction of H. When the second switch 42 is turned ON at the next Step S21, the second motor 41 is stopped at Step S22. Consequently, the cartridge $A_1$ is positioned and loaded in the supply part 6 of the roll film carrier 1 [FIG. 8(3)]. At the same time, the set bar 33 is moved toward the cartridge container 24 side and again locked. The holder part 50 of the discharge mechanism 23, at Step S23, is turned in the direction of M by the fourth motor 60 being rotated in the normal direction and, at Step S24, moved to the terminal in the direction of K and set in a waiting state by the third motor 57 being rotated in the reverse direction [FIG. 8(2) and FIG. 8(3)]. At this time, in consequence of the motion of the holder part 50, the extracting plate 51 of the discharge mechanism 23 is moved to the terminal of the direction of N and locked there. Thus, in the routine for loading the cartridge $A_1$, the first cartridge $A_1$ is loaded by the loading mechanism 22 and, at the same time, the holder part 50 of the discharge mechanism 23 is set in the prescribed waiting state. Then, the flow is returned to Step S4 of FIG. 11.

Figure 14:
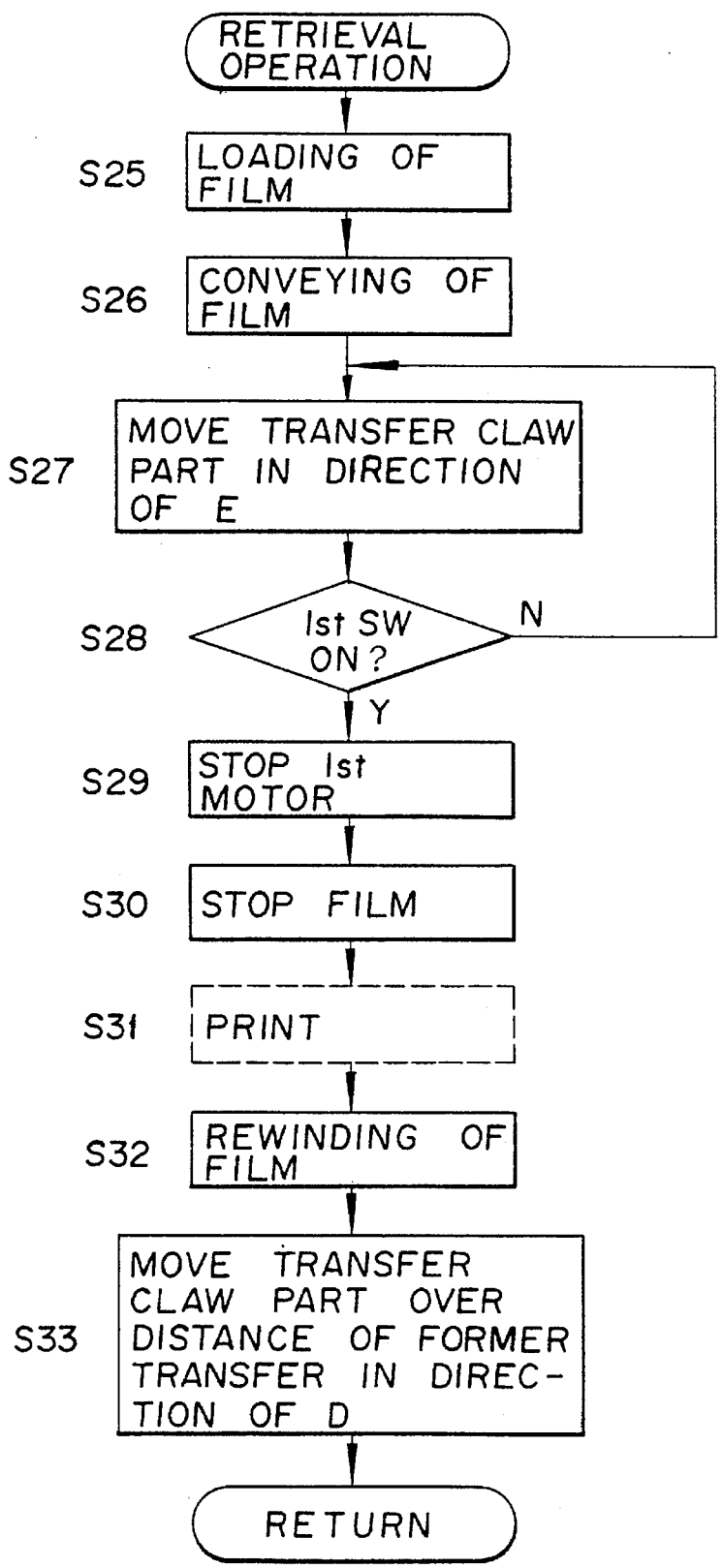
FIG. 14 is a flow chart illustrating the retrieving routine shown in FIG. 11.

Now, Step S4 of FIG. 11, namely the routine of screening for retrieval of FIG. 14 will be described below. First, by the roll film carrier 1 (FIG. 6), the microfilm F contained in the first loaded cartridge $A_1$ is subjected to loading at Step S25 of FIG. 14 and the microfilm F is fed out from the rewinding reel 4 to the take-up reel 5. Then, at Step S26, the microfilm is conveyed between the rewinding reel 4 and the take-up reel 5 and, in the meantime, the desired image information in the target frame is manually or automatically retrieved. In this while, at Step S27, the transfer claw part 31 of the loading mechanism 22 is moved in the direction of E and the cartridges A in the cartridge container 24 are moved in the direction of E in consequence of the rotation of the first motor in the normal direction. When the cartridge $A_2$ destined to be loaded next is set to the set bar 33 and the first switch 37 is turned on at Step S28, the first motor 36 is stopped at Step S29 [FIG. 8(3) and FIG. 9(1)].

When the desired image information in the target frame of microfilm is seized between the retaining glasses 2 and 3, the microfilm F being conveyed by the roll film carrier 1 is stopped at Step S30. Then, the image information is projected on the screen 20 for visual inspection or copied, when necessary, at Step S31. At Step S32, the microfilm F is rewound on the rewinding reel 4 from the take-up reel 5. After the microfilm F has been screened for retrieval and then rewound as described above, the transfer claw part 31 of the loading mechanism 22 is moved in the reverse direction of D by the same amount of transfer made formerly in the direction of E at Step S33 [FIG. 9(1)]. The amount of the motion thus made by the transfer claw part 31 in the direction of E is measured by a CPU or a counter and stored temporarily in a RAM. The motion of the transfer claw part 31 in the direction of D is made in an amount proportionate to the amount of transfer based on the memorized data by the first motor 36 being rotated in the reverse direction. Thus, in the retrieving routine, the microfilm F is subjected to the retrieving and copying steps and, at the same time, the transfer claw part 31 of the loading mechanism 22 is given the prescribed transfer. Then, the flow is returned to Step S5 of FIG. 11.

Figure 15:
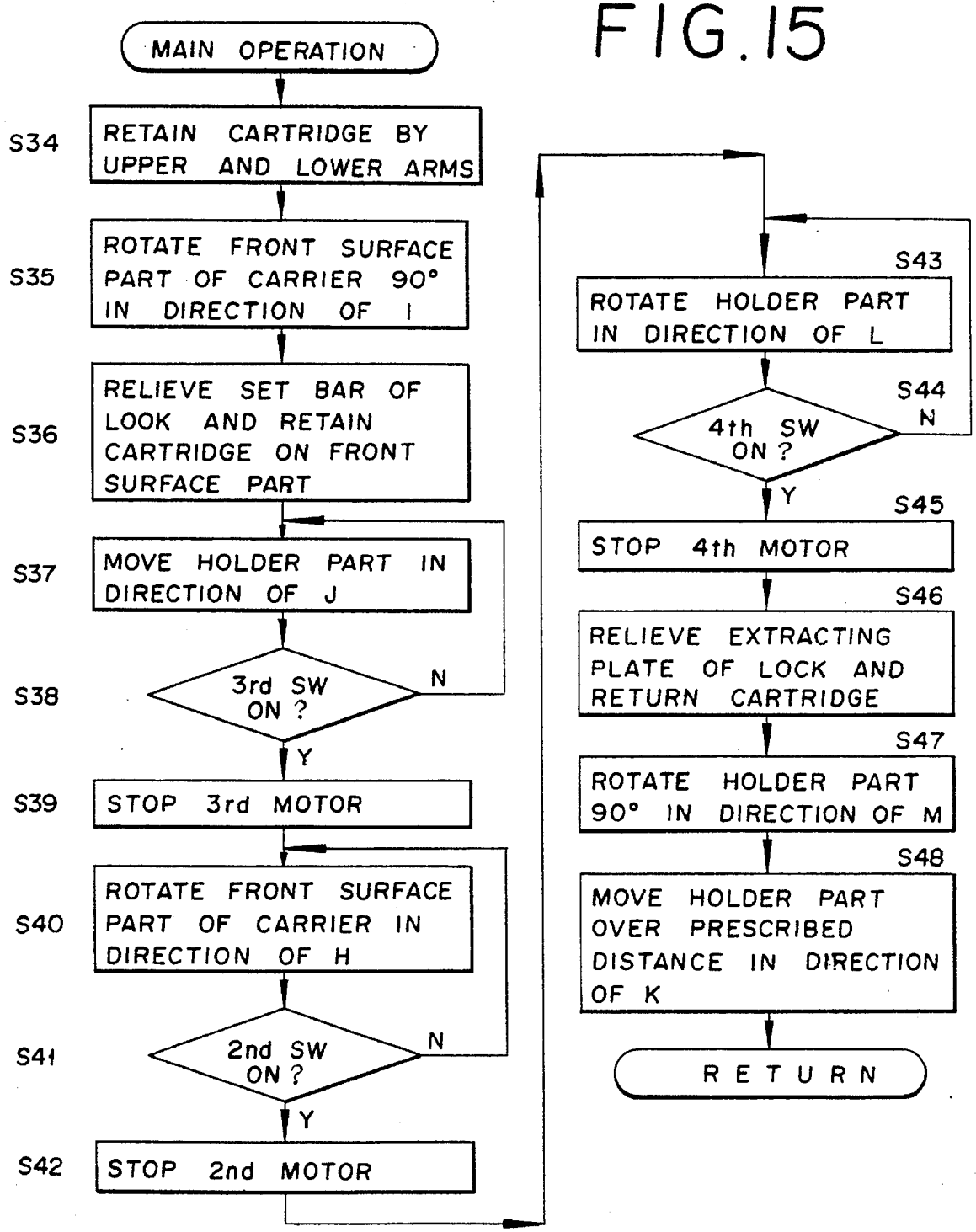
FIG. 15 is a flow chart illustrating the main operation routine shown in FIG. 11.

Now, Step S5 of FIG. 11, namely the routine of main operation of FIG. 15, will be described below with reference to FIG. 9. First, at Step S34 of FIG. 15, the solenoid 66 is turned ON and the cartridge $A_1$ which has been screened for retrieval and and has been remaining in the supply part 6 is retained by the upper arm 64 and the lower arm 65 of the holder part 50 of the discharge mechanism 23 kept in the waiting state [FIG. 9(1)]. Subsequently, at Step S35, the front surface part 38 of the supply part 6 is again revolved by 90 degrees in the direction of I from the shutting position to the opening position. At Step S36, the set bar 33 is relieved of the lock and the next cartridge $A_2$ is retained by the front surface part 38 [FIG. 9(1) and FIG. 9(2)]. At Step S37, the holder part 50 still retaining the cartridge $A_1$ is moved in the direction of J by the third motor 57 being rotated in the normal direction. When the holder part 50 is moved to the terminal of the direction of J, the third switch 67 is turned ON at Step S38. As a result, the third motor 57 is stopped at Step S39 [FIG. 9 (1)].

The front surface part 38 which has retained the next cartridge $A_2$ and assumed the opening position at Step S36 is revolved in the direction of H at the next Step S40 by the second motor 41 being rotated in the normal direction. When the second switch 42 is turned ON at Step S41, the second motor 41 is stopped at Step S42. As a result, the next cartridge $A_2$ is positioned and loaded in the supply part 6 of the roll film carrier 1 [FIG. 9(3)]. At the same time, the set bar 33 is moved toward the cartridge container 24 side and locked again there. Further, at Step S43, the holder part 50 is revolved in the direction of L by the fourth motor 60 being rotated in the reverse direction. When the fourth switch 68 is turned ON at Step S44, the fourth motor 60 is stopped at Step S45 [FIG. 9(2)].

Then, the flow proceeds to the next Step S46, at which the solenoid 66 is turned OFF and the retention of the cartridge $A_1$ is canceled and, at the same time, the extracting plate 51 of the discharge mechanism 23 is relieved of the lock. As a result, the extracting plate 51 still retaining the cartridge $A_1$ is moved in the direction of P to return the cartridge $A_1$ to the cartridge container 24. This cartridge $A_1$ is returned to the trailing end side of the cartridges A stored inside the cartridge container 24. This cartridge $A_1$ is returned in the direction opposite to the direction in which the cartridge A which is to be screened for retrieval [FIG. 9(2) and FIG. 9(3)]. The extracting plate 51 is subsequently moved to the terminal of the direction of N and locked there. In other words, at the next Step S47, the holder part 50 of the discharge mechanism 23 is revolved by 90 degrees and turned in the direction of M by the fourth motor 60 being rotated in the normal direction and, at Step S48, it is moved to the terminal of the direction of K and again set in the waiting state by the third motor 57 being rotated in the reverse direction [FIG. 9(3)]. In consequence of this motion of the holder part 50, the extracting plate 51 is moved to the terminal of the direction of N and locked there. In the routine for the main processing, the discharging and returning steps on the first cartridge $A_1$ and the loading step on the next cartridge $A_2$ are carried out substantially simultaneously and parallelly. Then, the flow returns to Step S6 of FIG. 11 for the screening for retrieval and then to Step S7. Thereafter, the operations of the aforementioned Steps S5, S6, and S7 are sequentially repeated on each of the cartridges A. Then, when the fifth switch 79 is turned ON at Step S7, the flow reaches Step S8.

Now, Step S38, namely the routine for the discharge of the cartridge $A_n$ illustrated in FIG. 16, will be described below with reference to FIG. 10. In this routine for the discharge of the cartridge $A_n$, the extraction from the supply part 6 of the roll film carrier 1 and the return to the cartridge container 24 are carried out on the cartridge $A_n$ which has been extracted last from the cartridge container 24 and loaded. The operation in this routine, unlike the operation in the main routine illustrated in FIG. 15, excludes the front surface part 38 of the supply part 6 from being opened or shut.

Figure 16:
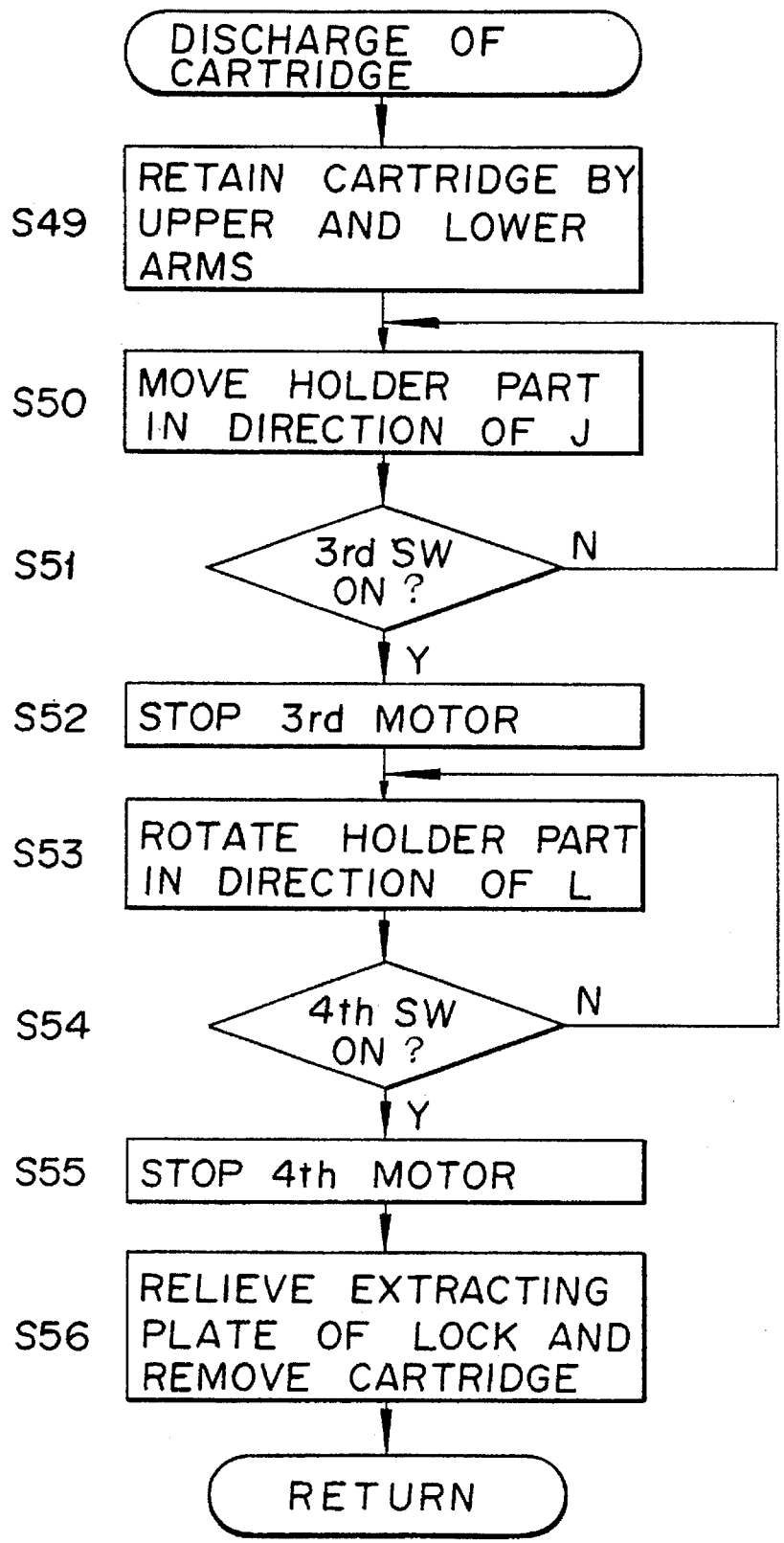
FIG. 16 is a flow chart illustrating the cartridge discharging routine shown in FIG. 11.

In this routine for the discharge of the cartridge $A_n$, first at Step S49 of FIG. 16, the solenoid 66 is turned ON and the last cartridge $A_n$ which has been screened for retrieval and has been remaining in the supply part 6 is retained by the upper arm 64 and the lower arm 65 of the holder part 50 of the discharge mechanism 23 kept in the waiting state [FIG. 10(1)]. Then, at the next Step S50, the holder part 50 still retaining the cartridge $A_n$ is moved in the direction of J by the third motor 57 being rotated in the normal direction. When the holder part 50 is moved to the terminal of the direction of J and the third switch 67 is turned ON at Step S51, the third motor 57 is stopped at Step S52 [FIG. 10(1)]. Thereafter, at Step S53, the holder part 50 is turned in the direction of L by the fourth motor 60 being rotated in the reverse direction. When the fourth switch 68 is turned ON at Step S54, the fourth motor 60 is stopped at Step S55 [FIG. 10(2)]. Then, the flow proceeds to the next Step S56, at which the solenoid 66 is turned OFF and the retention of the cartridge $A_n$ is canceled and, at the same time, the extracting plate 51 of the discharge mechanism 23 is relieved of the lock. As a result, the extracting plate 51 still retaining the cartridge $A_n$ is moved in the direction of P to return the cartridge $A_n$ to the cartridge container 24. This cartridge $A_n$ is returned to the trailing end of the cartridges A which have been used and already returned into the cartridge container 24. Further, this cartridge $A_n$ is returned in the direction opposite to the direction in which the cartridges A were stored prior to use [FIG. 10(2) and FIG. 10(3)].

In the manner described above, the screening for retrieval performed by the roll film carrier 1 is completed on all the cartridges A stored in the cartridge container 24 of the cartridge loader 21. The reader-printer which is furnished with the roll film carrier 1 and the cartridge loader 21 firstly allows a reduction in the time for interchange of cartridges A, secondly ensures facilitation of the jam treatment, and thirdly allows easy resolution of the question as to whether the cartridge A have been already used or not as described more specifically herein below.

Firstly, the time for the interchange of cartridges A is shortened. To be specific, in the roll film carrier 1 of the reader-printer and in the cartridge loader 21 attached to the reader-printer, the loading path B and the discharge path C for the cartridge A of the microfilm F are formed separately of each other without overlapping each other. In the illustrated embodiment, the loading path B starts from the direction of D to E, passes through the direction of F to G, and terminates in the direction of I to H as illustrated in FIG. 1, whereas the discharge path C starts from the direction of K to J, passes through the direction of M to L, and terminates in the direction of N to P as illustrated in FIG. 2. In other words, in this cartridge loader 21, the loading path B from the cartridge container 24 to the supply part 6 by the loading mechanism 22 incorporating therein the front surface part 38 of the supply part 6 on the roll film carrier 1 side and the discharge path C from the supply part 6 to the cartridge container 24 by the discharge mechanism 23 are formed separately of each other so as to follow two entirely different routes. As a result, in the roll film carrier 1 and the cartridge loader 21, the discharge of a cartridge A which has undergone the retrieving and copying steps and the loading of a new cartridge A to be subsequently subjected to the retrieving and copying steps are carried out substantially simultaneously and parallelly. Accordingly, the time for interchange of cartridges A is shortened, the discharge and loading of cartridges A are carried out quickly, and the retrieving and copying steps can be performed quickly on the microfilm F.

Secondly, the treatment of jam can be facilitated. To be specific, in the roll film carrier 1, if any jam occurs in the microfilm F, an access to the portion in trouble can be easily attained by opening the freely rotatable front surface part 38 of the supply part 6. Since the jam in the microfilm F can be easily mended, the roll film carrier 1 has no use for a shaft reset knob which has been an indispensable component for the conventional roll film carrier. Thus, the roll film carrier 1 of this invention excels in terms of cost.

Thirdly, the question as to whether the cartridge A has been already used or not can be easily resolved. To be specific, in this cartridge loader 21, the cartridge A of the microfilm F is extracted from the cartridge container 24 and loaded in the supply part 6 of the roll film carrier 1 by the loading mechanism 22 and, after the microfilm F has been screened for retrieval, the cartridge A is returned from the supply part 6 to the cartridge container 24 by the discharge mechanism 23. As respects the cartridges A stored in the cartridge container 24, the direction in which the cartridges A which have not yet undergone the retrieving and copying steps and are destined to be loaded in the supply part 6 are stored and the direction in which the cartridges A which have already undergone the retrieving and copying steps are stored are different. In the illustrated embodiment, the direction of unused cartridges A and that of used cartridges A are opposite to each other. Thus, only on the basis of these directions of cartridges A, the discrimination between the cartridges A which have already undergone the retrieving and copying steps and those which have not undergone the steps, namely between the used cartridges A and the unused cartridges A, can be easily attained. Moreover, this discrimination can be readily accomplished by providing the fifth switch 79, etc. for the illustrated embodiment and causing the cartridge A which is being returned to the cartridge container 24 to be turned by the discharge mechanism 23 in the direction opposite to the direction initially assumed. The discrimination between the used cartridges A and the unused cartridges A does not call for time and trouble. Further, since the discrimination can be attained without requiring microfilms to be loaded one by one by the use of the roll film carrier 1, it avoids consuming time exclusively for the purpose of this discrimination. Since the cartridges are not required to be specially fabricated for detection or the roll film carrier 1 is not required to be provided with a special mechanism for detection, the number of steps can be decreased and the construction can be simplified. Thus, the cartridge loading device excels in reliability of performance and cost. Since the discrimination between the used cartridges A and the unused cartridges A can be attained with ease, the retrieving and copying steps can be performed quickly on the microfilms F without entailing any obstacle.

Now, another embodiment of the invention which concerns the operation of the discharge mechanism 23 of the cartridge loader 21 will be described below.

The discharge mechanism 23 of the cartridge loader 21, as illustrated in FIG. 2, is composed of the holder part 50 and the extracting plate 51 and adapted to extract the used cartridge A from the supply part 6 and return them sequentially to the cartridge container 24. In the present embodiment, unlike the embodiment described above, when the holder part 50 is moved to the terminal of the direction of K and kept there in the waiting state, it is made to remain at this position in the state holding the used cartridge A by means of the upper arm 64 and the lower arm 65 thereof. The extracting plate 51 is connected with the wire member 73 to the arm retaining plate 58 of the holder part 50 and the extracting plate 51 and the holder part 50 are are adapted to be interlocked as follows. First, when the holder part 50 is moved to the terminal of the direction of K and kept there in the waiting state, the cartridge A is retained by the upper arm 64 and the lower arm 65 of the holder part 50 and the extracting plate 51 is positioned at the terminal of the direction of N. The extracting plate 51 at this position is urged by the interposed tensile spring 75 in the direction of P and, at the same time, locked by the lock claw 74 being fastened to the folded piece of the guide plate 76 (in the state shown in FIG. 2). Then, the holder part 50 kept in the waiting state while still retaining the used cartridge A is moved to the terminal of the direction of J and revolved in the direction of L without releasing the cartridge A. When the solenoid 66 is turned OFF and the retention of the cartridge A is canceled, the extracting plate 51 operates in the same manner as in the embodiment described above. To be specific, the extracting plate 51 is relieved of the lock by the push exerted by the projection 69 of the arm retaining plate 58 and the extracting plate 51 still retaining the cartridge A by means of the extracting claw 71 is moved by the tensile spring 75 along the guide plate 76 in the direction of P. By the motion of the extracting plate 51 produced as described above, the cartridge A is returned to the cartridge container 24 through the return mouth.

The control means for the cartridge loader 21 constructed as described above is illustrated in the block diagram of FIG. 24. The signals issuing from the first switch 37, the second switch 42, the third switch 67, the fourth switch 68, and the fifth switch 79 are inputted to a microcomputer MC as control means via a port T. The microcomputer MC output control signals corresponding to the aforementioned input signals respectively to the first motor 36, the second motor 41, the third motor 57, the fourth motor 60, and the solenoid 66 via the port T. By the microcomputer MC which is functioning as described above, the operations of the cartridge loader 21 are controlled so that the transfer claw part 31 and the set bar 33 in the loading mechanism 22, the front surface part 38 of the supply part 6 in the roll film carrier 1, and the holder part 50 and the extracting plate 51 in the discharge mechanism 23 are operated as described above.

Further, in the present embodiment, the control means or the microcomputer MC is adapted to effect the following controls on the cartridge loader 21. The cartridge A loaded by the loading mechanism 22 in the supply part 6 of the roll film carrier 1 is ready to be extracted after the microfilm F within the cartridge A has been screened for retrieval and rewound. In this cartridge loader 21, the retention of the cartridge A is effected by the holder part 50 of the discharge mechanism 23 before that cartridge A loaded in the supply part 6 is readied for extraction. In other words, the cartridge A being loaded is retained at a suitable time in the interval between the loading step and the rewinding step. This suitable time arrives, for example, immediately after the cartridge A has been loaded in the supply part 6 of the roll film carrier 1, during the step of loading in which the microfilm F in the loaded cartridge A is initially fed out, after this loading is completed, at the time that the final rewinding of the microfilm is started, or during the step of rewinding. At a varying suitable time mentioned above in the interval between the loading and the completion of the rewinding, a signal to produce a rotation in the normal direction is issued to the fourth motor 60 of the discharge mechanism 23, a signal to produce a rotation in the reverse direction to the third motor 57, and an ON signal to the solenoid 66 sequentially from the microcomputer MC. As a result, the holder part 50 of the discharge mechanism 23 revolves in the direction of M, moves to the terminal of the direction of K, closes the upper arm 64 and the lower arm 65, and takes hold of the cartridge A being loaded.

Figure 17:
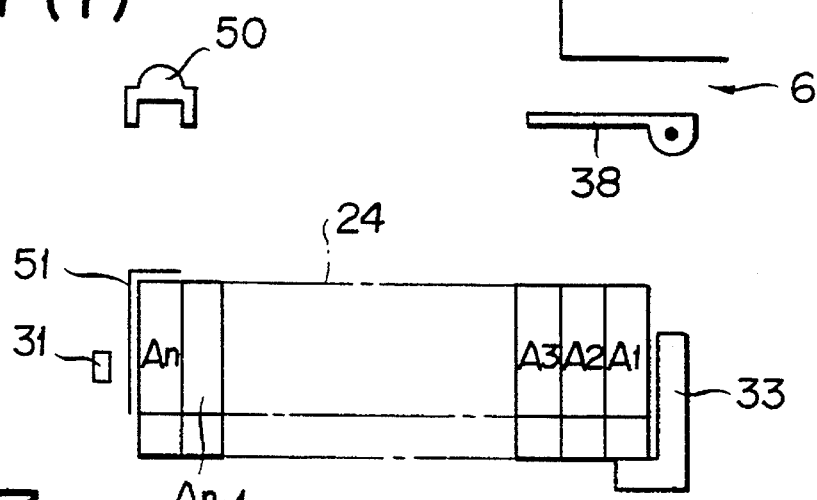
FIG. 17 is a schematic plan view for aiding in the illustration of the loading operation in another embodiment.
Figure 17:
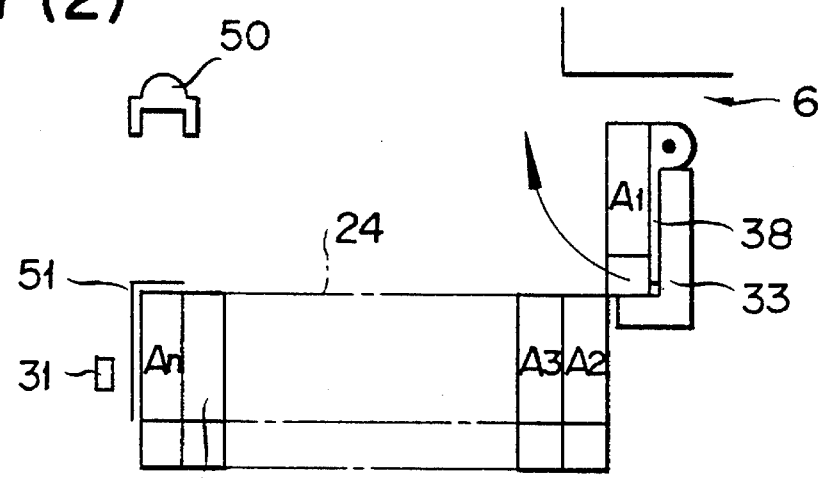
Figure 17:
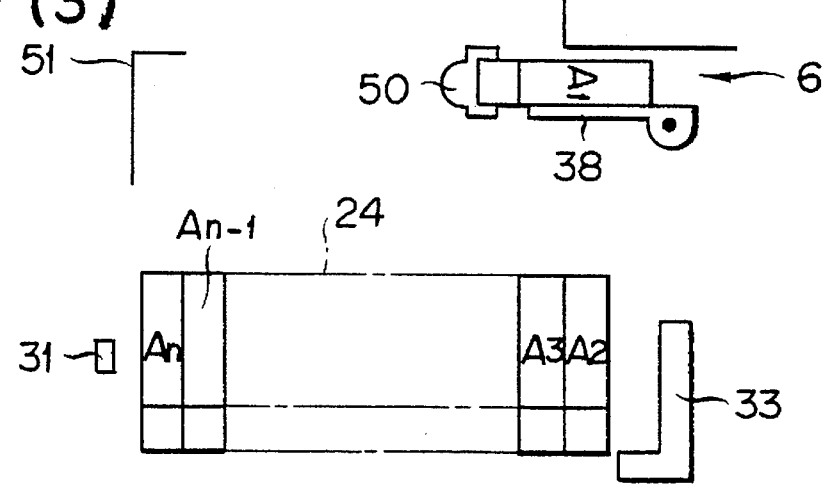
Figure 18:
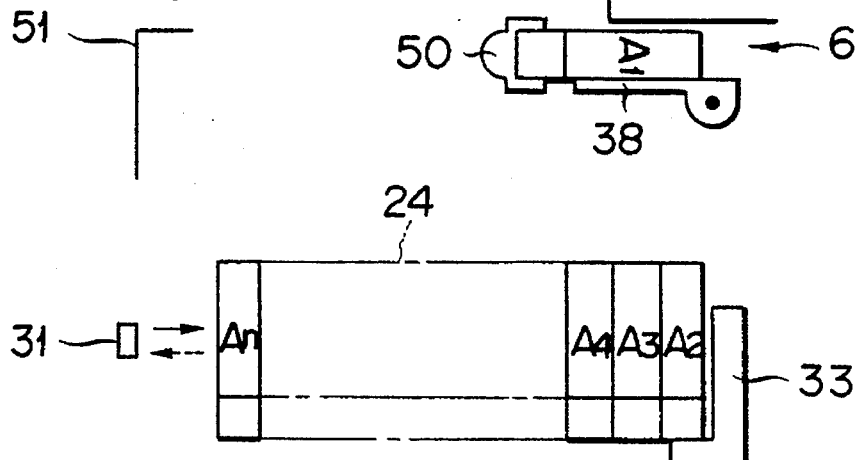
FIG. 18 is a schematic plan view for aiding in the illustration of the loading motion and discharging motion in another embodiment.
Figure 18:
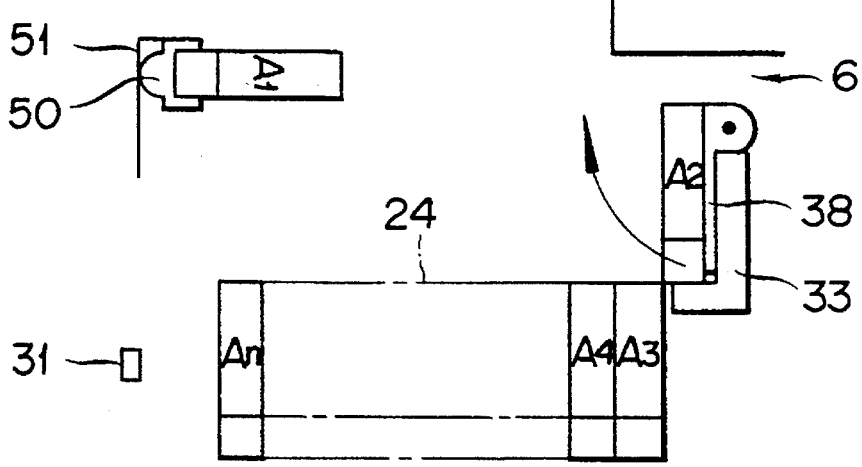
Figure 18:
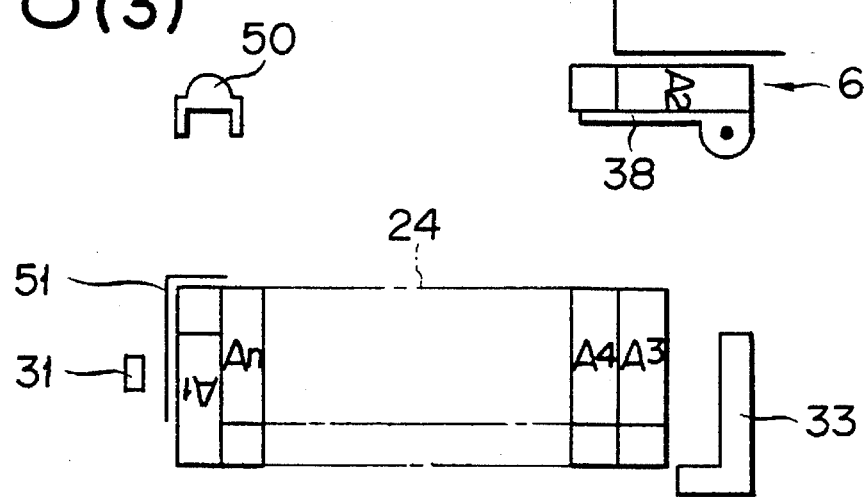
Figure 19:
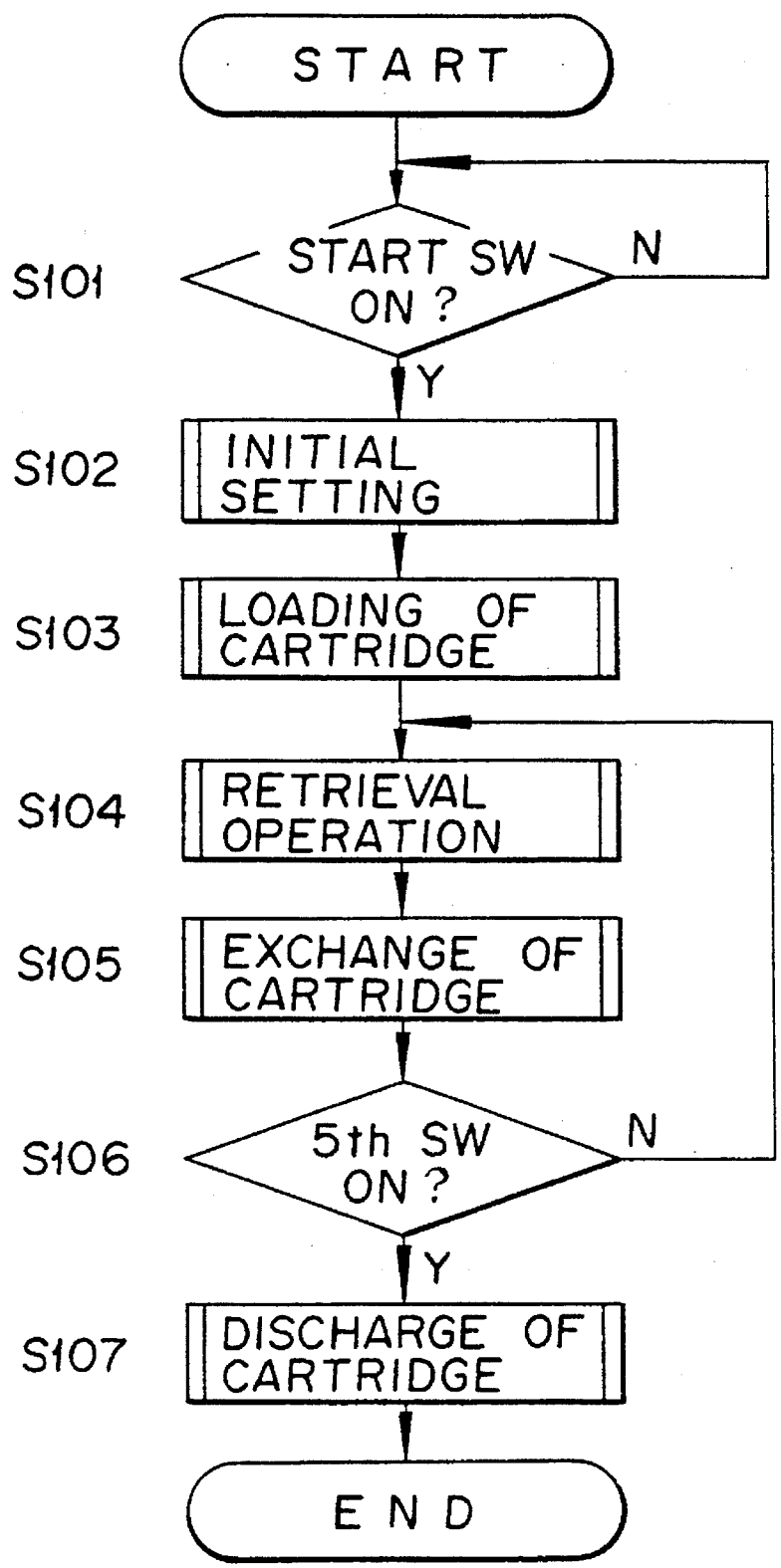
FIG. 19 is a flow chart illustrating the basic control of another embodiment.

The present embodiment is constructed as described above and is operated as follows. FIG. 17 and FIG. 18 are schematic plan views for aiding in the description of the loading operation and the combined loading and discharging operation to be performed by the cartridge loader 21, etc.;

part (1) each thereof representing the initial state, part (2) the stage of transfer, and part (3) the stage of completion. Since the discharging operation is identical with that illustrated in FIG. 10, preparation of a new diagram for illustration of this discharging operation will be omitted to avoid wasteful repetition. FIGS. 19, 20, 21, 22, and 23 are flow charts illustrating relevant controls effected in the present embodiment; FIG. 19 representing the basic control and FIGS. 20 to 23 representing specific routines involved accordingly. Since the initial setting routine in the present embodiment is identical to that illustrated in FIG. 12, preparation of a new diagram for illustration of the initial setting routine will be omitted to avoid repetition. Now, the operation of the present embodiment will be described below with reference to these diagrams.

First, the outline of the operations will be described below with reference to FIG. 19. When the start switch is turned ON at Step S101 of FIG. 19, the initial setting is carried out at Step S102. After the initial setting has been effected, the flow proceeds to Step S103, the loading of the first cartridge $A_1$ in the roll film carrier 1 is carried out. The routine for the loading of this first cartridge $A_1$ will be described more specifically afterward with reference to FIG. 20 and FIG. 17. After the loading of the first cartridge $A_1$ has been completed, the microfilm F contained in this cartridge $A_1$ is screened for retrieval at the next Step S104. The routine for this screening for retrieval will be described more specifically afterward with reference to FIG. 21, FIG. 17, and FIG. 18. After completion of the screening of the microfilm F of the cartridge $A_1$ for retrieval, the flow proceeds to Step S105.

At Step S105, the discharge of the first cartridge $A_1$ and the loading of the second cartridge $A_2$, namely the interchange of cartridges A, are carried out. The detail of this interchange will be described more specifically herein below with reference to FIG. 22 and FIG. 18. Then, the flow proceeds to Step S106, at which the question as to whether the fifth switch 79 has been turned on or not, namely whether the retrieving and other steps have been completed on all the cartridges currently stored in the cartridge container 24 of the cartridge loader 21 or not, is decided. When this decision falls on the negative side, the flow returns to Step S104 and the Steps S104, S105, and S106 are repeated to effect the steps of screening for retrieval, discharging, and loading on the cartridges A from the second cartridge $A_2$ onward. When the fact that the fifth switch 79 has been turned ON is detected at Step S106, the flow proceeds to the next Step S107, at which the last cartridge $A_n$ being loaded in the roll film carrier 1 is discharged and returned to the cartridge container 24. This operation will be described specifically afterward with reference to FIG. 23 and FIG. 10.

Figure 12:
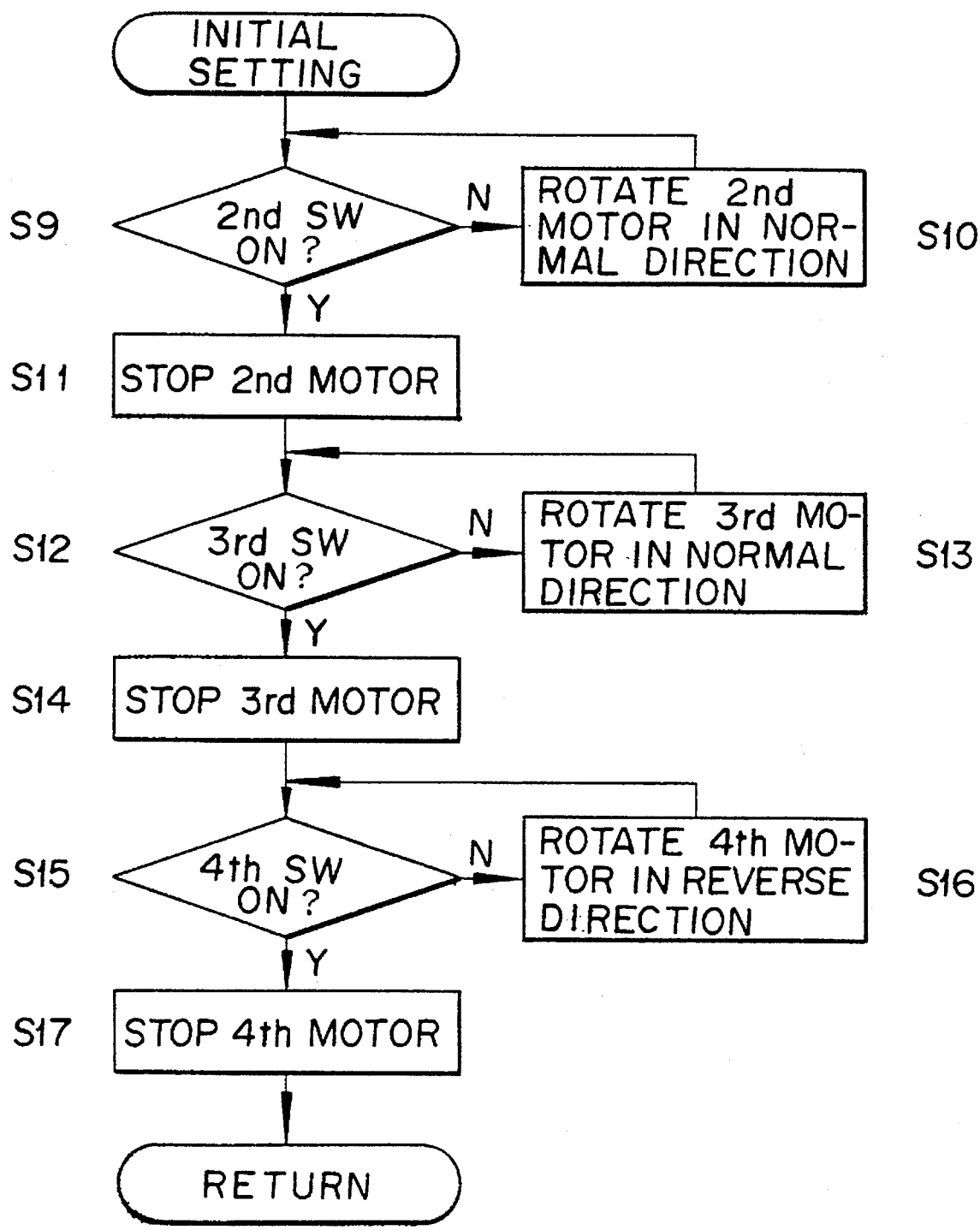
FIG. 12 is a flow chart illustrating the initial setting routine shown in FIG. 11.

The initial setting routine at Step S102 of FIG. 19 is identical to the initial setting routine of Steps S9 to S17 shown in FIG. 12 illustrating the preceding embodiment. In this initial setting routine, the front surface part 38 is set at the home position, namely the shutting position along the direction of H. The holder part 50 has the position thereof set at the home position, namely the position at the terminal of the direction of J and has the direction thereof set at the initial direction or the direction of L. Then, the flow returns to Step S103 of FIG. 19.

Then, Step S103 of FIG. 19, namely the routine for the loading of the first cartridge $A_1$ by the loading mechanism 22 illustrated in FIG. 20 will be described with reference to FIG. 17. The individual actions involved at Steps S117 to S121 in the routine are identical to those at Steps S18 to S22 illustrated in FIG. 13 and, therefore, will be omitted from the detail description to be given herein below. In brief, the front surface part 38 of the supply part 6 of the roll film carrier 1, at Step S117, is revolved from the state initially set as described above [FIG. 17(1)] by 90 degrees to the opening position along the direction of I. Then, at Step S118, the set bar 33 having the cartridge $A_1$ set thereon is relieved of the lock and moved toward the front surface part 38 side. As a result, the cartridge $A_1$ is retained by the front surface part 38. Thereafter, at Steps S119 to S121, the front surface part 38 still retaining the cartridge $A_1$ is revolved in the direction of H [FIG. 17(2)]. In consequence of this revolution, the cartridge $A_1$ is positioned and loaded in the supply part 6 of the roll film carrier 1. At the same time, the set bar 33 is moved toward the cartridge container 24 and again locked. Then, at the next Step S122, the roll film carrier 1 (FIG. 6) effects loading on the microfilm F stored in the first cartridge $A_1$ loaded as described above, with the result that the microfilm F is fed out from the rewinding reel 4 to the take-up reel 5. Thus, in the routine for loading the cartridge $A_1$, the first cartridge $A_1$ is loaded by the loading mechanism 22 and, at the same time, the microfilm F is loaded. Then, the flow returns to Step S104 of FIG. 19.

Figure 21:
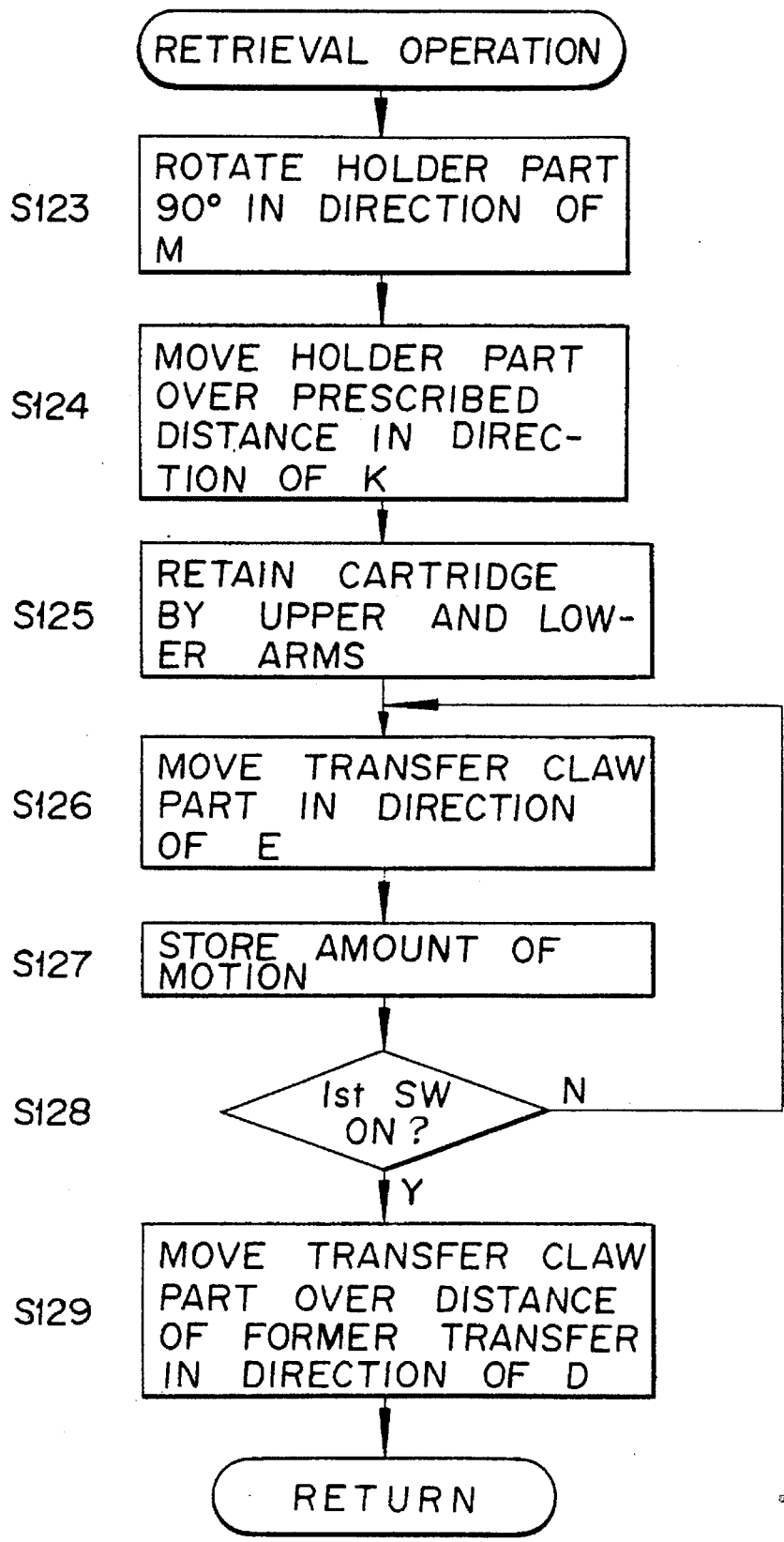
FIG. 21 is a flow chart illustrating the retrieving routine shown in FIG. 19.

Then, Step S104 of FIG. 19, namely the routine for screening for retrieval of FIG. 21, will be described below with reference to FIG. 17 and FIG. 18. At the time that the loading of the microfilm F in the first cartridge $A_1$ is completed, the flow proceeds to Step S123, at which the holder part 50 of the discharge mechanism 23 is turned in the direction of M by the fourth motor 60 being rotated in the normal direction and moved to the terminal of the direction of K by the third motor 57 being rotated in the reverse direction at Step S124. Further, at Step S125, the solenoid 66 is turned ON and the cartridge $A_1$ already loaded in the supply part 6 of the roll film carrier 1 by the upper arm 64 and the lower arm 65 of the holder part 50 is retained. The holder part 50 still retaining the cartridge $A_1$ is kept in the waiting state for a while. At this time, in consequence of the motion of the holder part 50, the extracting plate 51 of the discharge mechanism 23 is moved to the terminal of the direction of N and locked there [FIG. 17(3)].

Then, in the roll film carrier 1 (FIG. 6), the microfilm F is conveyed between the rewinding reel 4 and the take-up reel 5 and, in the meantime, the desired image information in the target frame is searched for manually or automatically. The microfilm F being conveyed in the roll film carrier 1 is stopped when the desired image information in the target frame is detected between the retaining glasses 2 and 3. The image information is projected on the screen 20 for visual inspection or copied when necessary.

Incidentally, while the screening of the microfilm F is being carried out in the roll film carrier 1 as described above, in the cartridge loader 21 at Step S126, the transfer claw part 31 of the loading mechanism 22 is moved in the direction of E and the cartridges A in the cartridge container 24 are moved in the direction of E by the first motor 36 being rotated in the normal direction. At Step S127, the amount of the motion produced by the transfer claw part 31 in the direction of E is measured by the CPU such as a microcomputer MC or a counter and temporarily stored as data in a RAM. Then at Step S128, the question as to whether the cartridge $A_2$ to be loaded next has been set on the set bar 33 or not is decided. When the decision falls on the negative side, the flow returns to the former Step S126. When the decision falls on the affirmative side, namely when the fact that the first switch 37 is turned ON and the cartridge $A_2$ is set on the set bar 33 is detected at Step S128, the flow proceeds to the next Step S129. At Step S129, the transfer claw part 31 is moved in the reverse direction of D in an amount proportionate to the amount of motion made formerly in the direction of E. The motion of the transfer claw part 31 in the direction of D is effected based on the data stored at Step S127 by the first motor 36 being rotated in the reverse direction in the amount proportionate to the amount of the motion [FIG. 18(1)]. Thus, in the routine for retrieval, the retrieving and copying steps are carried out on the microfilm F and, at the same time, the cartridge $A_1$ is retained by the holder part 50 of the discharge mechanism 23 and the transfer claw part 31 of the loading mechanism 22 is moved in the prescribed amount. Then, the flow returns to Step S105 of FIG. 19.

Now, Step S105 of FIG. 19, namely the routine for interchange of cartridges A illustrated in FIG. 22, will be described below with reference to FIG. 18. When the screening for retrieval performed on the microfilm F in the first cartridge $A_1$ is completed, this microfilm F is completely rewound on the rewinding reel 4 at Step S130. At Step S131, the front surface part 38 of the supply part 6 is revolved by 90 degrees in the direction of I from the shutting position to the opening position. At Step S132, the set bar 33 is relieved of the lock and the next cartridge $A_2$ is retained on the front surface part 38 [FIG. 18(2)]. The flow at this point is divided into a flow running from Step S133 onward and a flow running from Step S134 onward. After these two parallel processes have been completed, the flow returns to Step S106 of FIG. 19.

First, the processing from Step S133 onward will be described. The holder part 50 of the discharge mechanism 23 which retains the cartridge $A_1$ and enters into the waiting state at the former Step S125 is moved at Step S133 in the direction of J by the third motor 57 being rotated in the normal direction. When the holder part 50 moves to the terminal of the direction of J, the third switch 67 is turned ON at Step S135. As a result, the third motor 57 is stopped and the holder part 50 ceases its motion at Step S136 [FIG. 18(2)]. At the next Step S137, the holder part 50 is revolved in the direction of L by the fourth motor 60 being rotated in the reverse direction. When the fourth switch 68 is turned on at Step S138, the fourth motor is stopped at Step S139. Then, the flow proceeds to Step S140, at which the cartridge $A_1$ is relieved of the retention and, at the same time, the extracting plate 51 of the discharge mechanism 23 is relieved of the lock and the cartridge $A_1$ is returned to the cartridge container 24 similarly to Step S46 shown in FIG. 15. Similarly to the preceding embodiment, the cartridge $A_1$ is returned to the trailing end side of the cartridges A stored in the cartridge container 24 as turned in the direction opposite to the direction in which the unused cartridges A are stored [FIG. 18(3)]. The extracting plate 51 is subsequently moved to the terminal of the direction of N and locked there.

Now, the processing from Step S134 onward which is carried out parallelly with the processing of the holder part 50 of the discharge mechanism 23 described above will be described. At the former Step S132, the front surface part 38 retaining the next cartridge $A_2$ and located at the opening position is revolved in the direction of H in the state still retaining the cartridge $A_2$ at Steps S134, S141, and S142. As a result, the next cartridge $A_2$ is positioned and loaded in the supply part 6 of the roll film carrier 1 [FIG. 18(3)]. At the same time, the set bar 33 is moved toward the cartridge container 24 and locked again. Then, at the next Step S143, the microfilm F in the newly loaded cartridge $A_2$ is fed out of the rewinding reel 4.

The flow from Step S133 onward and the flow from Step S134 onward are made to proceed parallelly. When they are completed, the flow are returned. Thus, in the interchange routine, the discharge and return of the first cartridge $A_1$ and the loading of the next cartridge $A_2$ are carried out simultaneously and parallelly. Then, the flow returns to Step S106 of FIG. 19. Subsequently, the operations of Steps S104, S105, and S106 mentioned above are sequentially repeated on each the cartridges A, to effect the screening for retrieval, the interchange of cartridges A, and the return of used cartridges A to the container 24. Then, when the fifth switch 79 is turned ON at Step S106, the flow proceeds to Step S107.

Incidentally, the cartridges A starting from the cartridge $A_2$ and terminating in the last cartridge $A_n$ are severally subjected to the following operations and eventually retained by the holder part 50. In short, each of the cartridges $A_2$ to $A_n$ is loaded on the roll film carrier 1 and then the loading of the microfilm F is completed at Step S143. Parallelly with this process, the immediately preceding cartridge A which has been already loaded is discharged by the holder part 50 and is then returned to the cartridge container 24 at Step S140. Thereafter, the cartridges A are retained by the holder part 50 at Steps S123, S124, and S125. To be specific, the holder part 50 is turned in the direction of M and moved to the terminal of the direction of K. It then causes the upper arm 64 and the lower arm 65 thereof to take hold of the cartridge A which has been loaded in the roll film carrier 1 and is in the process of screening the microfilm F for retrieval. Then, the holder part 50 continues to retain the cartridge A and remain in the waiting state until the screening for retrieval is completed and the rewinding at Step S130 is completed.

Finally, Step S107, namely the routine for discharge of the cartridge $A_n$ shown in FIG. 23, will be described below with reference to FIG. 10. In this routine for the discharge of the cartridge $A_n$, the finally loaded cartridge $A_n$ is discharged from the supply part 6 and returned to the cartridge container 24. The operation in this routine, unlike the operation in the routine for interchange of cartridges A shown in FIG. 22, avoids opening and shutting the front surface part 38 of the supply part 6.

Figure 22:
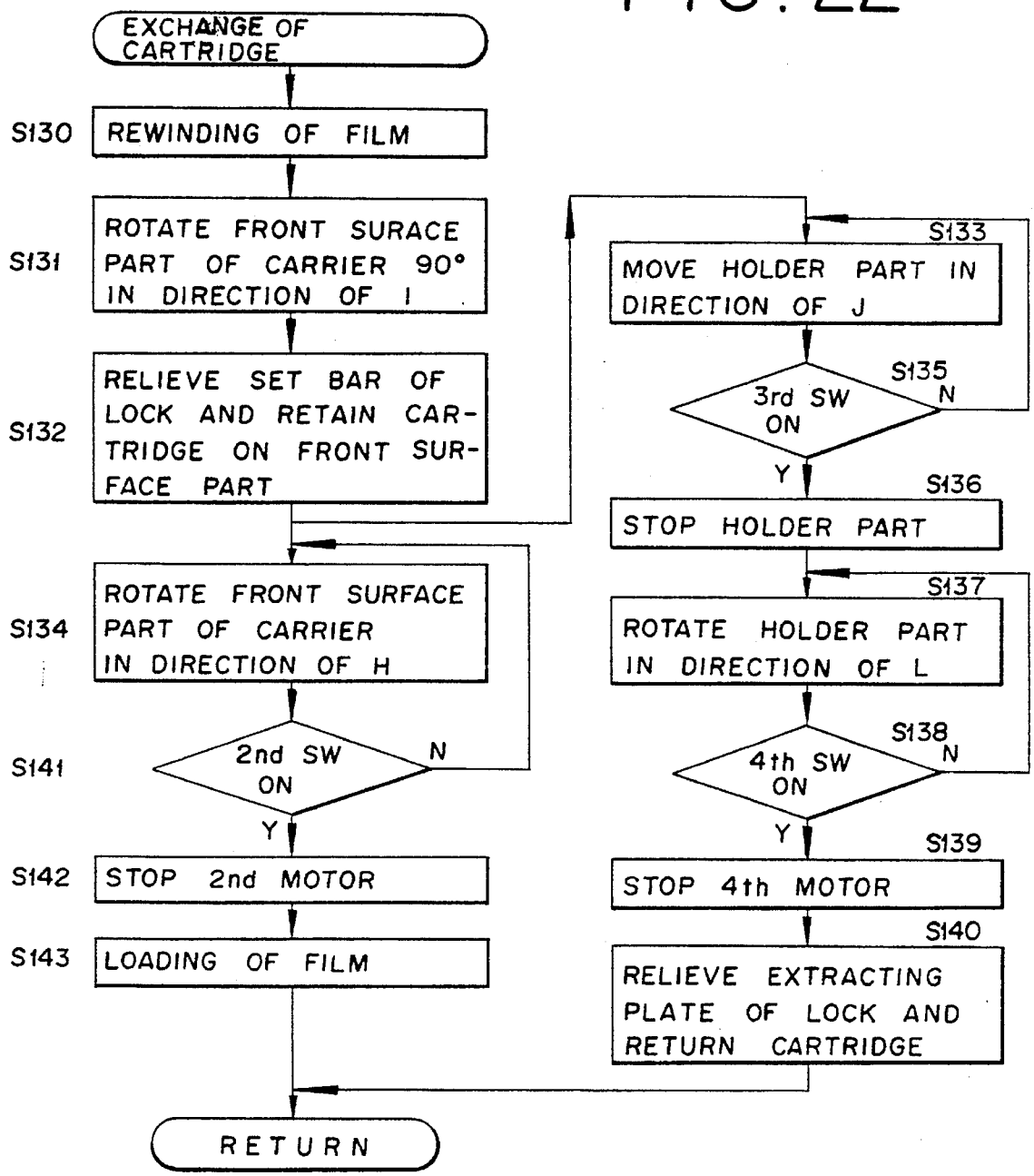
FIG. 22 is a flow chart illustrating the cartridge interchange routine shown in FIG. 19.
Figure 23:
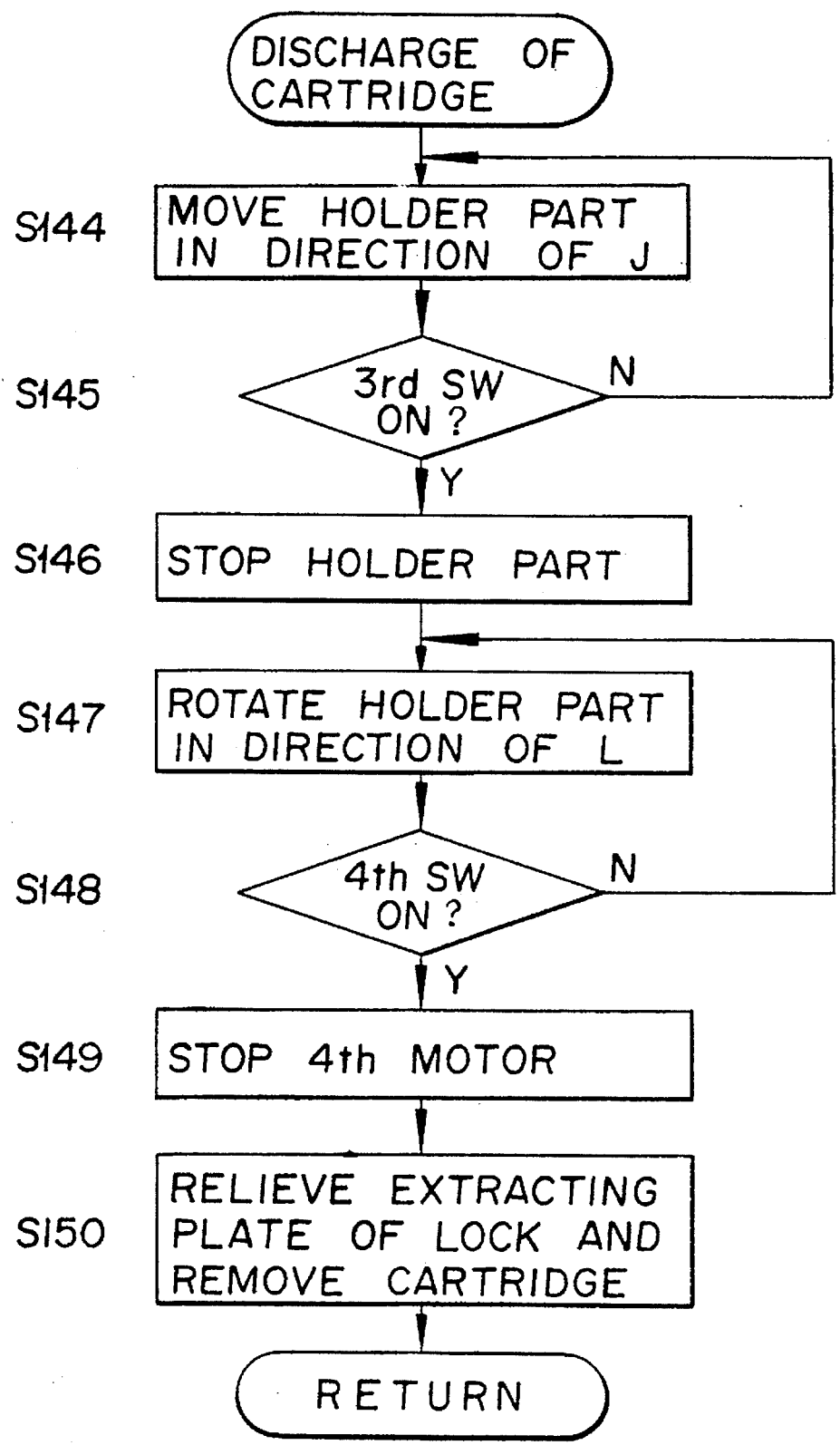
FIG. 23 is a flow chart illustrating the cartridge discharge routine shown in FIG. 19.

In this routine for the discharge of the cartridge $A_n$, first the operation similar to that performed at Steps S133 to S135 shown in FIG. 22 is carried out at Steps S144 to S146 of FIG. 23. In other words, the holder part 50 of the discharge mechanism 23 which still retains the last cartridge $A_n$ remaining in the supply part 6 and continues to remain in the waiting state is moved in the direction of J and stopped at the terminal of the direction of J [FIG. 10 (1)]. At the next Steps S147 to S149, the operation similar to that performed at Steps S137 to S139 of FIG. 22 is carried out. Thus, the holder part 50 is revolved in the direction of L and is stopped as turned in the direction of L [FIG. 10(2)]. Then, the flow proceeds to Step S150, at which the cartridge $A_n$ is relieved of the retention, the extracting plate 51 of the discharge mechanism 23 is relieved of the lock, and the cartridge $A_n$ is returned to the cartridge container 24. Similarly to the embodiment mentioned above, the cartridge $A_n$ is returned to the trailing end of the cartridges A which have been already used and returned to the cartridge container 24. Further, this cartridge $A_n$ is returned as turned in the direction opposite to the direction in which the cartridges A were stored prior to use [FIG. 10(3)].

In the manner as described above, the screening for retrieval performed by the roll film carrier 1 is carried out an all the cartridges A stored in the cartridge container 24 of the cartridge loader 21. Here, the holder part 50 of the discharge mechanism 23 of the cartridge loader 21 is controlled by the microcomputer MC as the control means so as to retain the cartridge A loaded in the supply part 6 and remain in the waiting state before the retrieving and rewinding steps are completed on the microfilm F in the cartridge A loaded in the roll film carrier 1, namely before the cartridge A is used and readied for removal. To be specific, at the suitable times mentioned above, prescribed drive signals are issued to the fourth motor 60, the third motor 57, the solenoid 66, etc. of the discharge mechanism 23. The first cartridge $A_1$ is retained by the holder part 50 at the time that the loading is completed. The subsequent cartridge A is retained by the holder part 50 after the immediately preceding cartridge is returned to the cartridge container 24 and during the screening for retrieval which immediately follows the return of the preceding cartridge. The reader-printer furnished with the cartridge loader 21 which is constructed as described above firstly allows a reduction in the time for interchange of cartridges A and secondly prevents the cartridge A being loaded from vibration.

Firstly, the reader-printer decreases the time necessary for interchange of cartridges A. To be specific, at the time that the retrieving and rewinding steps performed on the microfilm F in the cartridge A are completed, the holder part 50 of the discharge mechanism 23 which has already retained the cartridge A and has remained in the waiting state immediately extracts the used cartridge A and, at the same time, the loading mechanism 22 immediately starts loading the next cartridge A. Since the interchange of cartridges A can be carried out as soon as the retrieving and rewinding steps are completed, the time to be spent in interchanging cartridges A can be shortened. As a result, the cartridges A are quickly discharged and loaded and the operation of screening the microfilm F for retrieval and the operation of copying the image information retrieved from the microfilm F are notably expedited.

Secondly, since the cartridge A being loaded by the roll film carrier 1 is retained by the holder part 50 until it is extracted, the otherwise possible vibration of the cartridge A within the roll film carrier 1 can be precluded. As a result of the prevention of the vibration, the various properties of the roll film carrier 1 can be improved. The cartridge A is prevented from the vibration so long as it is retained by the holder part 50. The retention of the cartridge A by the holder part 50, therefore, is desired to be attained at the earliest possible time such as immediately after the cartridge A is loaded.

Incidentally, in the illustrated embodiment, the first cartridge $A_1$ is retained at the time that the loading of the microfilm F is completed and the subsequent cartridges $A_2$ to $A_n$ are retained during the screening of the microfilm F for retrieval respectively by the holder part 50 of the discharge mechanism 23 of the cartridge loader 21. As already pointed out, the timing for the retention of the cartridges by the holder part 50 is not restricted in the present embodiment. In other words, the retention of the loaded cartridges A may be effected at a suitable time between the time the microfilm F is loaded and screened for retrieval and the time the microfilm F is rewound. The retention of the cartridges A by the holder part 50 is only required to be carried out at least before the rewinding of the cartridge A is completed.

Then, still another embodiment of this invention will be described below.

The roll film carrier 1 is constructed as illustrated in FIG. 6 and is provided with reel drive means as means for handling the microfilm F. The reel drive means are provided severally for the rewinding reel 4 and the take-up reel 5. The reel drive means are severally furnished with motors (not shown) connected to the drive shafts 14 and 15. The rewinding reel 4 is attached to the drive shaft 14 and the takeup reel 5 to the drive shaft 15. By these motors being severally driven, the microfilm F is taken up and rewound.

Figure 26:
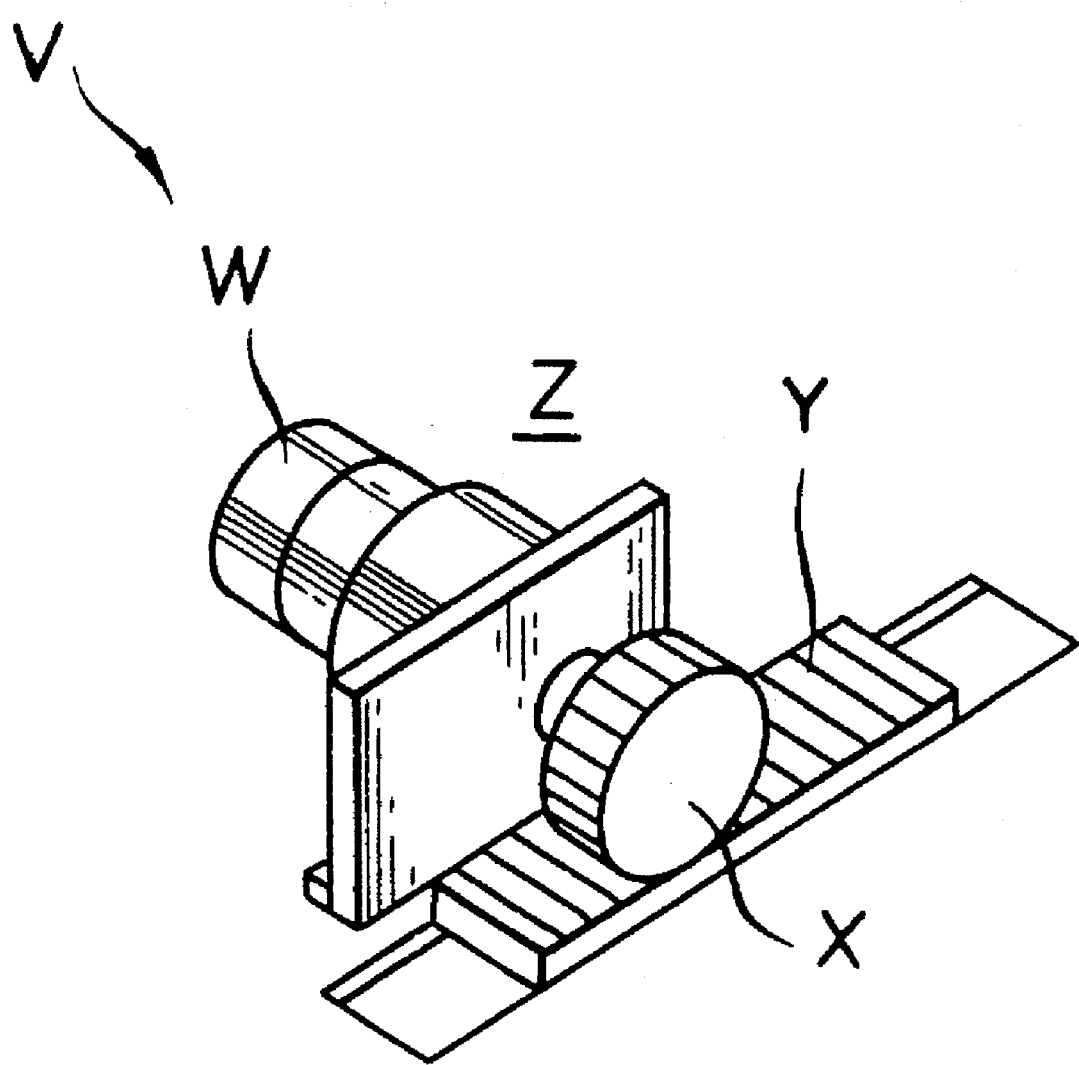
FIG. 26 is a perspective view illustrating the essential part of the moving means for performing a vertical scan.

The roll film carrier 1 as a whole is endowed with a slight freedom of motion for the purpose of performing a vertical scan. FIG. 26 illustrates transfer means V provided for the roll film carrier 1 for the purpose of the vertical scan. When the roll film carrier 1 is located at the home position, the optical axis for projection falls on the central line of the roll microfilm F along the longitudinal direction of the film and roll film carrier 1 is located at the standard position for performing the work of loading and returning the cartridge in cooperation with the cartridge loader 21. The transfer means V, for the purpose of effecting the vertical scan which produces a vertical motion of the image of the microfilm F in the loaded cartridge A, is adapted to impart a slight displacement to the roll film carrier 1 from the home position thereof. The transfer means V of this principle is provided, for example, with a stepping motor W disposed on the roll film carrier 1 side, a pinion X connected to the drive axis of the stepping motor W, and a rack Y meshed with the pinion X and fixed along the longitudinal direction (the direction perpendicular to the paper surface containing FIG. 6) of the main body side. In the diagram, the reference symbol "Z" stands for a frame plate on the roll film carrier 1 side.

If images to be recorded by photography in the frames of the microfilm F deviate in position in the vertical direction, the corresponding images projected on the screen 20 are caused to deviate proportionately in the vertical direction owing to the positional deviation of the recorded images. The vertical scan for correcting the positional deviation of the images is carried out as follows. First, the stepping motor W is rotated in the normal or reverse direction and the pinion X is rotated. The rotating pinion X is meshed with the rack Y fixed on the main body side of the apparatus and, at the same time, moved as guided by the rack Y. As a result, the roll film carrier 1 in its entirety is moved from the home position in the longitudinal direction by a prescribed amount relative to the main body of the apparatus. When the vertical scan is carried out, the roll film carrier 1 deviates from the home position. The optical axis of projection in the bundle of rays illuminating an image of the microfilm F (FIG. 6), therefore, deviates from the central line of the film and, at the same time, the roll film carrier 1 deviates from the standard position thereof for performing the works of loading and returning the cartridge A in cooperation with the cartridge loader 21. The vertical scan of the roll film carrier 1 is carried out as described above.

Figure 25:
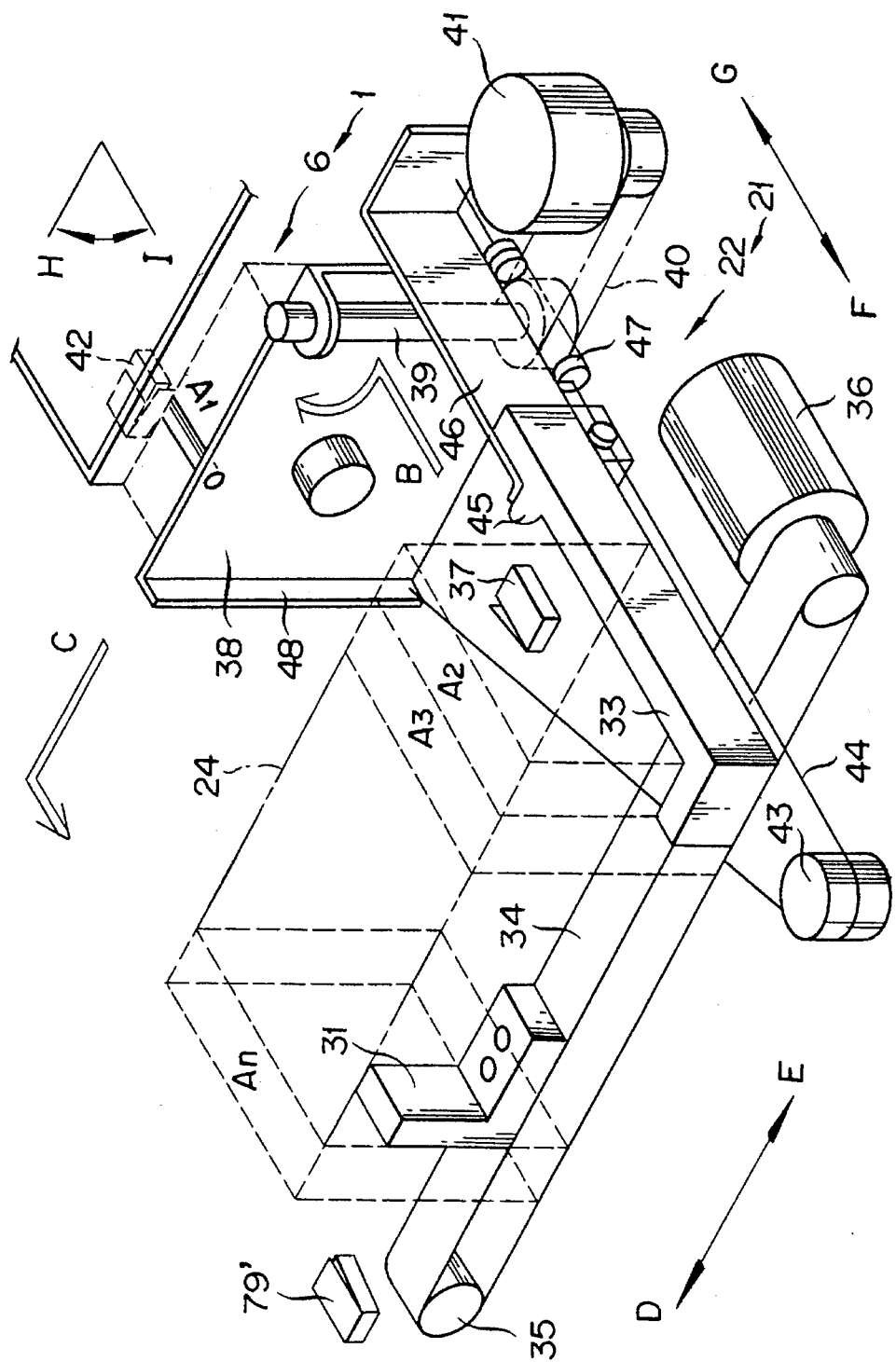
FIG. 25 is a schematic perspective view illustrating a cartridge loader, etc. in yet another embodiment.

The loading mechanism 22 of the cartridge loader 21 is as illustrated in FIG. 25. The loading mechanism 22 is identical in construction to that which is illustrated in FIG. 1 and is provided with the transfer claw part 31 and the set bar 33. The transfer claw part 31 moves collectively a group of cartridges A stored in the cartridge container 24 and sets to the set bar 33 one of the cartridges A selected to be loaded. The set bar 33 is located at a position opposite to the transfer claw part 31 across the group of cartridges A. The set bar 33 guides the one cartridge A which has been set to the roll film carrier 1.

The discharge mechanism 23 of the cartridge loader 21, as illustrated in FIG. 2, is provided with the holder part 50 and the extracting plate 51. Further, in this discharge mechanism 23, similarly to that of the other embodiment described above, when the holder part 50 has moved to the terminal of the direction of K and assumed the waiting state, this holder part 50 continues to retain the cartridge A by virtue of the upper arm 64 and the lower arm 65 thereof while remaining in the waiting state. Further, the extracting plate 51 and the holder part 50 are adapted to be interlocked similarly to those in the other embodiment described above.

In the diagram, the reference numeral 79' stands for the fifth switch. This fifth switch 79' is intended to detect the initial position of the transfer claw part 31 of the loading mechanism 22. The fifth switch 79' is disposed on the extension of the cutaway groove 30 of the cartridge container 24 (FIG. 3) or at the terminal of the direction of D and is adapted to detect the fact that the transfer claw part 31 is located at the initial position outside the cartridge container 24.

Further, the roll film carrier 1 and the cartridge loader 21 are attached separately of each other to the reader-printer. The roll film carrier 1 is attached to the reader-printer with a slight freedom of motion in the longitudinal direction so as to allow the vertical scan described above. While the cartridge loader 21 can be attached to and detached from the reader-printer, it is fixed immovably when it is attached to the reader-printer. Further, the supply part 6 of the roll film carrier 1 is normally located at the standard position thereof for performing the works of loading and returning the cartridge A in cooperation with the loading mechanism 22 or the discharge mechanism 23 of the cartridge loader 21. Specifically, during the normal period in which the vertical scan is not performed, the roll film carrier 1 as a whole is located at the home position which forms a neutral position as described above.

Figure 24:
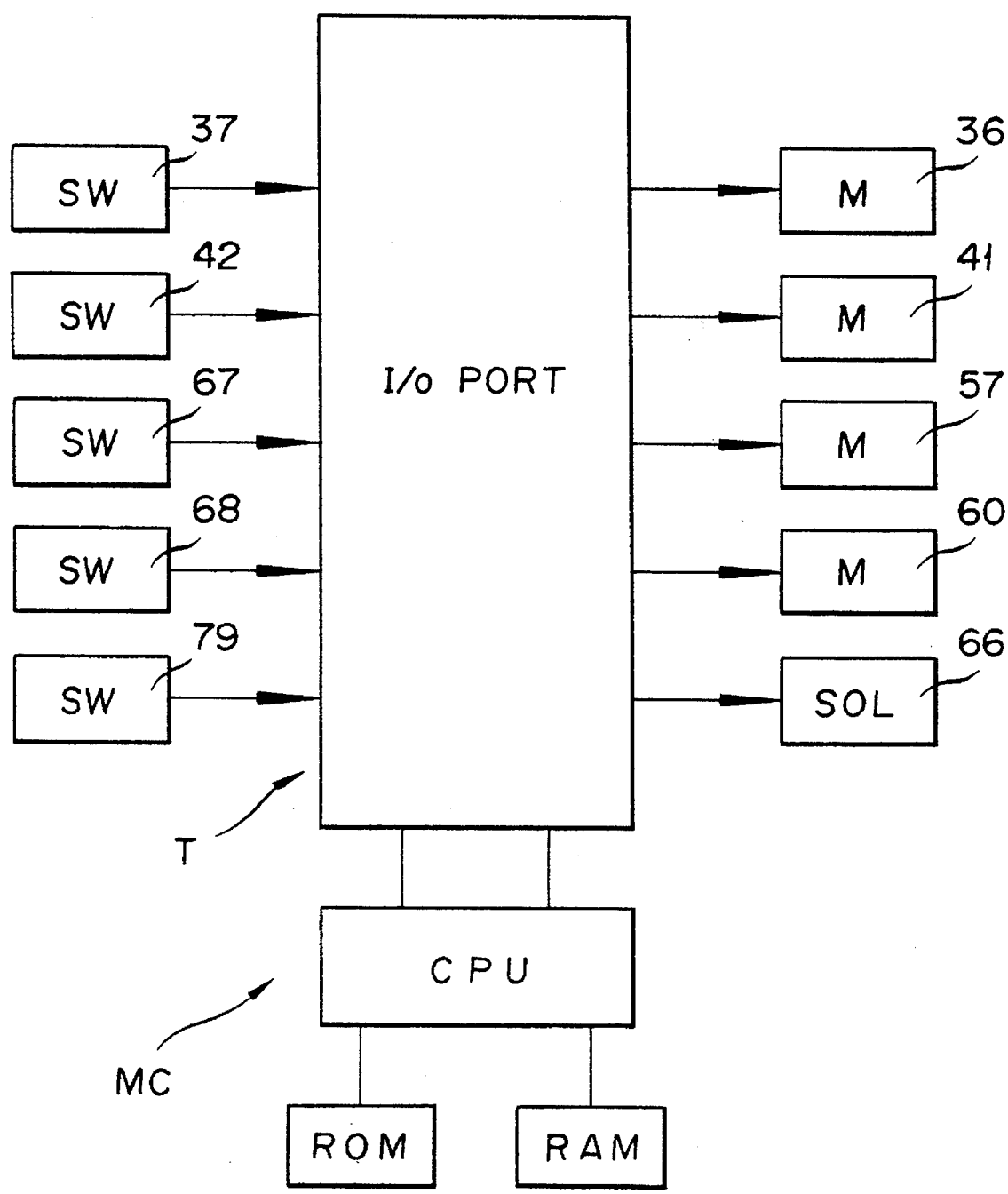
FIG. 24 is a block diagram illustrating the control circuit of a reader-printer.

In the control means for the cartridge loader 21 which is constructed as described above, similarly to that which is illustrated in the block diagram of FIG. 24, the signals from the various switches including the fifth switch 79' are injected into the microcomputer MC via the port T. From the microcomputer MC, the control signals for the various motors and the solenoid 66 are issued via the port T.

In the present embodiment, by this microcomputer MC, controls similar to those of the other embodiment described above are carried out. In other words, in this cartridge loader 21, the holder part 50 of the discharge mechanism 23 takes hold of the cartridge A loaded in the supply part 6 before this cartridge A is rendered extractable. This means that the cartridge A being loaded can be retained at a suitable time during the interval between the step of loading and the completion of the rewinding.

In the present embodiment, the microcomputer MC is capable of further effecting the following controls. The microcomputer MC measures the amount of motion which the transfer claw part 31 produces from the initial position thereof until the first cartridge A is set on the set bar 33. The microcomputer MC, on the basis of this amount of motion, detects the number of cartridges A which are stored in the cartridge container 24. Then, the microcomputer MC, on the basis of the detected number of cartridges A, stops the operation of the loading mechanism 22 and the discharge mechanism 23 after the screening for retrieval has been completed on the microfilm F in the last cartridge $A_n$ and this cartridge $A_n$ has been returned to the cartridge container 24 by the discharge mechanism 23. To be more specific, the cartridge container 24 accommodates cartridges A as illustrated in FIG. 3. The number of cartridges A to be stored in the cartridge container 24 is variable, possibly ranging between the minimum of 1 and the maximum of N specifically assigned to the cartridge container 24. The transfer claw part 31 continues to move from the initial position at which the fifth switch 79' is ON to the position at which the first of the group of cartridges A which have been moved collectively is set on the set bar 33, namely the first switch 37 is turned ON. The number of cartridges A stored in the cartridge container 24 can be easily detected by the CPU or counter of the microcomputer MC measuring the amount of this motion of the transfer claw part 31.

Let N stand for the largest number of cartridges A to be stored in the cartridge container 24 and R for the amount of initial motion of the set bar expressed in mm, and the number of cartridges A having a unit width of 25.4 mm, for example, will be detected as follows. When the amount of the initial motion of the set bar 33 is R mm plus 25.4 mm, for example, the number of cartridges A stored in the cartridge container 24 is recognized to be "N minus 1." When the amount of the initial motion of the set bar 33 is R mm plus (25.4 mm×2), the number of cartridges A stored in the cartridge container 24 is recognized to be "N minus 2."

When the number of cartridges A stored in the cartridge container 24 is detected as described above, the number of interchanges required to be made for all the cartridges A is discerned to be the number of cartridges A minus 1. The detection of the number of interchanges so required allows the following controls. When the screening for retrieval of the microfilm F in the last cartridge $A_n$ is completed in the roll film carrier 1 and this cartridge $A_n$ is returned by the discharge mechanism 23 to the cartridge container 24, the microcomputer MC stops emitting the drive signals to the first motor 36, the second motor 41, the third motor 57, the fourth motor 60, the solenoid 66, etc. As a result, the microcomputer MC stops the motions in the loading mechanism 22 and the discharge mechanism 23 of the cartridge loader 21. The cartridge loader 21 is controlled as described above.

Then, the control means such as the microcomputer MC which controls the roll film carrier 1, while the microfilm F is being rewound by the reel drive means after completion of the screening for retrieval, effects such control on the roll film carrier 1 moved in consequence of the aforementioned vertical scan that the roll film carrier 1 will be returned to the home position by the transfer means V. To be specific, in the roll film carrier 1, the microfilm F on which the screening for retrieval has been completed is rewound on the rewinding reel 4 by the drive shafts 14 and 15 of the reel drive means being rotated. When the microcomputer MC issues to the motor of the reel drive means a drive signal to start the rewinding motion, it immediately emits a drive signal to the stepping motor W of the transfer means V. As a result, the roll film carrier 1 which has been affected by the vertical scan is returned to the home position which is a neutral position as described above. To be more specific, when the vertical scan is effected on the roll film carrier 1, the microcomputer MC takes count of the number of drive pulses of the stepping motor W during the vertical scan and memorizes the amount of motion of the roll film carrier 1. When the microfilm F is subsequently rewound, a drive signal to produce a rotation in the reverse direction is issued in the number of drive pulses equal to that counted previously to the stepping motor W. As a result, the roll film carrier 1 is so controlled as to be moved by the amount of motion produced during the vertical scan and consequently returned to the home position assumed prior to the vertical scan. Incidentally, the roll film carrier 1 and the cartridge loader 21 are not integrally formed but are separately attached to the reader printer. Thus, the stepping motor W is only required to have torque enough to produce exclusive motion of the roll film carrier 1. The apparatus is advantageous in terms of cost because it does not require the stepping motor W to possess a large capacity.

Figure 27:
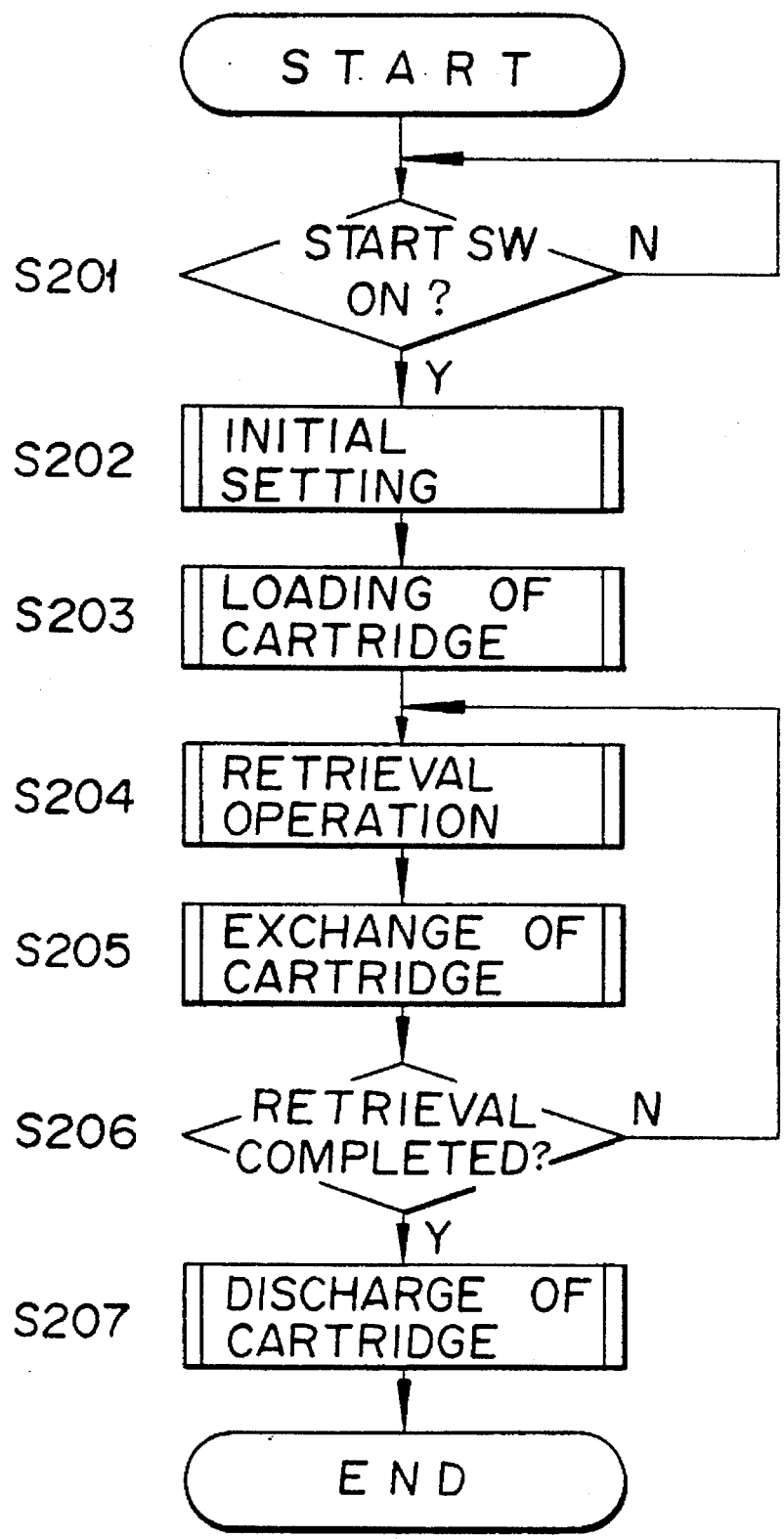
FIG. 27 is a flow chart illustrating the basic control of the embodiment shown in FIG. 25 and FIG. 26.

The present embodiment is constructed as described above and is operated as follows. The loading operation performed by the cartridge loader 21 and other parts and the loading and discharging operations will be described below with reference to FIG. 17 and FIG. 18. The discharging operation will be described with reference to FIG. 10. FIGS. 27, 28, 29, 30, 32, and 32 are flow charts of controls involved in the present embodiment; FIG. 27 representing the basic control and FIGS. 28 to 32 representing relevant component routines. Since the routine for the discharge of the cartridge A is identical to that described previously with reference to FIG. 23, use of a new diagram for illustration of this routine will be omitted. The operation of the present embodiment will be described below with reference to these diagrams.

First, the outline of the operation will be described with reference to FIG. 27. When the start switch is turned on at Step S201, the initial setting is made at Step S202. The routine for this initial setting will be described specifically below with reference to FIG. 28. After the initial setting has been made, the flow advances to Step S203 to induce the loading of the first cartridge $A_1$ in the roll film carrier 1. The routine for the loading of the first cartridge $A_1$ will be described specifically below with reference to FIG. 29 and FIG. 17. When the loading of the first cartridge $A_1$ is completed, the screening for retrieval is carried out on the film F contained in the cartridge $A_1$ at the next Step S204. The routine for this screening will be described specifically below with reference to FIG. 30, FIG. 17, and FIG. 18. After the screening for retrieval on the microfilm F in the cartridge $A_1$ has been completed, the flow proceeds to Step S205.

At Step 205, the discharge of the first cartridge $A_1$ and the loading of the second cartridge $A_2$, namely interchange of these cartridges, are carried out. This interchange of cartridges will be described in detail below with reference to FIG. 31, FIG. 32, and FIG. 18. Then, the flow proceeds to Step S206, at which the question as to whether all the cartridges A currently contained in the cartridge container 24 of the cartridge loader 21 have been screened for retrieval or not is decided. This decision is attained, as described above, by first confirming the number of cartridges A contained in the cartridge container 24 and then, based on the result of this confirmation, judging whether the screening for retrieval has been completed on the microfilm F in the last cartridge $A_n$ or not. When the judgment falls on the negative side, the flow returns to Step S204 and runs through Steps S204, S205, and S206 again to effect the screening for retrieval, discharge, and loading sequentially on the second cartridge $A_2$ and the following cartridges A. When the completion of the screening for retrieval is detected, the flow proceeds to the next Step S207, at which the last cartridge $A_n$ is discharged and returned to the cartridge container 24.

Figure 28:
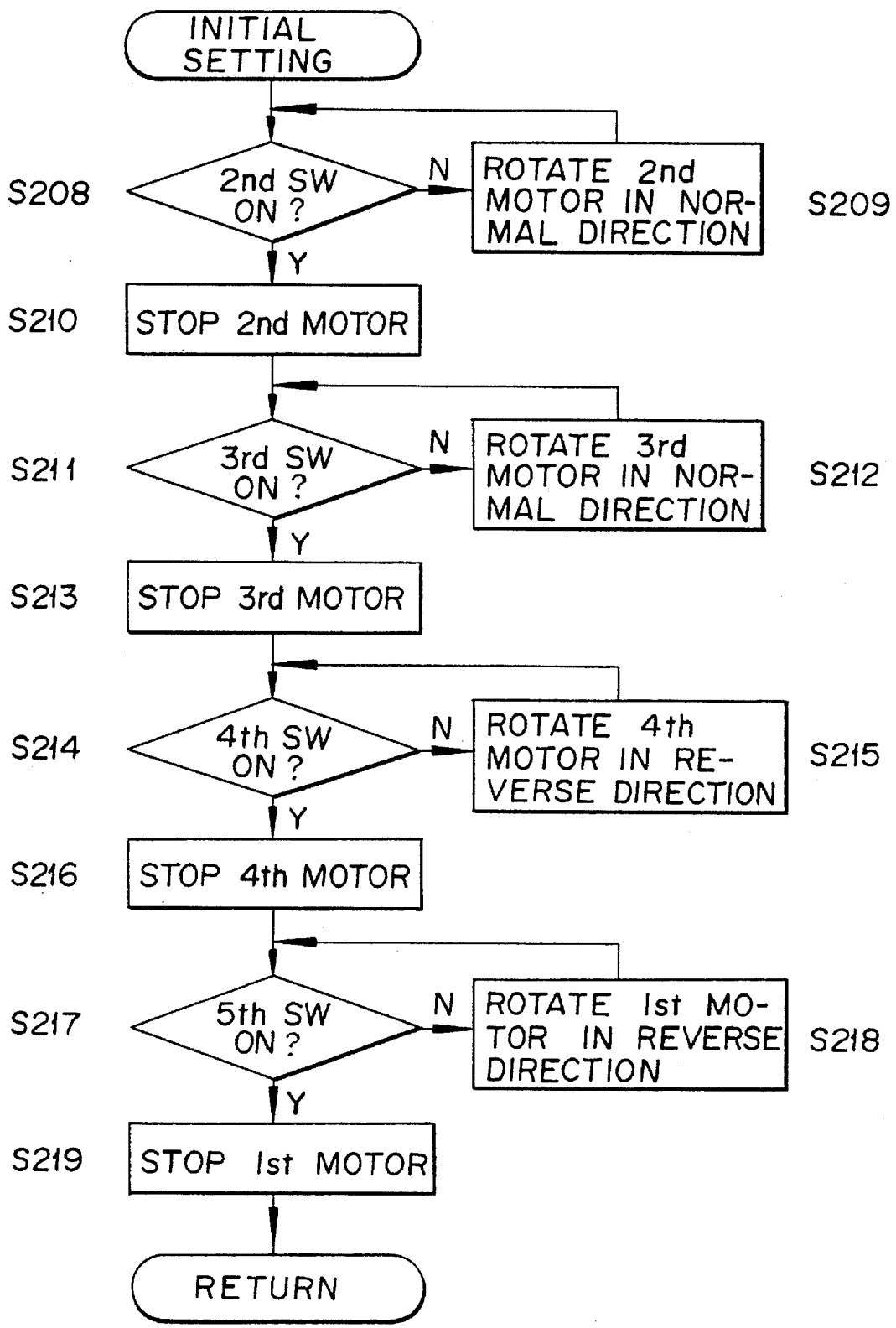
FIG. 28 is a flow chart illustrating the initial setting routine shown in FIG. 27.

The routine for the initial setting at Step S202 of FIG. 27 is as illustrated in FIG. 28. The operations performed at Steps S208 to S216 in this routine are identical with those performed at Steps S9 to S17 shown in FIG. 12 and, therefore, will be omitted from the following description. When the fourth motor 60 is stopped at Step S216, the question as to whether the fifth switch 79' has been turned on or not, namely whether the transfer claw part 31 of the loading mechanism 22 (FIG. 25) has been located at the home position at the terminal of the direction of D or not, will be decided at Step S217. When this decision falls on the negative side at Step S217, the first motor 36 is rotated in the reverse direction at Step S218. When the fifth switch 79' is turned ON and the location of the transfer claw part 31 at the home position is confirmed at Step S217, the first motor 36 is stopped at Step S219. In the routine for the initial setting, the front surface part 38, the holder part 50, the transfer claw part 31, etc. are set at the respective home position in the initial directions. The flow is subsequently returned to Step S203 shown in FIG. 27.

Now, Step S203 of FIG. 27, namely the routine for loading the first cartridge $A_1$ by the loading mechanism 22 illustrated in FIG. 29 will be described below with reference to FIG. 17. At Step S220, the transfer claw part 31 is moved in the direction of E from the initially set state [FIG. 17(1)] by the first motor 36 being rotated in the normal direction. At Step S221, the amount of motion of the transfer claw part 31 is measured by the CPU or counter of the microcomputer MC and stored temporarily in the RAM. When the group of cartridges A in the cartridge container 24 are moved in the direction of E and the first cartridge $A_1$ is set to the set bar 33 in consequence of the motion of the transfer claw part 31, the first switch 37 is turned ON at Step S222. As a result, the first motor 36 is rotated in the reverse direction and the transfer claw part 31 is moved in the reverse direction of E at Step S223. When the fifth switch 79' is turned ON at Step S224, the transfer claw part 31 reaches the home position and stops its motion at Step S225.

Figure 20:
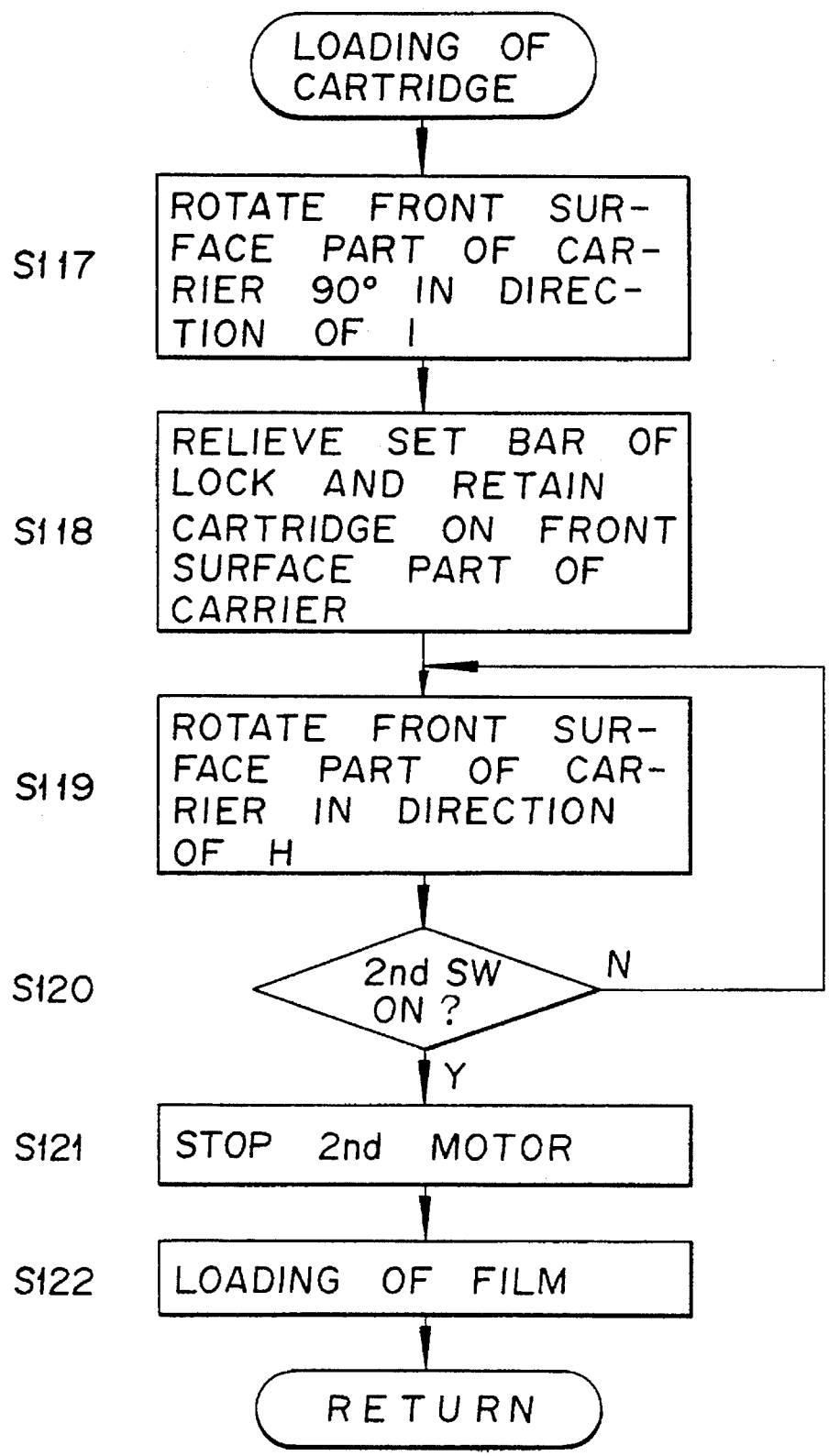
FIG. 20 is a flow chart illustrating the cartridge loading routine shown in FIG. 19.

The operations respectively of the following Steps S226 to S231 are identical with those performed at Steps S117 to S122 shown in FIG. 20 and, therefore, will be omitted from the following detailed description. In summary, the front surface part 38 of the supply part 6 of the roll film carrier 1 is rotated from the shutting position at the home position by 90 degrees along the direction of I to the opening position at Step S226. Then at Step S227, the set bar 33 having the cartridge $A_1$ set thereto is relieved of the lock and moved toward the front surface part 38 side. As a result, the cartridge $A_1$ is retained on the front surface part 38. Thereafter, at Steps S228 to 230, the front surface part 38 still retaining the cartridge $A_1$ thereon is rotated in the direction of H [FIG. 17(2)]. The cartridge $A_1$ is consequently positioned and loaded in the supply part 6 of the roll film carrier 1. At the same time, the set bar 33 is moved toward the cartridge container 24 side and locked there again. Then, at the next Step S231, the microfilm F in the first cartridge $A_1$ is loaded. In this manner, in the routine for the loading of the cartridge $A_1$, the transfer claw part 31 is reciprocated from the home position and the first cartridge $A_1$ is loaded by the loading mechanism 22 and, at the same time, the microfilm F is loaded. Then, the flow returns to Step S204 shown in FIG. 27.

Step S204 of FIG. 27, namely the routine for the screening for retrieval shown in FIG. 30 will be described below with reference to FIG. 17 and FIG. 18. At the time that the loading of the microfilm F in the first cartridge $A_1$ is completed, the flow proceeds to Step S232 of this routine. At Steps S232 to 234, the same operations as performed at Steps S123 to S125 shown in FIG. 21 are performed. The holder part 50 of the discharge mechanism 23 is turned toward the direction of M at Step S232 and moved to the terminal of the direction of K at Step S233. Further, at Step S234, the cartridge $A_1$ which has been already loaded in the supply part 6 is retained by the upper arm 64 and the lower arm 65 of the holder part 50. The holder part 50 still retaining the cartridge $A_1$ is left standing in the waiting state for a while. The extracting plate 51 of the discharge mechanism 23 is moved to the terminal of the direction of N and locked there [FIG. 17 (3)].

Then, in the foil film carrier 1 (FIG. 6), the microfilm F is screened to retrieve a desired frame of image information. The image information is projected on the screen 20 for visual inspection or copied when necessary.

While the screening of the microfilm M for retrieval is being carried out in the roll film carrier 1 as described above, the transfer claw part 31 of the loading mechanism 22 is moved in the direction of E by the first motor 36 being rotated in the normal direction in the cartridge loader 21 at Step S235. The amount of motion of the transfer claw part 31 is the length which is the sum of the amount of initial motion, S mm, counted and memorized at Step S221 described above plus the width, 25.4 mm, of one cartridge A. In consequence of the motion of the transfer claw part 31, the cartridge $A_2$ destined to be loaded next is set to the set bar 33. When the transfer claw part 31 is moved in the direction of E over the prescribed length mentioned above, the first motor is immediately set rotating in the reverse direction and the transfer claw part 31 is moved in the reverse direction of D. When the fifth switch 79' is turned ON at Step S237, the transfer claw part 31 reaches the home position and, at Step S238, stops its motion [FIG. 18(1)]. By the return motion of the transfer claw part 31 to the home position, the cartridge $A_2$ set to the set bar 33 is prevented from remaining in the nipped state between the transfer claw part 31 and the first switch 37. Also when the first cartridge $A_1$ is set in place, the return motion of the transfer claw part 31 prevents the cartridge $A_1$ from remaining in the nipped state. The motion of the transfer claw part 31 is faster when the second cartridge $A_2$ and the following cartridges A are set than when the first cartridge $A_1$ is set. Thus, in the routine for the screening for retrieval, the screening for retrieval, copying, etc. are carried out on the microfilm F and, at the same time, the cartridge $A_1$ is retained in place by the holder part 50 of the discharge mechanism 23. Further, the transfer claw part 31 of the loading mechanism 22 is reciprocated from the home position and the next cartridge $A_2$ is set to the set bar 33. Then, the flow returns to Step S205 of FIG. 27.

Figure 31:
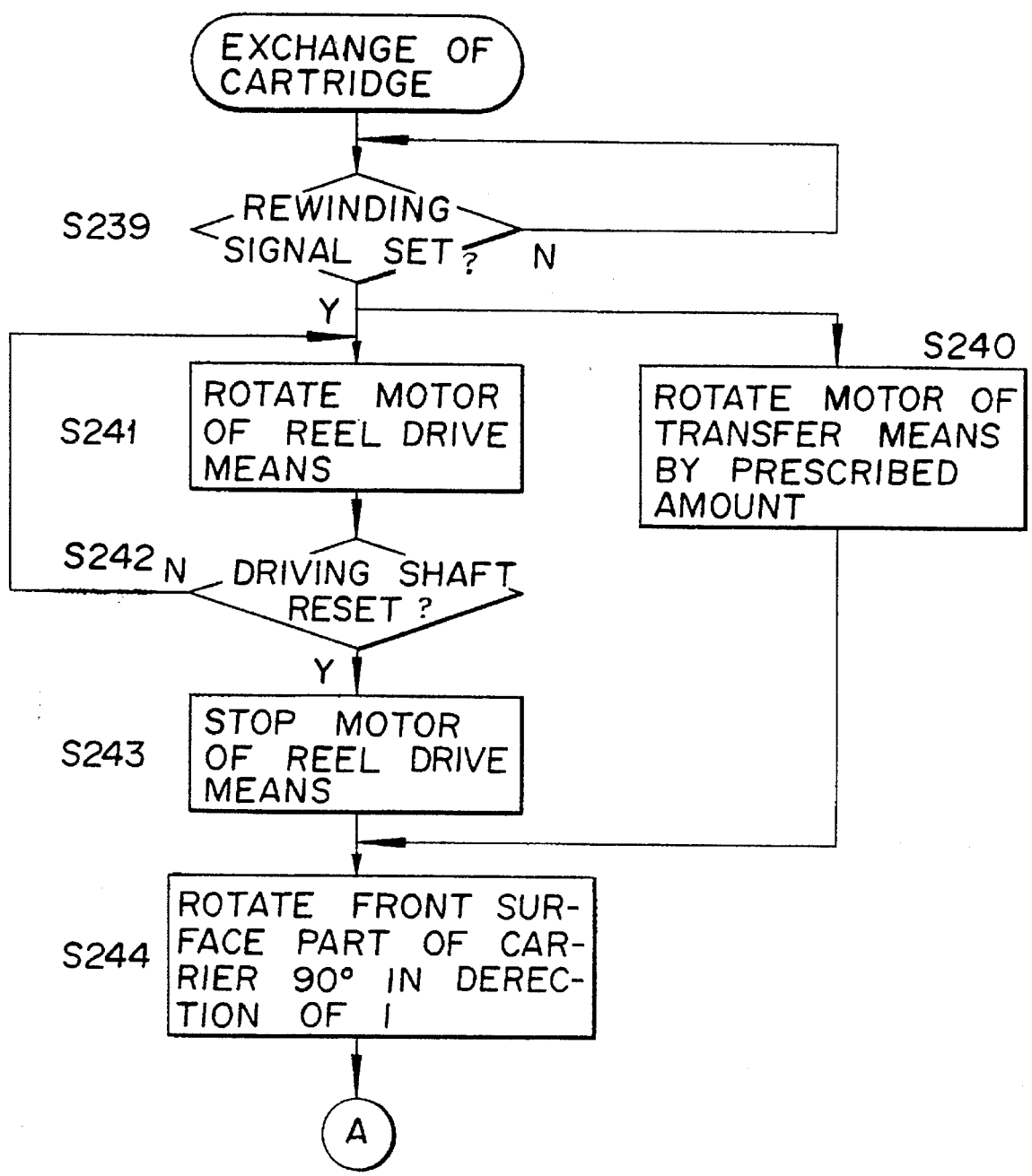
FIG. 31 and FIG. 32 are flow charts illustrating the cartridge interchange routine shown in FIG. 27.
Figure 32:
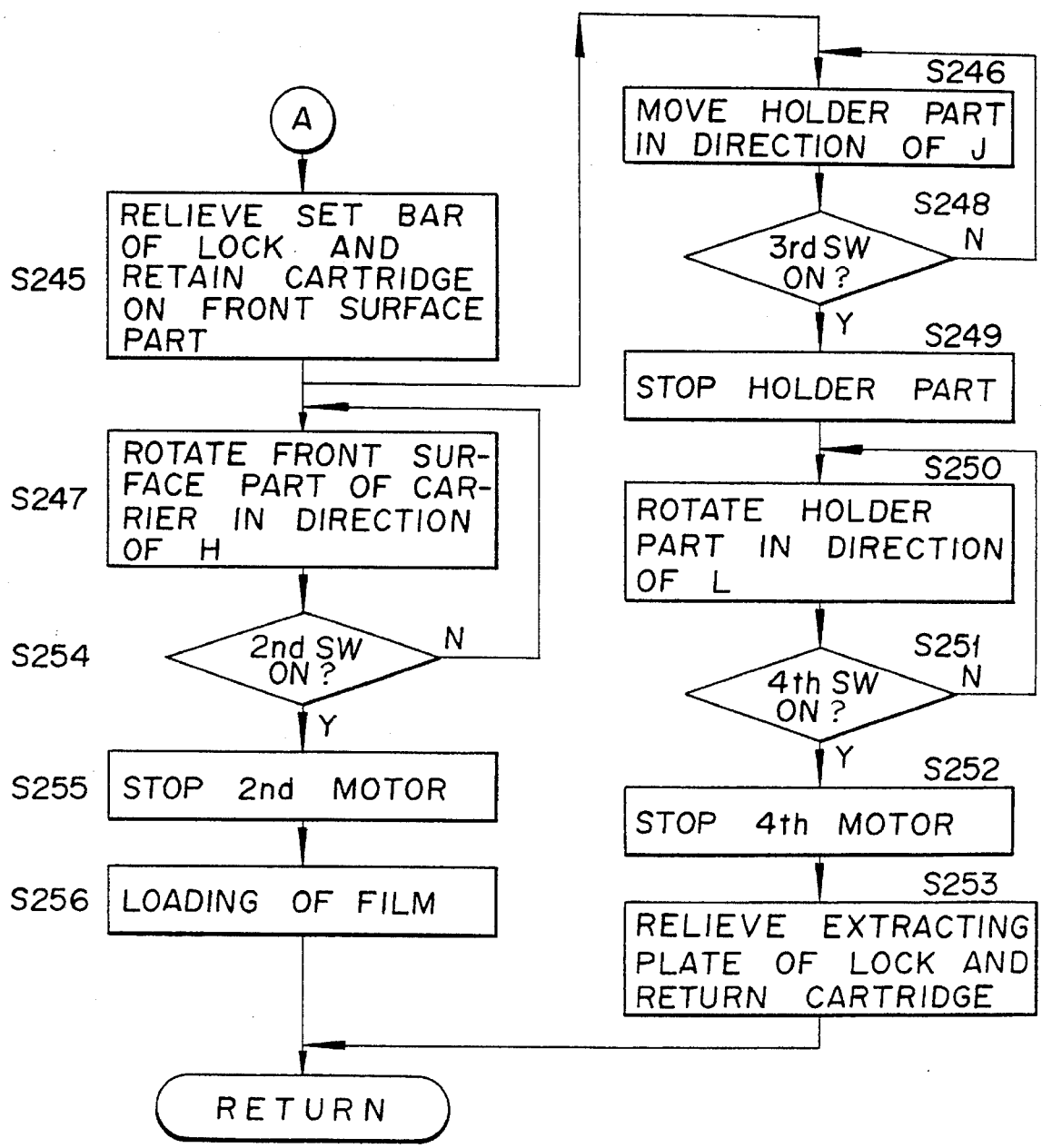

Now, Step S205 of FIG. 27, namely the routine for interchange of cartridges A shown in FIG. 31 and FIG. 32, will be described below with reference to FIG. 18. When the screening for retrieval and other operations are completed on the microfilm F in the first cartridge $A_1$, the microfilm F is rewound completely on the rewinding reel 4. To be more specific, first at Step S239, a signal to rewind is issued to the motor of the reel driving means provided for the roll film carrier 1. When this signal to rewind is issued, a signal to drive is issued to the stepping motor W of the transfer means V (FIG. 26) at Step S240 after the vertical scan has been carried out. Specifically, when the screening for retrieval, copying, etc. have been performed on the microfilm F in the routine for retrieval, a signal to produce reverse rotation is issued in the same number of drive pulses as used in the vertical scan to the stepping motor W at Step S240 after the vertical scan for vertically moving the image of the microfilm F. As a result, the stepping motor W is rotated by a prescribed amount. The roll film carrier 1 is consequently moved in the direction of the home position and returned thereto.

The processes of Steps S241, S242, and S243 are carried out parallelly to the process of Step S240 described above. When a signal to rewind is issued at Step S239, the motor of the reel drive means is rotated to produce a rewinding motion at Step S241. When the drive shaft 14 is reset at Step S242, this rotation of the motor is stopped and the microfilm F is completely rewound on the rewinding reel 4 at Step S243. At the same time, the front surface part 38 of the supply part 6 is rotated by 90 degrees in the direction of I from the shutting position to the opening position. When the set bar 33 is relieved of the lock at Step S245, the next cartridge $A_2$ is retained on the front surface part 38 [FIG. 18(2)]. At this point, the flow is divided into the flow initiated at Step S246 and the flow initiated at Step S247. After these two parallel processes are completed, the flows are returned to Step S206 shown in FIG. 27.

The process of Step S246 and the following steps is identical to that of Step S133 and the following steps shown in FIG. 22. In brief, the holder part 50 of the discharge mechanism 23 still holding the cartridge $A_1$ and remaining in the waiting state at the former Step S234 is moved to the terminal of the direction of J and stopped there at Steps S246 to S249 [FIG. 18(2)]. Then, the holder part 50 is turned in the direction of L at Steps S250 to S252. Subsequently, at Step S253, the cartridge $A_1$ is relieved of the retention and, the same time, the extracting plate 51 of the discharge mechanism 23 is relieved of the lock and the cartridge $A_1$ is returned to the cartridge container 24 [FIG. 18(2)]. The extracting plate 51 is then moved to the terminal of the direction of N and locked there.

The process of Step S247 and the following steps which is performed parallelly to the process just described is identical to the process of Step S134 and the following steps shown in FIG. 22. In brief, the front surface part 38 still retaining the next cartridge $A_2$ and remaining at the opening position at the former Step S245 is rotated in the direction of H while retaining the cartridge $A_2$ and enabled to position and load the next cartridge $A_2$ at Steps S247, S254, and S255 [FIG. 18(3)]. At the same time, the set bar 33 is moved toward the cartridge container 24 side and locked again there. Then, at the next Step S256, the microfilm F contained in the newly loaded cartridge $A_2$ is loaded.

The flow returns as soon as the flow through Step S246 and the following steps and the flow through Step S247 and the following steps are parallelly processed as described above and are both completed. In the routine for interchange of cartridges A, the roll film carrier 1 is returned to the home position assumed prior to the vertical scan while the microfilm F in the first cartridge $A_1$ is being rewound as described above. Then, the discharge and return of the first cartridge $A_1$ and the loading of the next cartridge $A_2$ are simultaneously and parallelly carried out. The flow is then returned to Step S206 of FIG. 27. Thereafter, the operations of Steps S204, S205, and S206 described above are sequentially repeated on each the cartridges A, to effect the screening for retrieval, the interchange of cartridges A, and the return of used cartridges A to the container 24. When the screening for retrieval is completed on the microfilms F in all the cartridges A, the flow proceeds to Step S207.

The cartridges $A_2$ to $A_n$, similarly to those of the embodiment described above, are severally loaded at Step S256 and, after the immediately preceding cartridge A has been returned to the cartridge container 24 at Step S253, they are retained by the holder part 50 at Steps S232, S233, and S234. The holder part 50 still retaining the cartridge A is left standing in the waiting state until the rewinding at Step S243 following the screening for retrieval is completed.

Finally, the routine for discharging the cartridge $A_n$ is implemented at Step S207. In this routine, the discharge from the supply part 6 and the return to the cartridge container 24 are carried out on the finally loaded cartridge $A_n$. Since the discharge and return of the cartridge $A_n$ are effected by the operations of Steps S144 to S150 already shown in FIG. 23, they will be omitted from the following detailed description.

The routine just described completes the screening for retrieval and other operations which are performed by the roll film carrier 1 on all the cartridges A stored in the cartridge container 24 of the cartridge loader 21. Thus, in the cartridge loader 21, the cartridges A containing a microfilm F are picked out of the cartridge container 24 and loaded in the roll film carrier 1 by the loading mechanism 22 and then returned from the roll film carrier 1 to the cartridge container 24 by the discharge mechanism 23 as described above, to effect sequential interchange of cartridges A.

Then, in the cartridge 21 of the present embodiment, the microcomputer MC which serves as control means therefor executes the following control. The transfer claw part 31 of the loading mechanism 22 is so adapted that the motion thereof will induce collective motion of the cartridges A inside the cartridge container 24 and cause these cartridges A to be set to the set bar 33. First, the microcomputer MC measures the amount of motion which the transfer claw part 1 produces from the home position to the position for setting the first cartridge $A_1$, finds the number of cartridges A stored in the cartridge container 24, and calculates the number of interchanges of cartridges A. When the microcomputer MC, based on the number of interchanges so calculated, judges that the microfilm F in the last cartridge $A_n$ has been screened for retrieval and the cartridge $A_n$ has been returned, the operations of loading and returning by the loading mechanism 22 and the discharge mechanism 23 are automatically stopped. The various motions of the cartridge loader 21 mentioned above are immediately stopped automatically after the microfilms F in the cartridges A stored in the cartridge container 24 have been completely screened for retrieval. Thus, the apparatus of this invention has no use for the detection of completion of screening, copying, and other actions which has been indispensable for the conventional cartridge loader and, consequently, allows promoting automation of screening, copying, etc. of the microfilm F.

In the meantime, in the roll film carrier 1, the cartridge loader 21 constructed as described above executes sequential interchange of cartridges A by repeating the cycle of loading and returning each of the cartridges A. Further, the roll film carrier 1 effects vertical scan suitably as required while screening the microfilm F in the loaded cartridge A. When the vertical scan is carried out, the roll film carrier 1 is moved from the home position by the transfer means V. Then, in the present embodiment, the roll film carrier 1 which has been moved by the vertical scan is automatically returned to the home position by virtue of the control effected by the transfer means V while it is in the process of rewinding the microfilm. F by the control means thereof after the screening for retrieval has been completed. As a result, the roll film carrier 1 is allowed to correct positional deviation and is returned precisely to the standard position for loading the returning the cartridge A in cooperation with the cartridge loader 21. As a result, the returning of the cartridge A being loaded and the loading of the next cartridge which are destined to be performed subsequently are allowed to proceed smoothly. Since the roll film carrier 1 is automatically returned infallibly to the home position as described above in preparation for the interchange of cartridges A, the interchange of cartridges A always proceeds smoothly. The roll film carrier of this invention, unlike the conventional roll film carrier, is not required to be returned for correction of possible positional deviation to the home position and, therefore, is enabled to promote the automation of screening, copying, etc. of the microfilm. This fact further shortens the time required in the interchange of cartridges and expedites the screening, copying, etc. of the microfilm.

Figure 33:
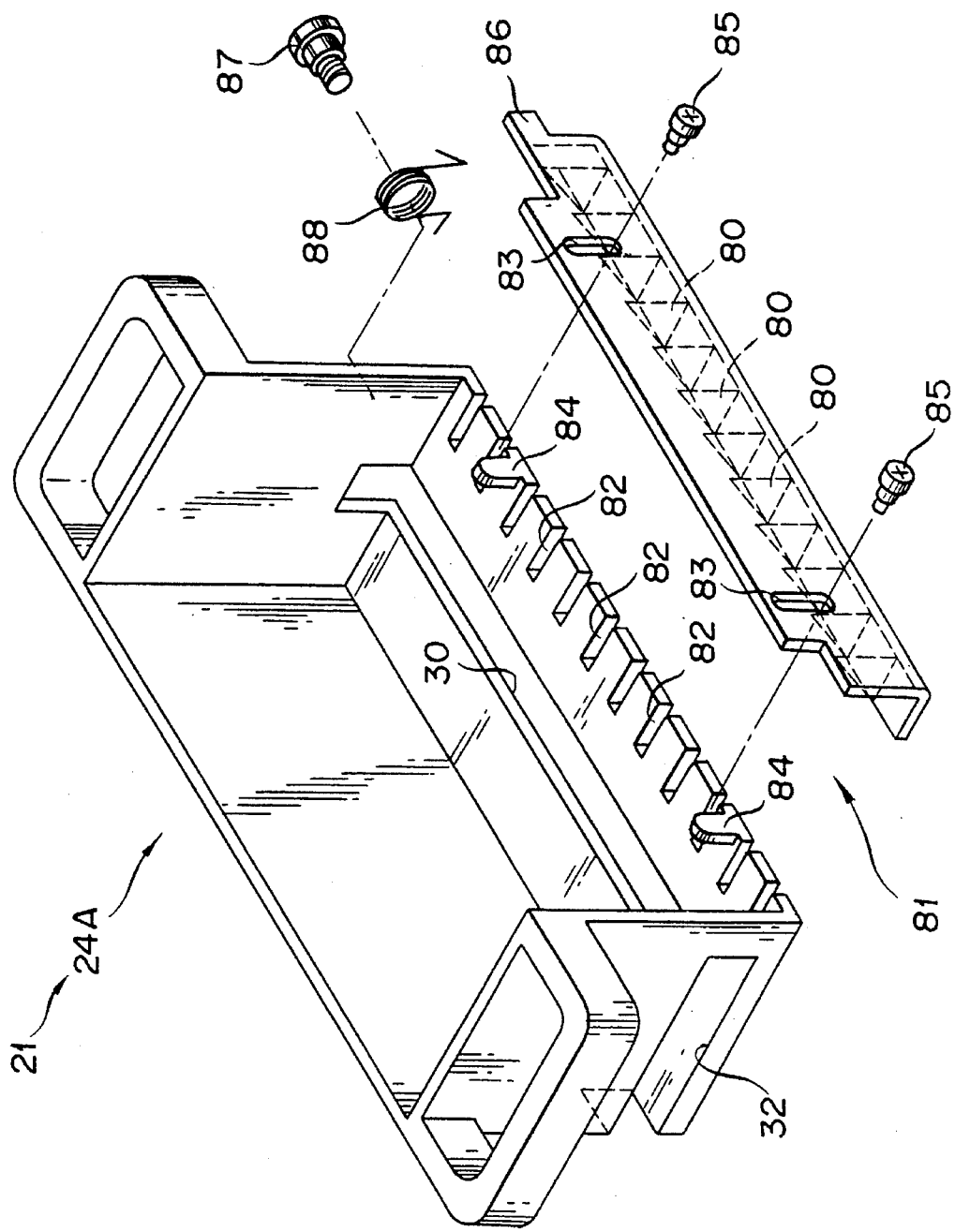
FIG. 33 is a perspective view illustrating another example of the cartridge container.

FIG. 33 represents another embodiment of this invention attained with respect to the cartridge container of the cartridge loader 21.

This cartridge container 24A is provided with a plurality of projecting members 80. These projecting members 80 are adapted to be freely moved between the normal positions projected toward the interior of the cartridge container 24A and the refuge positions retracted from the interior of the cartridge container 24A. The projecting members 80 have the following shape. To be specific, they are so shaped that when they are located at the normal positions mentioned above and the cartridges A are set in the prescribed correct direction relative to the cartridge container 24A, they offer no hindrance to the introduction of cartridges A into the cartridge container 24A. Further, these projecting members 80 are so shaped that when they are located at the normal positions mentioned above and the cartridges A are about to be set in a direction other than the prescribed correct direction relative to the cartridge container 24A, they hinder the introduction of the cartridges A.

These projecting members 80 will be described further in detail below. The projecting members 80 have a claw-like convex shape such as, for example, a triangular shape as in the illustrated embodiment. The number of these projecting members 80 is proportionate to the number of cartridges A which can be stored in the cartridge container 24A. A guide plate 81 to which the projecting members 80 are attached has a length proportionate to the lateral surface of the cartridge container 24A and is shaped as folded to acquire a cross section substantially in the shape of the letter L. These projecting members 80 are severally fixed by the two perpendicular sides thereof to the guide plate 81. The projecting members 80 are disposed as spaced at an equal interval slightly larger than the width of cartridges A. The main body of the cartridge container 24A is open on one lateral surface side. The bottom side of the cartridge container 24A is provided in the lateral edge part thereof on the open lateral surface side with grooves 82. These grooves 82 are formed in sizes and intervals corresponding to those of the projecting members 80 of the guide plate 81 as laid along the shorter direction of the guide plate 81. The guide plate 81 is joined to the open lateral surface side of the main body of cartridge container 24A in such a manner that the projecting members 80 are partly inserted into the corresponding grooves 82. Two guide holes 83 formed vertically in the guide plate 81 are opposed to retaining pieces 84 raised upright on the main body side of the cartridge container 24A. Pins 85 are inserted through the guide holes 83 and fastened to the retaining pieces 84, so that the guide plate 81 is rendered vertically movable relative to the main body of the cartridge container 24A. A projecting piece 86 is formed at the terminal in the longitudinal direction of the guide plate 81. A spring 88 is interposed between this projecting piece 86 and a pin 87 attached to the cartridge container 24A. This spring 88 normally keeps the vertically movable guide plate 81 urged upwardly.

The projecting members 80 formed on the guide plate 81 are also urged upwardly in conjunction with the guide plate 81. As a result, the projecting members 80 are normally located at positions above the grooves 82 of the cartridge container 24A, i.e. the normal positions projected toward the interior of the cartridge container 24A. In this case, the guide plate 81 fulfills an additional function as a lateral wall for the cartridge container 24A which is open on one lateral surface. By depressing the guide plate 81 downwardly in spite of the upwardly urging force of the spring 88, the projecting members 80 are enabled to go through the corresponding grooves 82 of the cartridge container 24A and reach the refuge positions retracted from the interior of the cartridge container 24A. As means for depressing the guide plate 81 downwardly, the cartridge loader 21 is provided on the main body side thereof with a solenoid and a lever (neither shown in the diagram). The lever of the depressing means is formed at a position at which it comes into engagement with the guide plate 81 when the cartridge container 24A is joined to the main body of the cartridge loader 21. The solenoid of the depressing means is adapted to be turned ON when the cartridge container 24A is incorporated in the main body of the cartridge loader 21 and to be turned OFF when the cartridge container 24A is removed from the main body. When this solenoid is turned ON, the guide plate 81 is depressed downwardly by the lever in spite of the urging force of the spring 88 and the projecting members 80 are moved to the refuge positions retracted from the interior of the cartridge container 24A.

The projecting members 80 having the triangular shape as described above, when located at the normal positions, are capable of being inserted in the lower part of the cartridge A. The projecting members 80 illustrated in the diagram are so shaped as to be inserted in a receding part 89 below the opening side 78 of the cartridge A of the ANSI specification type illustrated in FIG. 40(1). When the cartridges A to be stored in the cartridge container 24A are set in the cartridge container 24A as directed correctly while the projecting members 80 are held at-the normal positions projected toward the interior of the cartridge container 24A, these projecting parts 80 are safely inserted into the receding part 89 of the cartridge A.

For the introduction of the cartridges A into the cartridge container 24A, eight manners of setting are conceivable. The explanatory diagram of FIG. 36 illustrates these eight manners of setting. FIG. 36(1) represents a case in which the cartridge A is set as turned correctly in all the longitudinal, lateral, and vertical directions. FIGS. 36(2) to (8) represent cases in which the cartridge A is set as turned incorrectly. When the cartridge A is set as turned in the prescribed correct direction relative to the cartridge container 24A as illustrated in FIG. 36(1), the open side 78 of the cartridge A is turned toward the open lateral surface side of the cartridge container 24A (FIG. 33) and the right and left sides or obverse and reverse sides of the cartridge A are turned in proper directions. When the cartridge A is set as turned in the prescribed correct direction as illustrated in FIG. 36(1), the projecting members 80 are inserted into the receding part 89 of the cartridge A and are incapable of hindering the introduction of the cartridge A. In the manners of setting illustrated in FIGS. 36(2), (3), and (4), the cartridge A is correctly set in the obverse-reverse direction and incorrectly set in the longitudinal and vertical directions. In the manners of setting illustrated in FIG. 36(5), (6), (7), and (8), the cartridge A is set incorrectly in the obverse-reverse direction in the first place. In the various manners of setting illustrated in FIGS. 36(2) to (8) and not in FIG. 36(1), the cartridge A is set incorrectly in any of the longitudinal, lateral, and vertical directions. When the cartridge A is to be set as turned in a direction other than the correct direction as illustrated in FIGS. 36(2) to (8), the projecting members 80 are incapable of being inserted into the receding part 89 of the cartridge A. As a result, the projecting members 80 hinders the introduction of the cartridge A and contacts the bottom surface of the cartridge A other than the receding part 89. The cartridge A, therefore, is not completely introduced into the cartridge container 24A but is raised in one part of the bottom surface thereof by the projecting members 80 and consequently caused to assume an upwardly thrust state.

Figure 34:
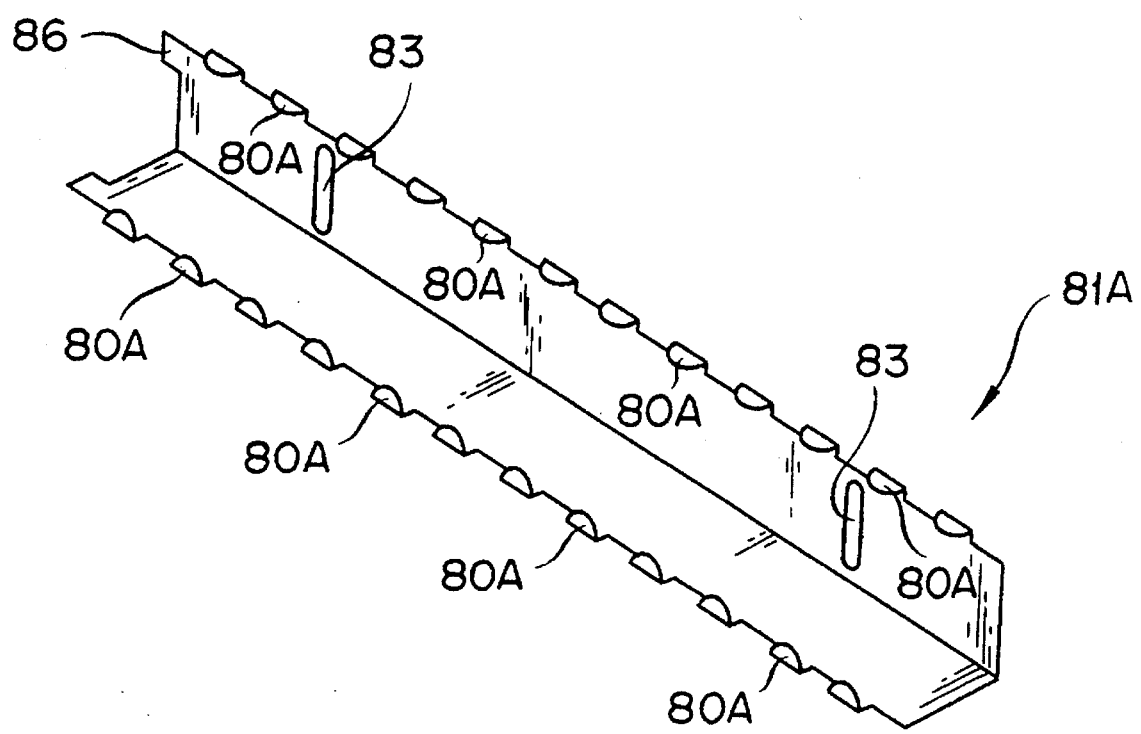
FIG. 34 is a perspective view illustrating another example of the projecting member shown in FIG. 33.

FIG. 34 illustrates projecting members of another construction. The projecting members 80A of FIG. 34 do not have such a triangular shape as illustrated in FIG. 33 but are severally formed of small projecting pieces. These small projecting pieces are formed on the longitudinal edges of a folded guide plate 81A in equal shape, position, and interval as slightly protruding from the edges. The pair of projecting members 80A constructed as described above can be inserted in the receding part 89 of the cartridge A stored in the cartridge container 24A and can be made to hinder the introduction of the cartridge A in the same manner as described above.

Figure 35:
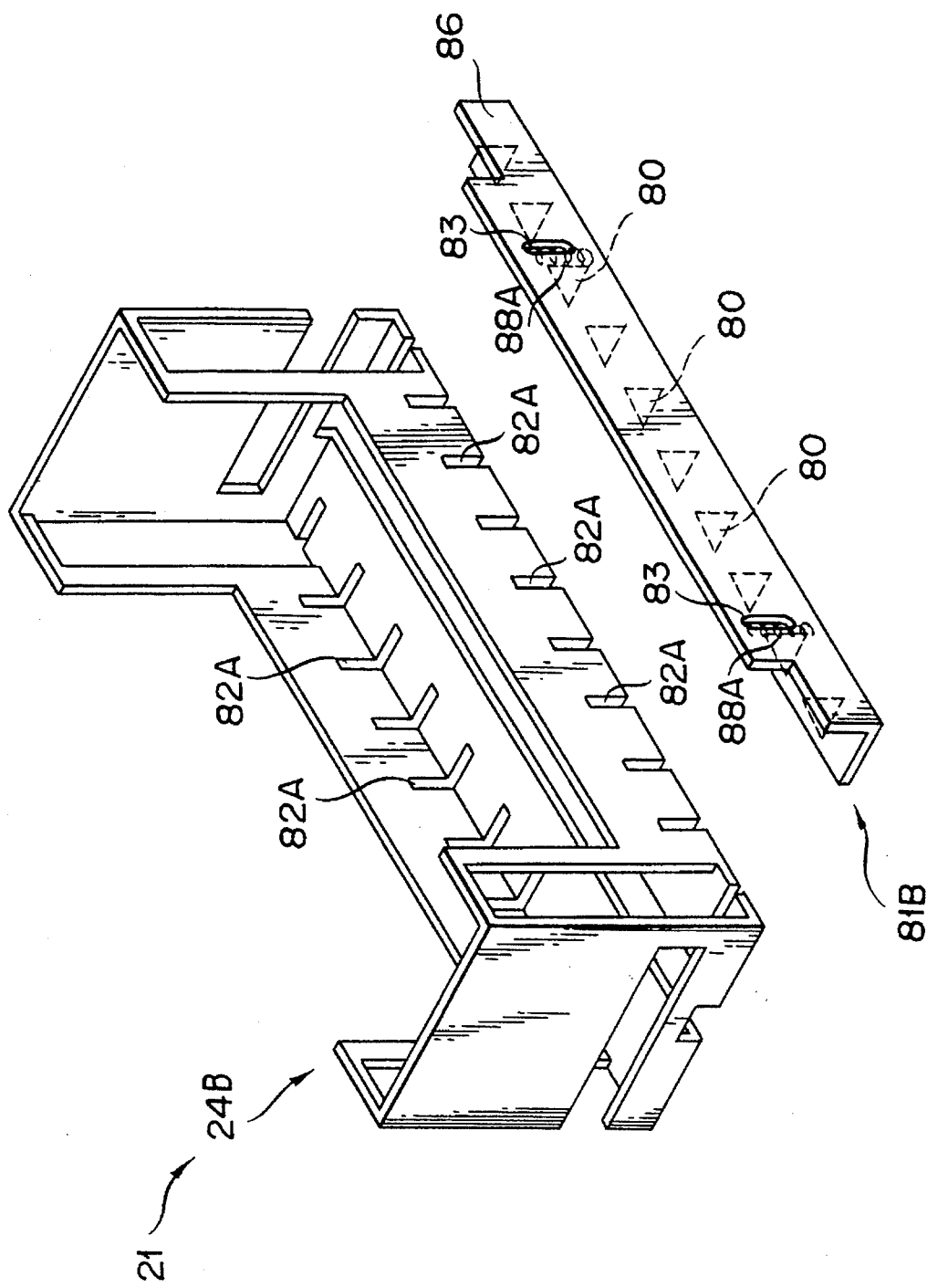
FIG. 35 is a perspective view illustrating yet another example of the cartridge container.

FIG. 35 illustrates the cartridge container in yet another construction. As illustrated, the main body of the cartridge container 24B has symmetrically shaped lateral surfaces. These lateral surfaces are intact in the lower part and open in the upper part. The grooves 82A are formed continuously from the lower parts of the lateral surfaces through the lateral edge parts of the bottom surface. These grooves 82A are symmetrically formed on the opposite sides unlike those which are formed only one side as in the cartridge container 24A illustrated in FIG. 33. While the projecting members 80, the guide plate 81B, etc. in the present embodiment are formed substantially similarly to those illustrated in FIG. 33, the springs 88A are adapted to be simply and easily interposed between the main body of the cartridge container 24B and the guide plate 81B. No retaining piece 84 is formed on the cartridge container 24B side and the opposite lateral surfaces are utilized in the place of the retaining piece 84. In the embodiment of FIG. 35, the cartridges A may be set to the cartridge container 24B as turned toward either the foreground side or the background side in the bearings of the diagram. In contrast to the embodiment illustrated in FIG. 33 in which the cartridges A to be stored are correctly turned in only one direction, the cartridges A of the present embodiment can be correctly turned in either of the two directions. This fact brings about the advantage of convenience. Then, in the embodiment of FIG. 35, when it is necessary to screen the microfilms F in the cartridges A for retrieval after all the microfilms F have been screened for retrieval and all the cartridges A have been removed and returned to the cartridge container 24B, the reuse of the cartridge container 24B can be attained simply by reversing the direction of joining of the cartridge container 24B to the cartridge loader 21. It suffices to keep the cartridges A in the unchanged direction, reverse in direction the cartridge container 24B in its entirety and, at the same time, attach the guide plate 81B anew to the side of the cartridge container 24B opposite to the side thereof used thence for the attachment. This embodiment enjoys convenience because the cartridges A need not be reversed one by one from the direction in which they were removed and returned to the direction in which they were turned before loading.

The cartridge loader 21 in which the cartridge container 24A or 24B of this construction is incorporated is operated by the same basic control flow as that already described with reference to FIG. 27. In the basic control flow, the process for loading the cartridges A at Step S203 is carried out in accordance with the flow illustrated in FIG. 29, the process for screening for retrieval at Step S204 in accordance with the flow illustrated in FIG. 30, and the process for interchange of cartridges A at Step S205 in accordance with the flow illustrated in FIG. 31 and FIG. 32. The process for initial setting at Step S202 and the process for discharge of cartridges A at Step S207 are slightly different from those illustrated in FIG. 28 and FIG. 23. The process for the initial setting and that for the discharge of cartridges A will be described below respectively with reference to FIG. 41 and FIG. 42.

Figure 41:
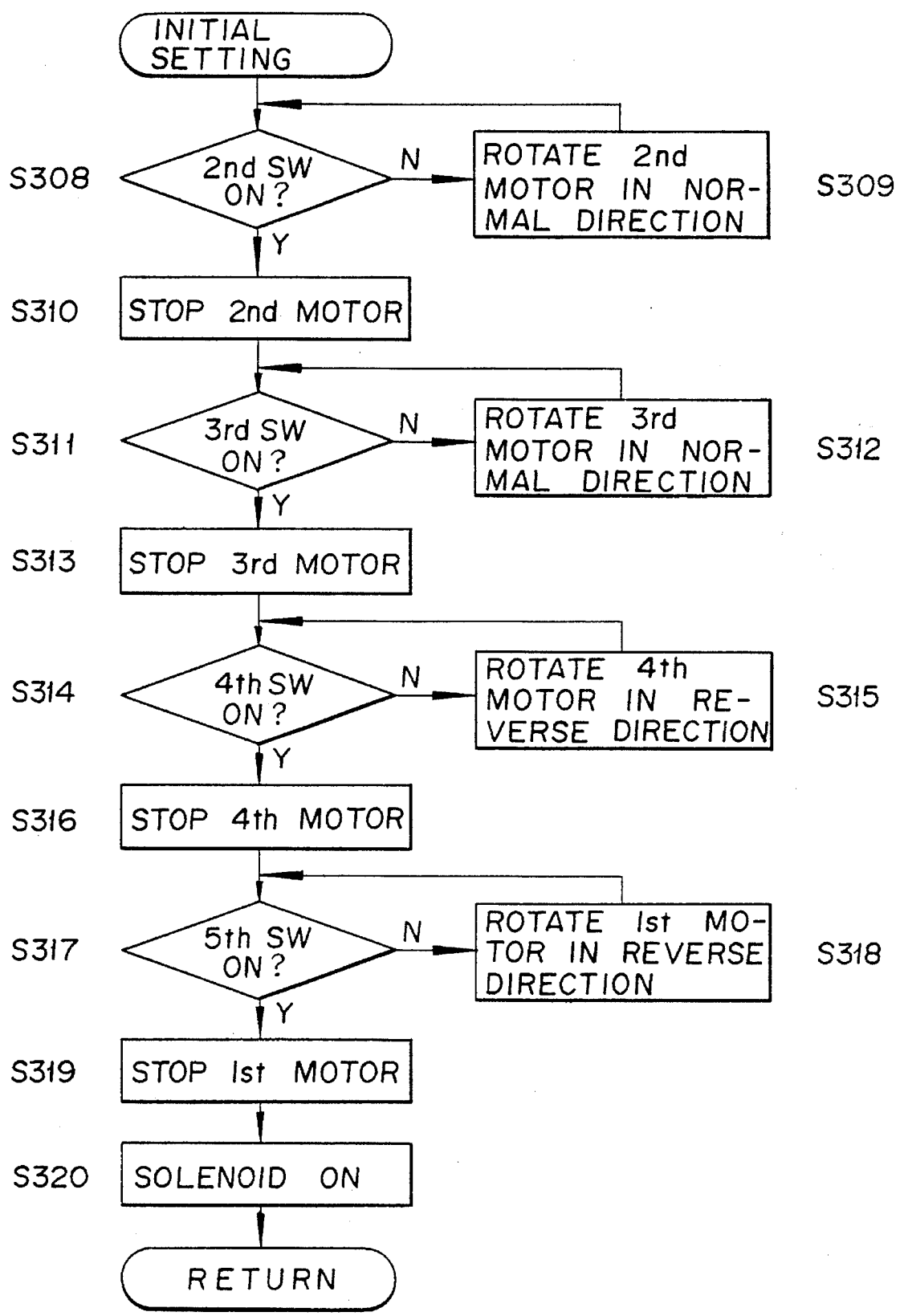
FIG. 41 is a flow chart illustrating the initial setting routine in the embodiment shown in FIG. 33.

The operations of Steps S308 to S319 in the routine for initial setting are identical, as illustrated in FIG. 41, to the operations of Steps S208 to S219 illustrated in FIG. 28. At Steps S308 to S319, the front surface part 38, the holder part 50, the transfer claw part 31, etc. are set in the respective initial positions and initial directions. Since the cartridge container 24A is already incorporated in the main body of the cartridge loader 21, the solenoid of the depressing means is turned ON at Step S320. Then, the guide plate 81 of the cartridge container 24A is depressed downwardly by the lever of the depressing means and the projecting members 80 are lowered from the normal positions to the refuge positions (FIG. 33). In this routine for initial setting, the projecting members 80 are pushed down and the cartridges A are allowed to move inside the cartridge container 24A.

Figure 42:
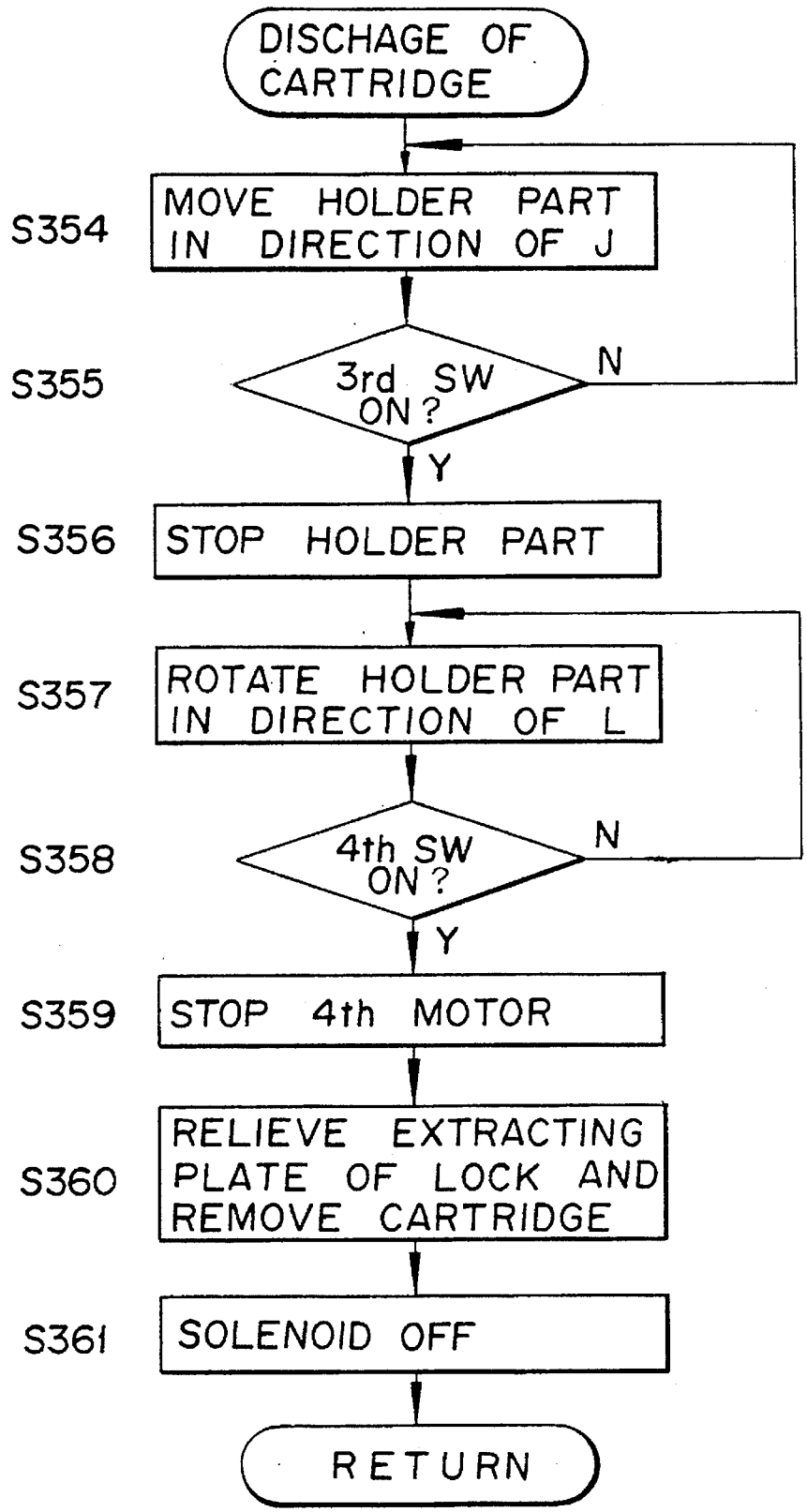
FIG. 42 is a flow chart illustrating the cartridge discharge routine in the embodiment shown in FIG. 33.

The operations at Steps S354 to S360 in the process of discharge of the cartridges A, as illustrated in FIG. 42, are identical to those of Steps S144 to S150 illustrated in FIG. 23. At Steps S354 to S360, the finally loaded cartridge $A_n$ is extracted from the supply part 6 and returned to the cartridge container 24A. Then, at Step S361, when the solenoid of the depressing means is turned OFF, the guide plate 81 of the cartridge container 24A pushed upwardly by the urging force of the spring 88 and the projecting members 80 are moved from the refuge positions to the normal positions (FIG. 33).

As described above, in the cartridge container 24A of the cartridge loader 21 illustrated in FIG. 33, the projecting members 80 are movably formed on the cartridge container 24A. First, the cartridges A are stored in the cartridge container 24A while the projecting members 80 are held at the normal positions projected toward the interior of the cartridge container 24A. At this time, when the cartridges A are set in the prescribed correct direction, the projecting members 80 located at the normal positions on account of their shape avoid offering hindrance to the introduction of the cartridges A and are inserted into the receding part 89 [FIG. 40(1)]. Conversely, if the cartridges A are to be set in a wrong direction, the projecting members 80 located at the normal positions on account of their shape hinder the introduction of the cartridges A (FIG. 36). Then, the cartridge container 24A in which the cartridges A have been set in the correct direction as described above is incorporated in the cartridge loader 21. At the same time, the projecting members 80 located at the normal positions are moved and located at the refuge positions receded from the interior of the cartridge container 24A by the solenoid of the depressing means (not shown) being turned ON. As a result, the cartridges A are rendered movable inside the cartridge container 24A. Then, the cartridges A are removed from the cartridge container 24A and loaded in the roll film carrier 1, subjected to the screening of microfilm F for retrieval, and subsequently removed from the roll film carrier 1 and returned to the cartridge container 24A. In this manner, the cartridges A are interchanged sequentially. The cartridge loader 21 illustrated as in FIG. 33 manifests the following six actions and effects.

Firstly, when the cartridge A is about to be set in a direction other than the correct direction, it is not completely accommodated in the cartridge container 24A because of the hindrance offered by the projecting members 0 and is compelled to assume a protruding state (FIG. 36). This protrusion allows easy detection and prevention of incorrect setting of the cartridge A in any of the longitudinal, lateral, and vertical directions. Thus, the cartridges A are infallibly set in the correct direction in the cartridge container 24A and then loaded in the roll film carrier 1. In consequence of this correct loading, the cartridges A, the roll film carrier 1, etc. are prevented from damage and incorrect screening and allowed to obviate otherwise inevitable use of time for countermeasure. This embodiment, therefore, curbs time loss, expedites the relevant operations, and enables the microfilm F to be screened for retrieval or copied quickly. Secondly, such incorrect setting of the cartridge A as described above is detected at an early state of the introduction of the cartridge A in the cartridge container 24A, namely at a stage considerably earlier than the loading thereof in the roll film carrier 1. The time loss involved herein, therefore, is small as compared with the method which effects the detection of the incorrect setting of the cartridge A at the time that the cartridge 24A is incorporated in the main body of the cartridge loader 21. Even from this point of view, the desire to screen for retrieval and copy the microfilm F quickly can be realized. Thirdly, when the cartridge container 24A is conveyed as when the cartridge container 24A is moved to the main body of the cartridge loader 21, the projecting members 80 located at the normal positions are inserted into the corresponding receding parts 89 of the cartridges A. As a result, the cartridges A stored in the cartridge container 24A are prevented from tumbling or falling because they are kept fast at prescribed positions.

Fourthly, when the cartridge container 24A is incorporated in the cartridge loader 21, the cartridges A stored in the cartridge container 24A are kept retained at prescribed positions by the projecting members 80 still located at the normal positions. The first cartridge $A_1$ located at the terminal, therefore, is neither nipped strongly between other cartridges A nor suffered to contact the second cartridge $A_2$ adjacent thereto. As a result, the reliability of performance is improved because the first cartridge $A_1$ is infallibility and smoothly removed from the cartridge container 24A and loaded in the roll film carrier 1. Thus, the problem already pointed out to occur in the cartridge container 24 of FIG. 3 is solved. The certainty with which this feature is attained increases in proportion as the width of the projecting members 80, specifically the wall thickness of the triangular pieces in the illustrated embodiment, approaches the width of the receding part 89 of the cartridge A.

Fifthly, the direction of the cartridge A removed from the roll film carrier 1 and returned to the cartridge container 24A in the illustrated embodiment is different from the original direction thereof assumed before the loading thereof in the roll film carrier 1. When the solenoid of the depressing means is turned OFF after all the microfilms F have been screened for retrieval and all the cartridges have been returned to the cartridge container 24A, the projecting members 80 are moved from the refuge positions to the normal positions by the upward urging force of the spring 88. Then, the cartridges A are no longer accommodated completely in the cartridge container 24A and are compelled instead to assume a state protruding from the cartridge container 24A. As a result, the removal of the cartridge A from the cartridge container 24A can be facilitated. The certainty with which this feature is attained is enhanced by preparatorily setting the urging force of the spring 88 at a level greater than the maximum capacity of the cartridge container 24A for cartridges i.e. N×170 g (maximum unit weight of the cartridge A). Sixthly, the various operations mentioned above can be carried out without requiring provision of means for the detection of the direction of cartridge A. This omission of the detecting means proportionately simplifies the construction of the whole apparatus and improves the cost thereof.

Figure 37:
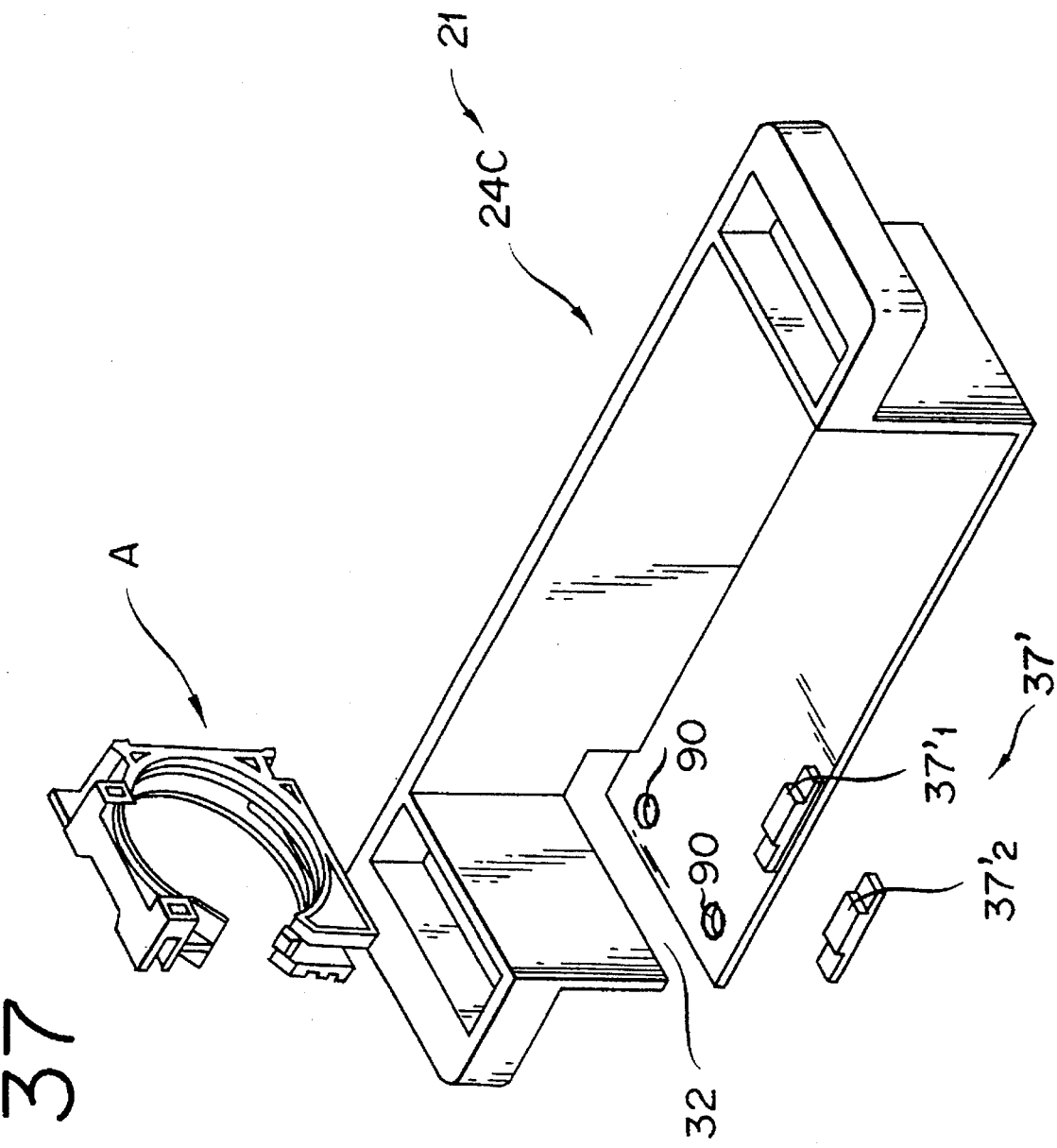
FIG. 37 is a perspective view illustrating still another example of the cartridge container.

FIG. 37 illustrates another embodiment of this invention with respect to the cartridge container 24C and the cartridge loader 21 to which the cartridge container 24C is attached.

Figure 39:
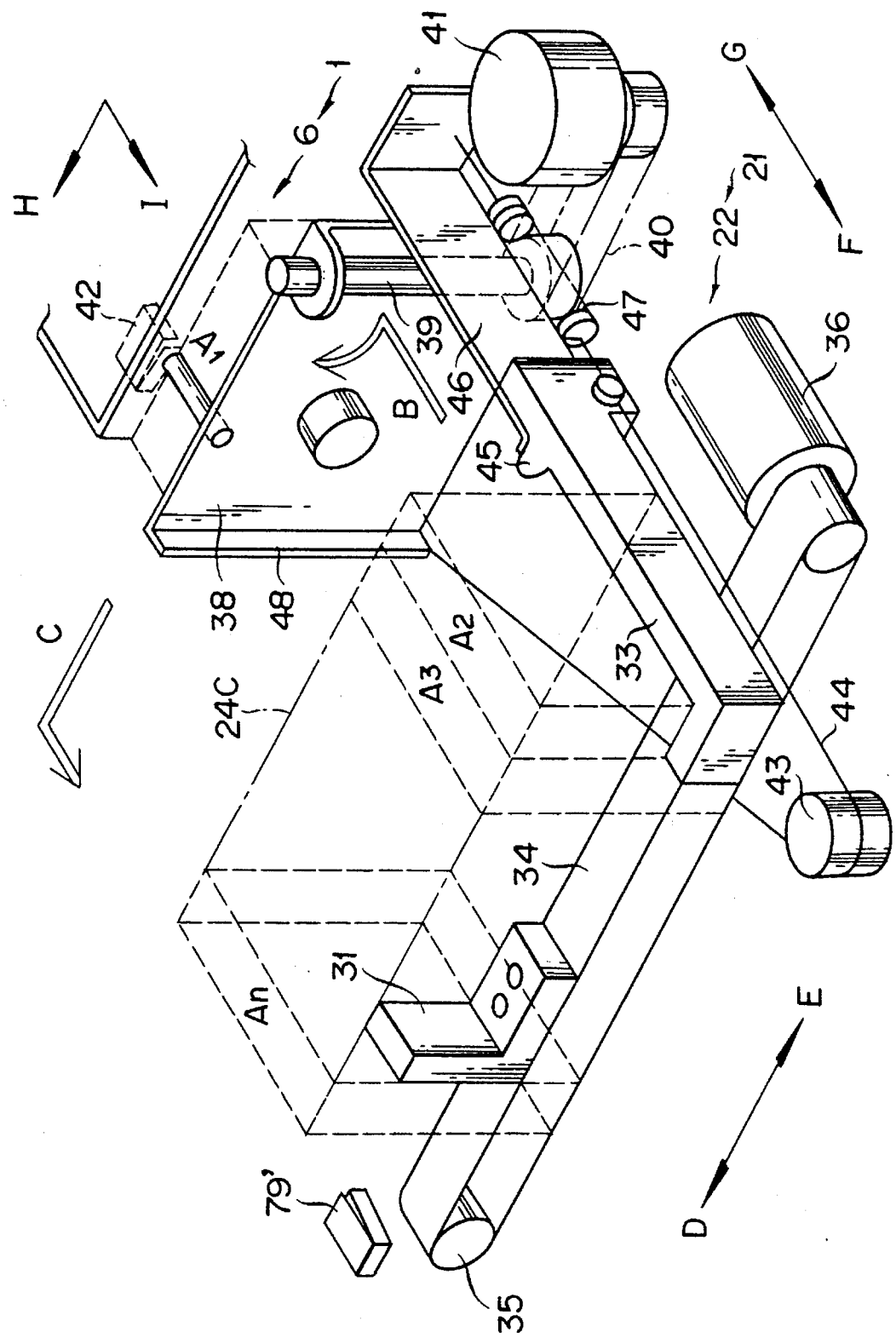
FIG. 39 is a schematic perspective view illustrating a cartridge loader, etc. in the embodiment shown in FIG. 37.

The cartridge loader 21, as illustrated in FIG. 39, is substantially equal in construction to any of those of the embodiments described above, excepting it is provided with a switch 37' which detects the fact that the cartridge A has been set to the set bar 33 and also detects the direction of the cartridge A. Further, this embodiment is provided with such control means as a microcomputer (not shown) which, depending on the direction of the cartridge A detected by the switch 37', stops the operation of the loading mechanism 22 and, at the same time, actuate alarm means when the cartridge A is found not to be turned in the prescribed correct direction.

Figure 38:
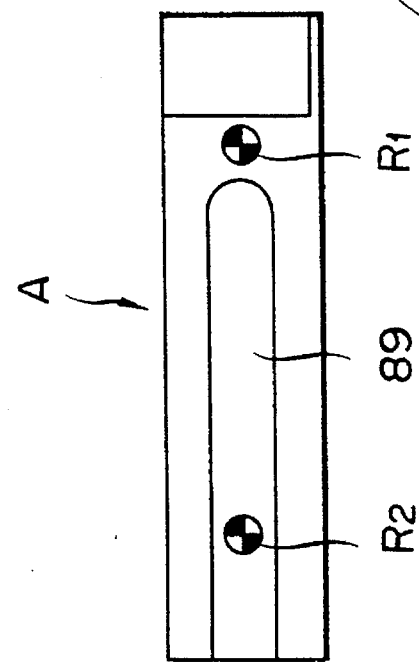
FIG. 38 illustrates an example of the position for detection of the cartridge in the embodiment of FIG. 37.
Figure 38:
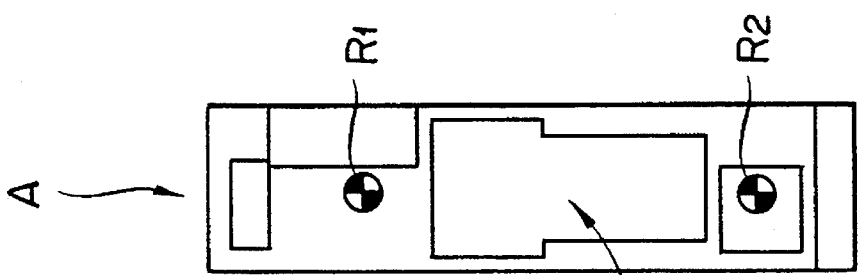
Figure 38:
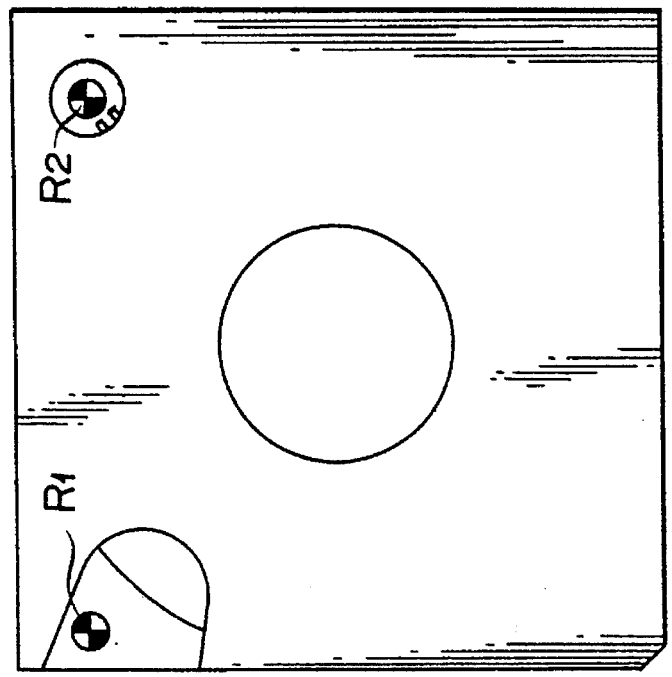

The switch 37' is disposed at the position for detecting the direction of the cartridge A stored in the cartridge container 24C or the position for detecting the direction of the cartridge A in the loading path B of the loading mechanism 22. As illustrated in FIG. 37, two reflection type photoswitches 37'$_1$ and 37'$_2$ are used as the switch 37'. The reflection type photoswitches 37'$_1$ and 37'$_2$ are severally installed in the main body of the cartridge loader 21 in such a manner as to attain effective detection of the cartridge A stored in the cartridge container 24C through the medium of detection holes 90 formed in the bottom surface of the cartridge container 24C. The cartridge A, as already described, is attached to the set bar 33 of the loading mechanism 22 at the position on one terminal side of the cartridge loader 21. The reflection type photoswitches 37'$_1$ and 37'$_2$ and the detection holes 90 are disposed at positions which correspond to the position at which the cartridge A to be loaded next is set to the set bar 33. FIG. 38 illustrates examples of the positions R1 and R2 at which the detection of the cartridge A is effected. FIG. 38(1) represents a bottom view of the cartridge A of the ANSI specification type showing the examples of the detecting positions R1 and R2 for the cartridge A. FIG. 38(2) represents a side view of the cartridge A of the 3M-M type showing the examples of the detecting positions R1 and R2 for the cartridge A. FIG. 38 (3) represents a front view of the cartridge A of the same 3M-M type showing other examples of the detecting positions R1 and R2 for the cartridge A.

Figure 40:
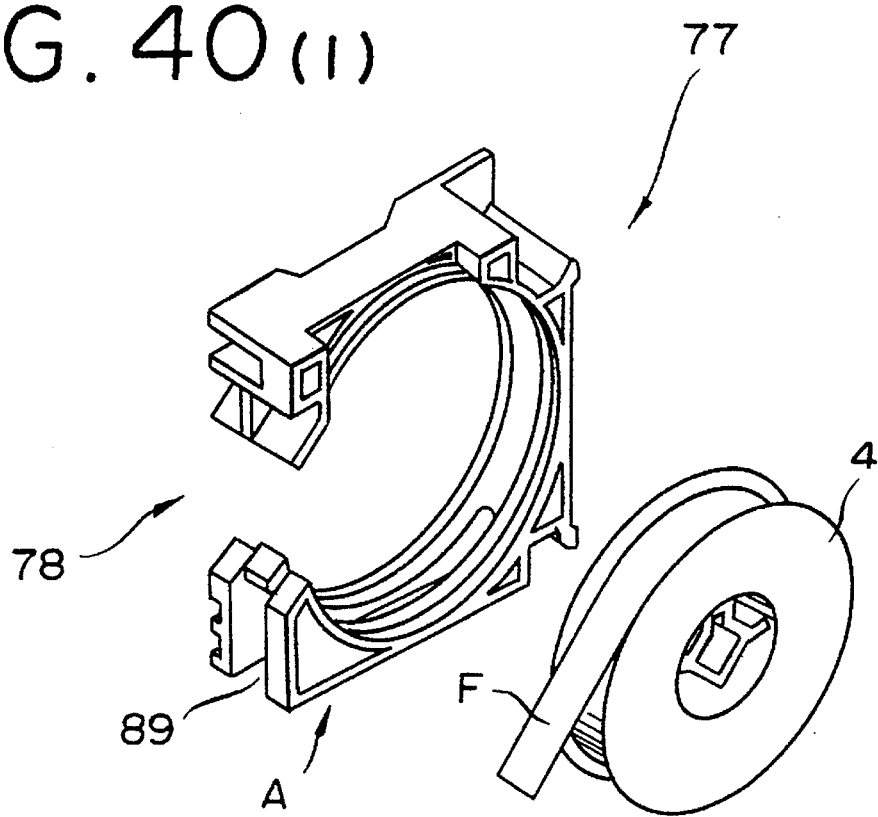
FIG. 40 is a perspective view illustrating a reel extracted from a cartridge in the embodiment shown in FIGS. 33 to 39.
Figure 40:
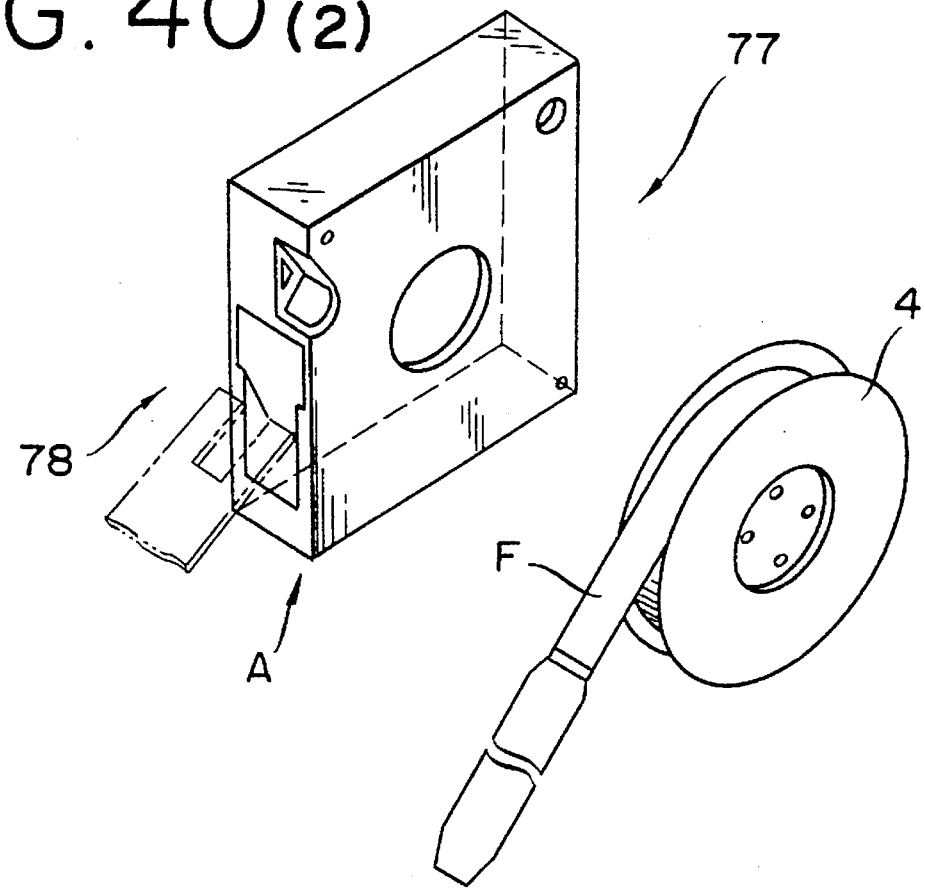

The cartridge container 24C illustrated in FIG. 37 is used for storing cartridges A of the ANSI specification type of FIG. 40(1) and FIG. 38(1). The detection of the cartridge A is carried out from the bottom surface side. When the light is reflected at the detecting position R1 and the reflection type photoswitch 37'$_1$ is turned ON and the light is not reflected at the detecting position R2 and the reflection photoswitch 37'$_2$ is turned OFF, it is judged that the stored cartridge A is set in the correct direction in the cartridge container 24C. In short, when the reflection type photoswitch 37'$_1$ of the switch 37' is ON and the reflection type photoswitch 37'$_2$ thereof is OFF, the cartridge A is set correctly in the longitudinal, latera, and vertical directions in the cartridge container 24C [FIG. 36(1)]. Table 1 given below shows the patterns of detection by the reflection photoswitches 37'$_1$ and 37'$_2$. The detection patterns correspond to the eight patterns of setting of the cartridge A. The detection pattern of No. 1 represents a case in which the cartridge A has been set in a correct direction and the detection patterns of No. 2 to No. 8 represent cases in which the cartridge A has been set in directions other than the correct direction.

TABLE 1

| Detection pattern | Reflection type photoswitch 37'$_1$ | Reflection type photoswitch 37'$_2$ |
|---|---|---|
| No. 1 | ON | OFF |
| No. 2 | ON | ON |
| No. 3 | ON | ON |
| No. 4 | OFF | OFF |
| No. 5 | OFF | ON |
| No. 6 | OFF | OFF |
| No. 7 | ON | ON |
| No. 8 | ON | ON |

The cartridge container 24C and the cartridge loader 21 of FIG. 37 are intended to contain cartridges A of the ANSI specification type illustrated in FIG. 40(1) and FIG. 38(1). When they are to store cartridges A of the 3M-M type illustrated in FIG. 40(2), the switches 37' are disposed in such a manner that two vertically separated points on the lateral surface coinciding with the open side of the cartridge A will constitute themselves the positions R1 and R2 for detection as illustrated in FIG. 38(2). In the case of cartridges A of the 3M-M type, it is allowable to use two points in the upper lateral corner parts on the front surface side of the cartridge A as the positions R1 and R2 for detection. It is also permissible to use only either of these two positions R1 and R2 for detection. The switch 37' is disposed in such a manner as to allow the detection of the kind described above. When the results of the detection effected by the switch 37' support the judgment that the cartridge A is not set in a correct direction in the cartridge container 24C, the control means stops the emission of operating signals to the loading mechanism 22 and, at the same time, issues an operating signal to alarm means capable of sounding an alarm, for example.

The construction which first discerns the direction of the cartridge A and then effects operations as in the present embodiment can be applied to the cartridge container 24A provided with projecting members 80 such as of FIG. 33 and to the cartridge container 24 of the ordinary run illustrated in FIG. 3.

The cartridge loader 21 of the present embodiment operates by the basic control flow identical to the basic control flow already described and illustrated in FIG. 27. In the basic control flow, the process for initial setting at Step S202 is carried out in accordance with the flow illustrated in FIG. 28, the process for interchange of cartridges A at Step S205 in accordance with the flow illustrated in FIG. 31 and FIG. 32, and the process for discharge of cartridges A at Step S207 in accordance with the flow illustrated in FIG. 23. The process for loading cartridges A at Step S203 and the process for screening for retrieval at Step S204 are slightly different from those illustrated in FIG. 29 and FIG. 30. Now, the process for loading cartridges A and the process for screening microfilms F for retrieval will be described below respectively with reference to FIG. 43 and FIG. 44.

Figure 29:
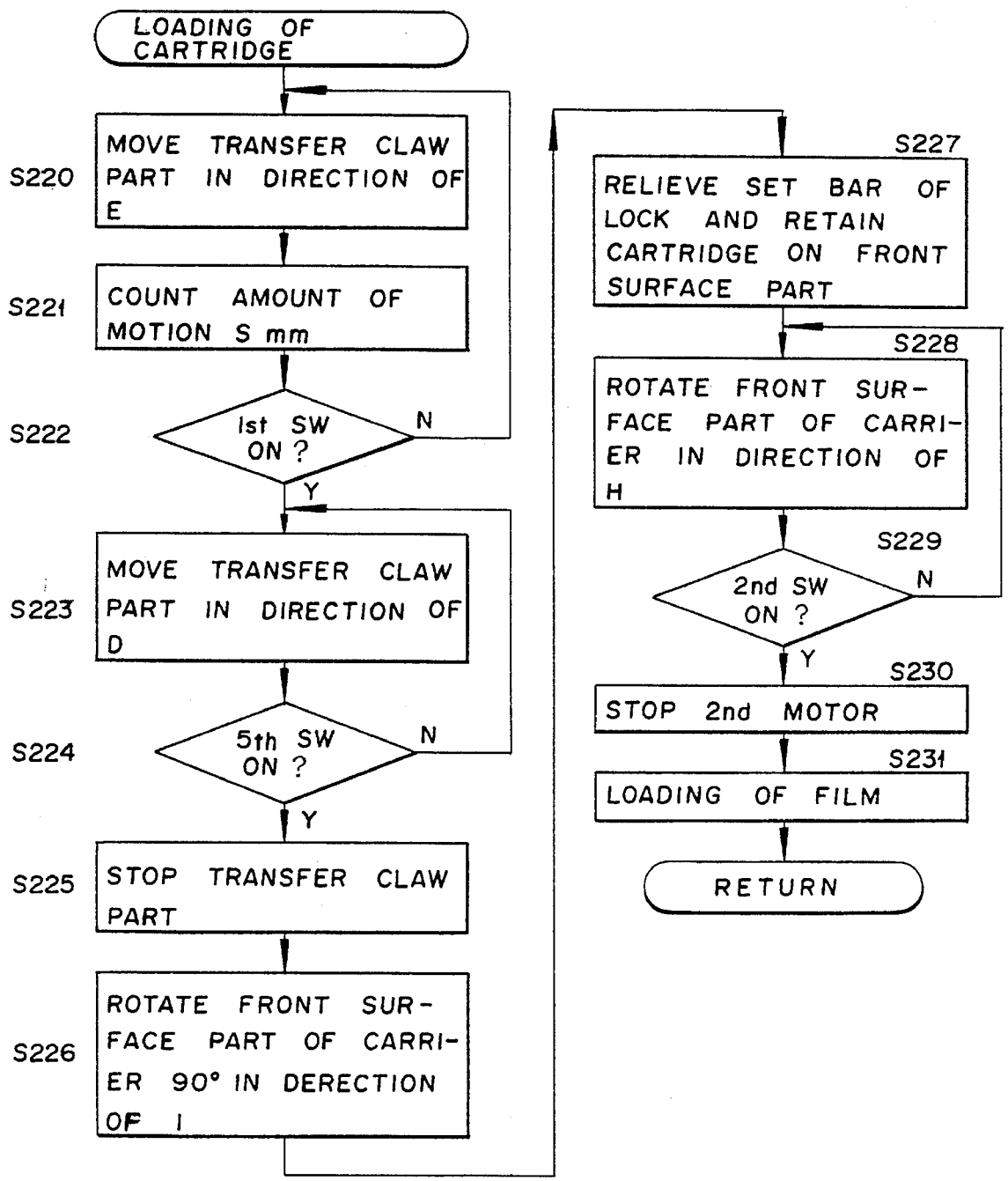
FIG. 29 is a flow chart illustrating the cartridge loading routine shown in FIG. 27.
Figure 43:
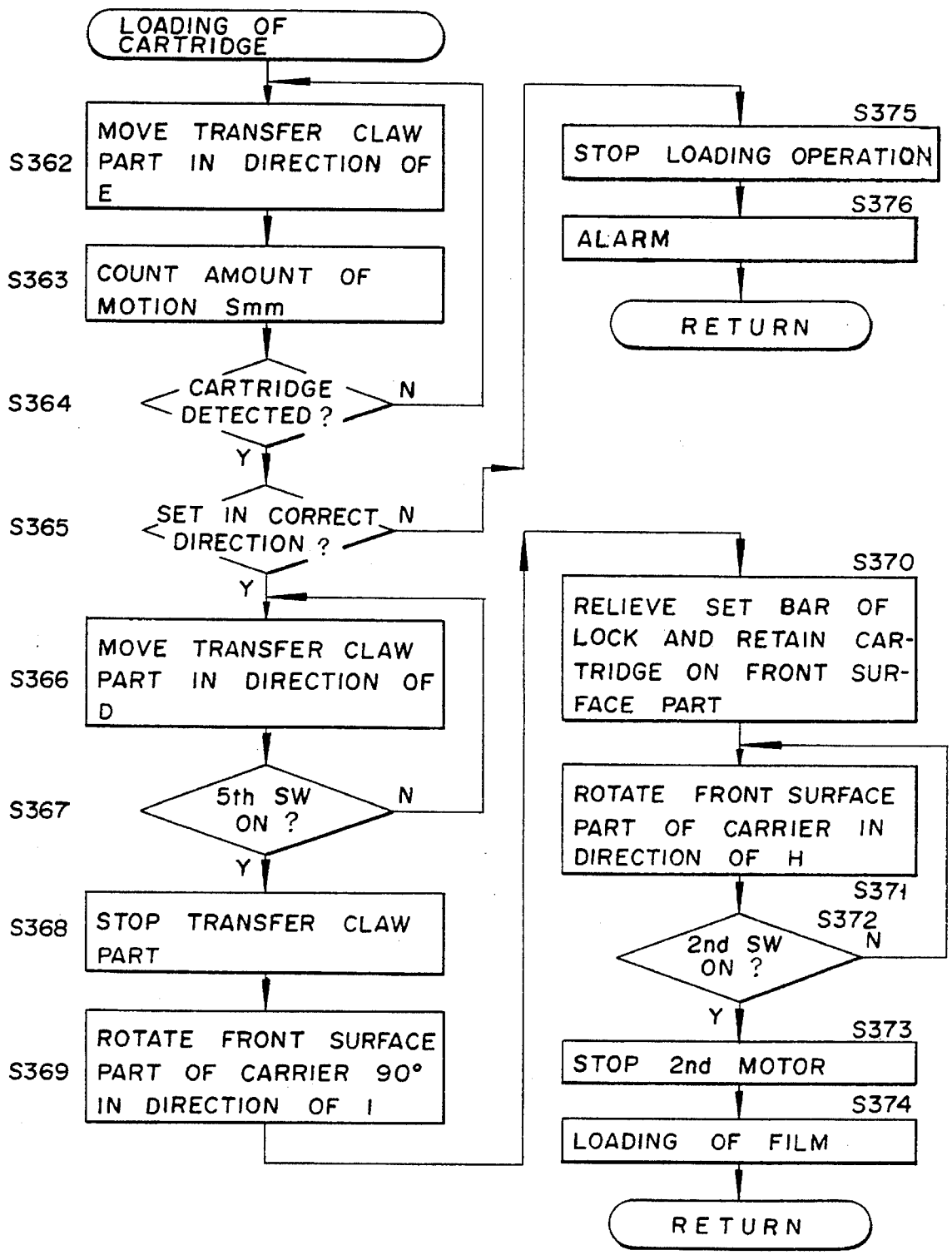
FIG. 43 is a flow chart illustrating the cartridge loading routine in the embodiment shown in FIG. 37.

The operations at Steps S362 and S363 in the routine for loading cartridges A, as illustrated in FIG. 43, are identical to those at Steps S220 and S221 illustrated in FIG. 29. Further, the operations at Steps S366 to S374 are identical to those performed at Steps S223 to 231 illustrated in FIG. 29. In the flow of FIG. 43, first at Step S364, the reflection type photoswitch 37'$_1$ and the reflection type photoswitch 37'$_2$ of the switch 37' are used to judge whether the cartridge A has been detected or not, namely whether the next cartridge A has been set to the set bar 33 or not in the place of the judgment on the ON-OFF status of the first switch 37' at Step S222 of FIG. 29.

When it is judged at Step S364 that the cartridge A has been detected, judgment is made at the next Step S365 whether the cartridge A is turned in a correct direction or not. This judgment resides in determining whether or not the detection pattern has been that which has the reflection type photoswitch $37'_1$ in the ON status and the reflection type photoswitch $37'_2$ in the OFF status in the switch 37'. The flow proceeds to the next Step S366 and the following steps when this particular detection pattern has been confirmed to support judgment that the cartridge A has been set in a correct direction in the cartridge container 24C of the cartridge loader 21 at Step S365. Conversely, if it is judged at Step S365 that the cartridge has not been set in a correct direction, the flow proceeds to Step S375. At this Step S375, the loading operation of the loading mechanism 22 of the cartridge loader 21 is immediately stopped and, at Step S376, an alarm is issued to set off sound of alarm and the flow is subsequently returned.

Figure 30:
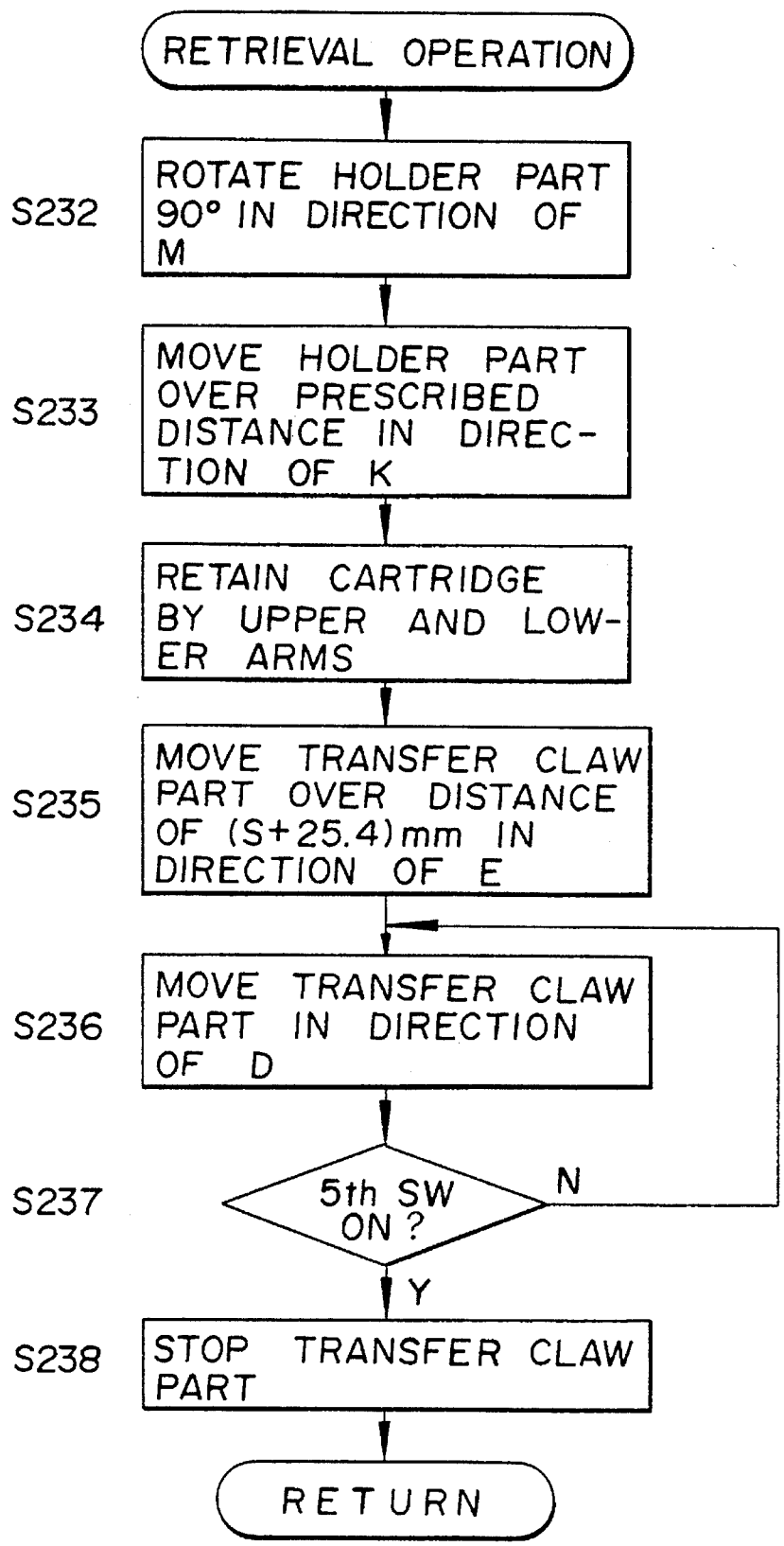
FIG. 30 is a flow chart illustrating the retrieving routine shown in FIG. 27.
Figure 44:
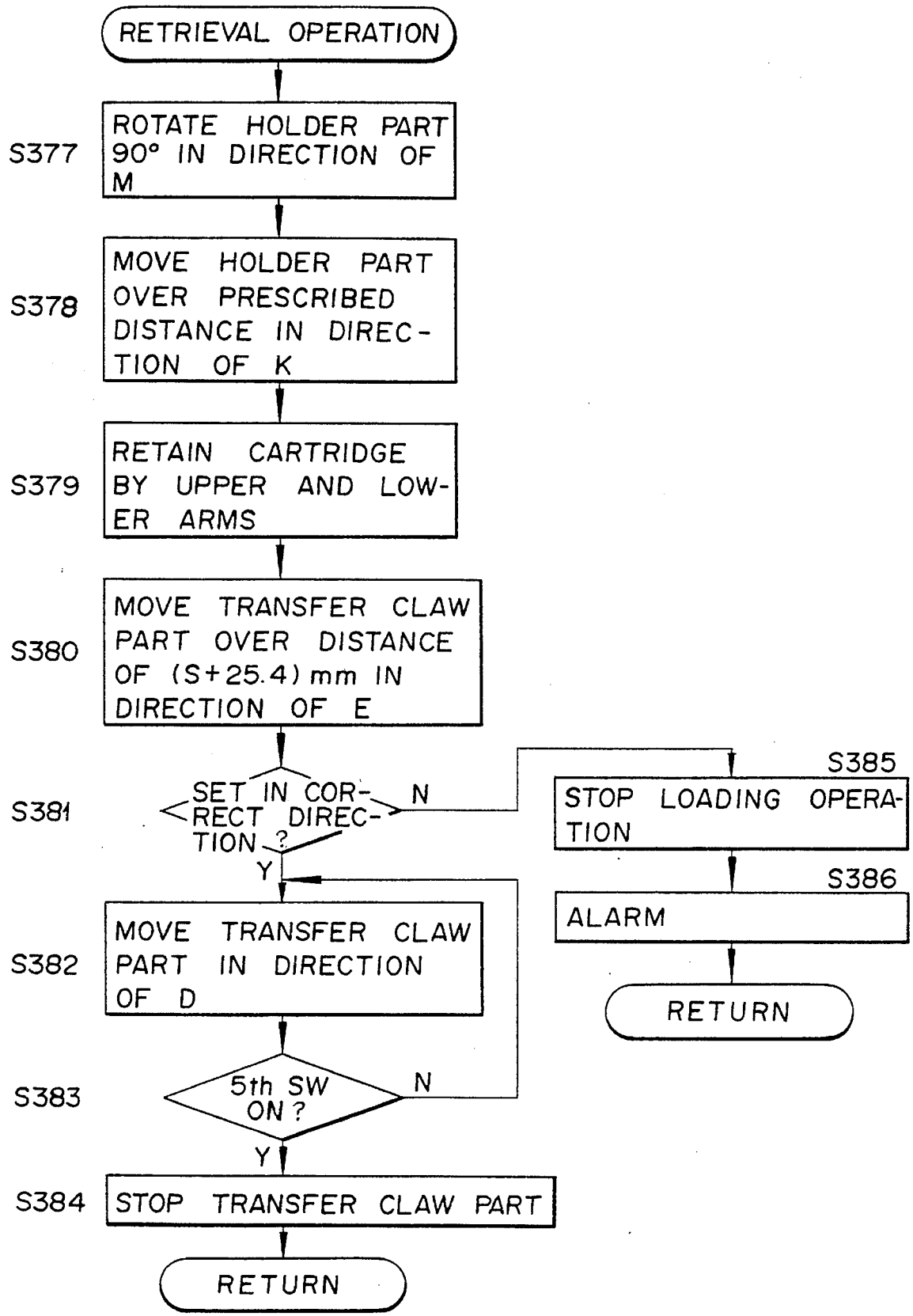
FIG. 44 is a flow chart illustrating the retrieving routine in the embodiment shown in FIG. 37.

Steps S377 to S380 and Steps S382 to S384 in the routine for screening for retrieval, as illustrated in FIG. 44, correspond respectively to Steps S232 to S235 and Steps S236 to S238 illustrated in FIG. 30. In the flow of FIG. 44, however, the judgment as to whether the cartridge A stored in the cartridge container 24C is turned in a correct direction or not is drawn at Step S381. When it is judged that the cartridge A has been set in the correct direction, the flow proceeds to Step S382 and the following steps. Conversely, if it is judged that the cartridge A has not been set in the correct direction, the flow proceeds to Step S385. At this Step S385, the loading operation of the loading mechanism 22 of the cartridge loader 21 is immediately stopped. At Step S386, the operation of alarming is carried out. Then, the flow returns. The particulars of the processes at Steps S381, S385, and S386 are identical to those at the aforementioned Steps S365, S375, and S376, except for certain modifications.

As described above, in the cartridge loader 21 illustrated in FIG. 37, the cartridge A is removed from the cartridge container 24C and loaded in the roll film carrier 1 by the loading mechanism 22 and, after completion of the screening of the microfilm F for retrieval, discharged from the roll film carrier 1 and returned to the cartridge container 24C to effect interchange of cartridges A. This cartridge loader 21 has switch 37' for detecting the direction of the cartridge A disposed either in the cartridge container 24C or in the loading path B of the loading mechanism 22. If the cartridge A has not been set in a correct direction, the control means automatically and immediately stops the operation of the loading mechanism 22 and, at the same time, actuates the alarm means. Then, the cartridge loader 21 illustrated in FIG. 37 manifests the following two actions and effects.

Firstly, when the cartridge A has not been turned in the correct direction, the loading operation is stopped and, at the same time, the alarm is issued. This process, therefore, allows easy detection and prevention of incorrect setting of the cartridge A in any of the longitudinal, lateral, and vertical directions. Thus, the cartridges A are infallibly set in the correct direction in the cartridge container 24C and then loaded in the roll film carrier 1. The present embodiment, similarly to the embodiment described above, curbs time loss, expedites the operation, and allows the microfilm F to be quickly screened or copied.

Secondly, the detecting means such as the switch 37' to be used for the detection of the direction of the cartridge A can be easily utilized additionally as a sensor for effecting various controls in the cartridge loader 21. The reflection type photoswitch $37'_1$ and the reflection type photoswitch $37'_2$ of the switch 37', for example, can be utilized as a sensor for detecting or confirming that the cartridge A to be loaded has terminated the waiting state, namely the cartridge A has been set to the set bar 33 of the loading mechanism 22. Further, the switch 37' is utilized as a sensor for detecting or measuring the amount of motion of the transfer claw part 31 of the loading mechanism 22. Owing to the fact that the switch 37' can be easily utilized as a sensor for effecting various controls, the present embodiment excels in terms of cost and allows simplification of controls.

What is claimed is:

1. An image projecting apparatus for projecting an image recorded in a microfilm retained in a cartridge set at a prescribed position, comprising:

a storing part for storing a plurality of the cartridges;

extracting means for removing a cartridge from said storing part; and a positioning member for positioning the removed cartridge at said prescribed position and movable between a first position and a second position, at said first position the positioning member opening for introducing the cartridge removed from the storing part and at said second position the positioning member locating the introduced cartridge at the prescribed position.

2. An image projecting apparatus according to claim 1, wherein said storing part is detachable from a position of attachment thereof.

3. An image projecting apparatus according to claim 2, wherein said positioning member is exposed relative to the position at which said storing part is attached.

4. An image projecting apparatus for projecting an image recorded in a microfilm retained in a cartridge loaded at a prescribed position, comprising:

a cartridge storing part for storing a plurality of cartridges;

loading means for extracting a cartridge from said plurality of cartridges in said storing part and loading the extracted cartridge at said prescribed position; and returning means for removing said cartridge from said prescribed position and returning the removed cartridge to said storing part;

wherein the direction of said cartridge in said storing part is different before said cartridge is removed by said loading means and after said cartridge is returned to said storing part by said returning means.

5. An image projecting apparatus according to claim 4, wherein said cartridge storing part is detachable from the image projecting apparatus.

6. An image projecting apparatus for projecting an image recorded in a roll film retained in a cartridge loaded at a prescribed position, comprising:

projecting means for projecting an image recorded in the roll film;

film conveying means for conveying the roll film retained in a cartridge supported by a film carrier to said projecting means and for rewinding the conveyed roll film;

loading means for loading the cartridge at the prescribed position;

extracting means for extracting the cartridge from the prescribed position; and control means for controlling the extracting means so as to operate before the rewinding of said roll film by said film conveying means is completed.

7. An image projecting apparatus according to claim 6, further comprising:

signal generating means for generating a signal to command rewinding of the roll film; and wherein said control means controls said film conveying means and said extracting means so that said rewinding of said roll film is started in response to the signal generated by said signal generating means and said extracting means is operated.

8. An image projecting apparatus according to claim 7, wherein said extracting means includes a holding member which is disposed so as to be reciprocated freely between a waiting position for retracting from the cartridge and an operating position for holding said cartridge loaded in the prescribed position, and said control means is adapted to move said holding member from said waiting position to said operating position in response to said signal.

9. An image projecting apparatus for projecting an image recorded in a microfilm retained in a cartridge loaded at a prescribed position, comprising:

a cartridge storing part for storing a plurality of cartridges in alignment;

loading means for extracting from said storing part the cartridge located at an extraction end of said storing part and for loading the extracted cartridge at said prescribed position;

a moving member for moving all the cartridges in the storing part toward said extraction end of the storing part;

drive means for driving said moving member so as to move from a home position behind the aligned cartridges toward the extraction end of the storing part;

determining means for determining the movement amount of the moving member from said home position to a set position, wherein when the moving member is moved to said set position, a foremost cartridge of the aligned cartridges with regard to a cartridge moving direction reaches the extraction end of the storing part; and counting means for counting the number of cartridges stored in said storing part based on the movement amount determined by said determining means.

10. An image projecting apparatus according to claim 9, and further comprising:

cartridge detecting means for detecting whether the cartridge is at said extraction end of the storing part; and wherein said drive means starts to drive the moving member so as to move toward said home position and, at the same time, said determining means determines the movement amount in response to the detection of the cartridge by said cartridge detecting means.

11. An image projecting apparatus according to claim 9, wherein said storing part is detachable from the image protecting apparatus and said determining means is actuated when said storing part is attached to said image projecting apparatus.

12. An image projecting apparatus according to claim 11, further comprising:

return means for returning the cartridge at said prescribed position to said storing part; and control means for controlling said loading means and said return means in accordance with the number of cartridges counted by said counting means;

wherein said control means actuates said loading means and said return means a number of times corresponding to the number counted by said counting means.

13. An image projecting apparatus for projecting an image recorded in a microfilm retained in a cartridge at a prescribed position, comprising:

a cartridge storing part for storing a plurality of cartridges in alignment;

loading means for extracting from said storing part the cartridge located at an extraction end of said storing part and for loading the extracted cartridge at said prescribed position;

return means for returning the cartridge at the prescribed position to said storing part;

counting means for counting cartridges stored in said storing part; and control means for controlling said loading means and said return means in accordance with the number counted by said counting means.

14. An image projecting apparatus according to claim 13, wherein said counting means includes:

a moving member for moving all the cartridges in the storing part toward said extraction end of the storing part;

drive means for driving said moving member so as to move from a home position behind the aligned cartridges toward the extraction end of the storing part;

determining means for determining the movement amount of the moving member from said home position to a set position wherein when the moving member is moved to said set position, a foremost cartridge of the aligned cartridges with regard to a cartridge moving direction reaches the extraction end of the storing part; and wherein said counting means counts said number based on said movement amount.

15. An image projecting apparatus according to claim 13, wherein said storing part is detachable from the image projecting apparatus and said counting means is actuated when said storing part is attached to said image projecting apparatus.

16. An image projecting apparatus according to claim 15, wherein said control means actuates said loading means and said return means a number of times corresponding to the number counted by said counting means.

17. An image projecting apparatus, comprising:

a cartridge storing part for storing cartridges containing a roll film;

loading means for extracting a cartridge from said storing part and for loading the extracted cartridge at a prescribed position;

return means for returning the cartridge at the prescribed position to said storing part;

a movable film carrier capable of supporting a cartridge;

projecting means for projecting an image recorded in a roll film;

film conveying means for conveying the roll film retained in the cartridge supported by said carrier toward said projecting means and for rewinding the roll film;

moving means for moving said film carrier; and control means for controlling said moving means, wherein said control means controls said moving means so as to start to move said film carrier supporting the cartridge to said prescribed position while said film is being rewound by said film conveying means.

18. An image projecting apparatus according to claim 17, wherein said moving means moves said film carrier and said film conveying means in a direction perpendicular to the direction of conveyance of said roll film by said film conveying means.

19. An image projecting apparatus according to claim 18, and further comprising:

means for measuring amounts of displacement of said film carrier and said film conveying means from said prescribed position; and wherein said control means moves said moving means in an amount proportionate to the amount of displacement found by the measurement.

20. An image projecting apparatus according to claim 17, and further comprising:

signal generating means for generating a signal to designate rewinding of said roll film; and wherein said control means controls said film conveying means and said moving means in such a manner that said rewinding of said roll film is started and, at the same time, motion of said cartridge supported by said film carrier to said prescribed position is started in response to said signal.

21. An image projecting apparatus according to claim 18, and further comprising:

a screen supported in a substantially vertical direction; and wherein the motion of said moving means is produced in a direction for the image projected on said screen to move vertically.

22. A cartridge storing part capable of storing a plurality of cartridges respectively containing a microfilm and attachable to a cartridge loading device for loading a cartridge in an image projecting apparatus, comprising:

a plurality of projecting members formed on an inner surface of said cartridge storing part and engaging with specific positions of said cartridges, said projecting members being retracted into said inner surface when the cartridge storing part is attached to said cartridge loading device.

23. A cartridge loading device for loading a cartridge containing a microfilm in an image projecting apparatus for projecting an image recorded in said microfilm, comprising:

a cartridge storing part for storing a plurality of cartridges arranged in a row;

a plurality of projecting members disposed movably between a state protruding from the inner surface of said cartridge storing part and a state receding toward said inner surface for the purpose of positioning said plurality of cartridges stored in said cartridge storing part;

loading means for extracting the cartridge located at a prescribed position in said storing part and loading the removed cartridge in said image projecting apparatus;

means for shifting a cartridge in said storing part to said prescribed position; and means for causing said plurality of projecting members to be retracted into said inner surface before said shifting means produces said shifting operation.

24. A cartridge loading device according to claim 23, wherein said plurality of projecting members are disposed in said cartridge storing part.

25. A cartridge loading device for loading cartridges containing a microfilm in an image projecting apparatus for projecting an image recorded in said microfilm, comprising:

a cartridge storing part for storing a plurality of cartridges as arranged in a row;

loading means for extracting a cartridge in said storing part and loading the extracted cartridge in the image projecting apparatus;

detecting means for detecting the direction of said cartridge in the cartridge storing part; and control means for controlling said loading means so as to stop operating when said detecting means detects that said cartridge is not turned in a prescribed direction.

26. A cartridge loading device according to claim 25, and further comprising:

warning means for warning that said cartridge is not turned in said prescribed direction.

27. A cartridge loading device according to claim 25, wherein said cartridge storing part is detachable from said cartridge loading device.

28. An image projecting apparatus, comprising:

a cartridge storing part for storing cartridges containing a roll film;

a movable film carrier capable of supporting a cartridge;

loading means for extracting the cartridge from said storing part and loading the extracted cartridge at said film carrier;

return means for returning the cartridge supported by the film carrier to said storing part;

projecting means for projecting an image recorded in a roll film;

film conveying means for conveying the roll film retained in the cartridge supported by said carrier toward said projecting means and for rewinding the roll film;

adjusting means for adjusting a first gap between the film carrier and the loading means and a second gap between the film carrier and the return means on the condition that the film carrier is moved; and control means for controlling said adjusting means so as to start operating while said film is being rewound by said film conveying means.

29. An image projecting apparatus according to claim 28, wherein said adjusting means adjusts said first gap and said second gap at a predetermined value so that said loading means certainly loads the cartridge at the film carrier and said return means certainly returns the cartridge supported by the film carrier to the cartridge storing part.

30. A loading device which loads a film cartridge at a prescribed position in an image reading apparatus, said loading device comprising:

a container which stores a plurality of cartridges;

a loading mechanism which extracts one cartridge from said container and loads the extracted cartridge at the prescribed position; and a discharge mechanism which returns the loaded cartridge to the container, so that the direction of the cartridge returned in the container is different from the direction of the cartridge in the container before being extracted therefrom.

31. A loading device which loads a roll film cartridge at a prescribed position in an image reading apparatus, said loading device comprising:

a loading mechanism which loads the cartridge at said prescribed position, so that the roll film in the cartridge at the prescribed position is conveyed to a reading portion of the image reading apparatus and rewound after completion of the reading;

a discharge mechanism which removes the cartridge loaded at the prescribed position; and a controller which operates said discharge mechanism before completion of the rewinding of the roll film in the cartridge.

32. A loading device as claimed in claim 31 wherein said discharge mechanism includes a holder, and said holder is disposed so as to be reciprocated freely between a waiting position for retracting from the cartridge and an operating position for holding said cartridge loaded in the prescribed position.

33. A loading device which loads a film cartridge at a prescribed position in an image reading apparatus, said loading device comprising:

a container which stores a plurality of cartridges;

a detector which detects the number of the cartridges stored in said container;

a loading mechanism which extracts one cartridge from the container and loads the extracted cartridge at the prescribed position;

a discharge mechanism which returns the cartridge loaded at the prescribed position to the container; and a controller which controls the loading mechanism and the discharge mechanism in accordance with the number of the cartridges stored in the container.

34. A loading device which loads a roll film cartridge at a prescribed position in an image reading apparatus, said loading device comprising:

a container which stores a plurality of cartridges;

a movable film carrier which supports a cartridge;

a loading mechanism which extracts one cartridge from said container and loads the extracted cartridge at said film carrier, so that the roll film in the cartridge at the film carrier is conveyed to a reading portion of the image reading apparatus and rewound after completion of the reading;

a discharge mechanism which returns the cartridge supported by said film carrier to the container; and an adjusting member which adjusts a first gap between the film carrier and the loading mechanism and a second gap between the film carrier and the discharge mechanism on the condition that the film carrier is moved, wherein said adjusting member starts operating while said roll film is rewound.

35. A method performed in a loading device which has a container storing a plurality of film cartridges, said method comprising:

detecting the number of cartridges stored in the container;

extracting one cartridge from the container;

loading the extracted cartridge at a prescribed position in an image reading apparatus to read an image of the film retained in the cartridge;

returning the loaded cartridge to the container; and finishing the loading and returning of the cartridges in accordance with the number of the cartridges stored in the container.

36. A loading device which loads a film cartridge at a prescribed position in an image reading apparatus, an image recorded in a film retained in the cartridge loaded in said prescribed position being read, said loading device comprising:

a container which stores a plurality of cartridges;

an extracting bar which extracts one of the cartridges from said container; and a setting member which sets the extracted cartridge at the prescribed position, said extracting bar being movable for extracting one of the cartridges from said container and setting the cartridge to the setting member, said setting member being movable between a first position and a second position, at said first position the setting member receiving the extracted cartridge from said extracting bar and at said second position the setting member setting the extracted cartridge at the prescribed position.

* * * * *